(12) United States Patent
Rangarajan et al.

(10) Patent No.: US 10,516,874 B2
(45) Date of Patent: *Dec. 24, 2019

(54) ENHANCING IMAGING PERFORMANCE THROUGH THE USE OF ACTIVE ILLUMINATION

(71) Applicant: Southern Methodist University, Dallas, TX (US)

(72) Inventors: Prasanna Rangarajan, Dallas, TX (US); Vikrant R. Bhakta, Dallas, TX (US); Marc P. Christensen, McKinney, TX (US); Panos Papamichalis, Plano, TX (US)

(73) Assignee: Southern Methodist University, Dallas, TX (US)

( * ) Notice: Subject to any disclaimer, the term of this patent is extended or adjusted under 35 U.S.C. 154(b) by 119 days.

This patent is subject to a terminal disclaimer.

(21) Appl. No.: 14/846,533

(22) Filed: Sep. 4, 2015

(65) Prior Publication Data
US 2016/0080726 A1 Mar. 17, 2016

Related U.S. Application Data

(63) Continuation of application No. 13/178,403, filed on Jul. 7, 2011, now Pat. No. 9,131,223.

(51) Int. Cl.
*G06T 5/50* (2006.01)
*H04N 5/225* (2006.01)
(Continued)

(52) U.S. Cl.
CPC ....... *H04N 13/254* (2018.05); *G01B 11/2513* (2013.01); *G06T 5/50* (2013.01);
(Continued)

(58) Field of Classification Search
None
See application file for complete search history.

(56) References Cited

U.S. PATENT DOCUMENTS

| | | | | |
|---|---|---|---|---|
| 4,656,508 A | * | 4/1987 | Yokota | G01B 11/2509 348/135 |
| 5,608,538 A | * | 3/1997 | Edgar | H04N 1/047 358/406 |

(Continued)

OTHER PUBLICATIONS

Anonymous ECCV submission, "Perspective Imaging under Structured Light," Paper ID 951, Mar. 17, 2010, 14 pages.
(Continued)

*Primary Examiner* — Kate H Luo
(74) *Attorney, Agent, or Firm* — Fish & Richardson P.C.

(57) ABSTRACT

A system includes a camera and a projector for capturing spatial detail having resolution exceeding that afforded by the imaging optics, and recovering topographic information lost to the projective nature of imaging. The projector projects a spatial pattern onto the scene to be captured. The spatial patterns may include any pattern or combination of patterns that result in complex sinusoidal modulation. Spatial detail such as texture on the objects in the scene modulate the amplitude of the spatial pattern, and produce Moiré fringes that shifts previously unresolved spatial frequencies into the camera's optical passband. The images may be demodulated, and the demodulated components may be combined with the un-modulated components. The resulting image has spatial detail previously inaccessible to the camera owing to the band-limited nature of the camera optics. A spatial pattern may also be projected and received by the camera to estimate topographic information about the scene.

20 Claims, 38 Drawing Sheets

(51) Int. Cl.
H04N 5/232 (2006.01)
H04N 13/254 (2018.01)
G01B 11/25 (2006.01)
H04N 9/31 (2006.01)
H04N 5/74 (2006.01)

(52) U.S. Cl.
CPC ....... *H04N 5/2256* (2013.01); *H04N 5/23232* (2013.01); *H04N 9/3194* (2013.01); *G06T 2207/10028* (2013.01); *G06T 2207/10152* (2013.01); *G06T 2207/20068* (2013.01); *H04N 5/7416* (2013.01)

(56) References Cited

U.S. PATENT DOCUMENTS

| | | | |
|---|---|---|---|
| 5,616,912 A | 4/1997 | Robinson et al. | |
| 5,912,768 A | 6/1999 | Sissom et al. | |
| 6,229,913 B1 | 5/2001 | Nayar et al. | |
| 7,019,826 B2 | 3/2006 | Vook et al. | |
| 7,088,458 B1* | 8/2006 | Wegmann | G01J 9/02 356/124 |
| 7,440,590 B1* | 10/2008 | Hassebrook | G01B 11/2513 345/582 |
| 7,518,712 B2 | 4/2009 | Sadoulet et al. | |
| 7,667,740 B2* | 2/2010 | Hofer | H04N 5/235 348/226.1 |
| 7,783,440 B1 | 8/2010 | Lewis et al. | |
| 7,844,079 B2 | 11/2010 | Hassebrook et al. | |
| 8,665,361 B1 | 3/2014 | Rangarajan et al. | |
| 8,823,822 B1 | 9/2014 | Bhakta et al. | |
| 9,030,594 B1 | 5/2015 | Bhakta et al. | |
| 9,131,223 B1 | 9/2015 | Rangarajan et al. | |
| 2002/0006282 A1 | 1/2002 | Ushiro et al. | |
| 2003/0189983 A1* | 10/2003 | Hong | H04N 7/0125 375/240.27 |
| 2005/0058352 A1* | 3/2005 | Deliwala | G01J 3/02 382/232 |
| 2007/0104393 A1* | 5/2007 | Strelow | G06T 3/4007 382/299 |
| 2009/0046164 A1 | 2/2009 | Shroff et al. | |
| 2009/0180731 A1 | 7/2009 | Christensen et al. | |
| 2009/0323125 A1* | 12/2009 | Kawakami | G06T 1/0028 358/3.28 |
| 2010/0316370 A1* | 12/2010 | Goto | G03B 17/48 396/430 |
| 2011/0169915 A1 | 7/2011 | Bloom et al. | |

OTHER PUBLICATIONS

Anonymous ECCV submission, Perspective Imaging under Structured Light 'Supplementary Material,' Mar. 17, 2010, 8 pages.
Barrett, Eamon, "New approaches to image super-resolution beyond the diffraction limit," Unconventional Imaging III, Proc. of SPIE, vol. 6712, 67120D, 2007, 14 pages.
Bhakta, V. R. et al., "Image-based Measurement of Phase Transfer Function," Dept. of Electrical Engineering, SMU, 2010 Optical Society of America, 3 pages.
Chen, Shengyong et al., "Active Sensor Planning for Multiview Vision Tasks," Springer-Verlag Berlin Heidelberg, ISBN: 978-3-540-77071-8, 2008, 274 pages.
Chen, "New 3D Scanning Techniques for Complex Scenes," Ph.D. thesis 2008, Max-Planck-Institut für Informatik, Saarbrüken, Germany, 115 pages.
Elkind et al.; Optical Transfer Function Shaping and Depth of Focus by Using a Phase Only Filter; Applied Optics; vol. 42, No. 11; Apr. 10, 2003; 7 pages.
Garcia, V. Mico, D. Cojoc, and Z. Zalevsky, "Full field of view super-resolution imaging based on two static gratings and white light illumination," Appl. Opt. 47, 3080-2087 (2008).
Gustafsson, Mats G.L. et al., "Doubling the lateral resolution of wide-field fluorescence microscopy using structured illumination," Proceedings of SPIE, vol. 3919, 2000, pp. 141-150.
Gustaffson, M. "Surpassing the lateral resolution limit by a factor of two using structured illumination microscopy," J.Microsc.198 (2000).
Halioua, M. et al., "Projection moire with moving gratings for automated 3-D topography," Applied Optics, vol. 22, No. 6, Mar. 15, 1983, 6 pages.
Hartley, et al., "Multiple View Geometry in Computer Vision Second Edition," Chapter 6 "Camera Models," Cambridge University Press, 2003, 19 pages.
Havranek, Viterslav; Overview of OTF Measurement; Joing Laboratory of Optics of Palacky University and Institute of Physics of the Academy of Sciences of the Czech Republic, Mar. 4, 2002; 24 pages.
Heintzmann, et al., "Breaking the resolution limit in light microscopy," Briefing in Functional Genomics and Proteomics, vol. 5, No. 4, 289-301, (2006), 13 pages.
Hopkins, "Image shift, phase distortion and the optical transfer function,:" Optica Acta, 1984, vol. 32, No. 3, 345-368, 24 pages.
Huynh, D. Q. et al., "Calibrating Structured Light Stripe System: A Novel Approach," Int'l Journal of Computer Vision 33(1), 73-86 (1999), 14 pages.
Lanman, D. et al., "Build Your Own 3D Scanner: 3D Photography for Beginners," SIGGRAPH 2009 Course Notes, Aug. 5, 2009, 94 pages.
Lin, R. Huang, P. Tsai and C. Lee, "Wide-field super-resolution optical sectioning microscopy using a single spatial light modulator," J. Opt. A: Pure Appl. Opt. 11 (2009).
Lukosz, W., "Optical Systems with Resolving Powers Exceeding the Classical Limit," Journal of the Optical Society of America, vol. 56, No. 11, Nov. 1966, pp. 1463-1472.
Lukosz and M. Marchand, "Optischen Abbildung Unter Ueberschreitung der Beugungsbedingten Aufloesungsgrenze," Opt. Acta 10, 241-255, 1963.
Martinez, et al., "Progress in Optics," Chapter 1 "The Resolution Challenge in 3D Optical Microscopy," Elsevier, 2009, 36 pages.
Meadows, D. M. et al., "Generation of Surface Contours by Moiré Patterns," Applied Optics, vol. 9, No. 4, Apr. 1970, pp. 942-947.
Micó, Vincente et al., "Optical Superresolution: Imaging Beyond Abbe's Diffraction Limit," Journal of Holography and Speckle, vol. 5, No. 2, American Scientific Publishers, 2009, pp. 1-14.
Morgenstern, B. et al., "Optical Bandwidth Extension in Two Dimensions Beyond the Classical Limit," J. Opt. Soc. Am. 54, 1964, pp. 1282-1283.
Morton, J. B. et al. "A Posteriori method of image restoration," Image Processing Institute, Univ. Southern Calif., J. Opt. Soc. Am., vol. 69, No. 2, Feb. 1979, 11 pages.
Neil M.A., R. Juskaitis, and T. Wilson, "Method of obtaining optical sectioning by using structured light in a conventional microscope," Optics Letters 22, 1905-1907 (1997).
Olsen, J. T. et al. "Comparison of tilted slit and tilted edge superresolution modulation transfer function techniques," Optical Engineering, Jan. 2007, vol. 46(1), 9 pages.
Rangarajan, Prasanna et al., "Incoherent Optical Super-Resolution using Structured Illumination," Department of Electrical Engineering, Southern Methodist University, Dallas, TX, Optical Society of America, 2010, 28 pages.
Rangarajan, et al., "Surpassing the Diffraction-limit of Digital Imaging Systems using Sinusoidal Illumination Patterns," Department of Electrical Engineering, Southern Methodist University, Dallas, TX, Optical Society of America, 2009, 3 pages.
Rangarajan, et al., "Perspective Imaging under Structured Light," Lyle School of Engineering, Southern Methodist University, Dallas, TX, Mar. 17, 2010, 14 pages.
Salvi, et al., "A state of the art in structured light patterns for surface profilometry,"Institute of Informatics and Applications, University of Girona, Girona, Spain, Mar. 18, 2010, 36 pages.
Shroff, J. R. Fienup, and D. R. Williams, "Phase-shift estimation in sinusoidally illuminated images for lateral superresolution," J. Opt. Soc. Am. A 26, 413-424 (2009).
Srinivasan, V. et al., "Automated phase-measuring profilometry of 3-D diffuse objects," Applied Optics, vol. 23, No. 18, Sep. 1984, pp. 3105-3108.

(56) References Cited

OTHER PUBLICATIONS

Takeda, Mitsuo et al., "Fourier transform profilometry for the automatic measurement of 3-D object shapes," Applied Optics, vol. 22, No. 24, 15 Dec. 1983, pp. 3977-3982.

Utkin, A. B. et al., "On the relation between the wave aberration function and the phase transfer function for an incoherent imaging system with circular pupil," Eur. Phys. J. D. 17, 145-148 (2001), 6 pages.

Vaquero, Daniel A., Ramesh Raskar, Rogerio S. Feris, & Matthew Turk. "A Projector-Camera Setup for Geometry-Invariant Frequency Demultiplexing," In IEEE Computer Vision and Pattern Recognition (CVPR'09).

Yamada et al., High-resolution Estimation of the Directions-of-Arrival Distribution by Algebraic Phase Unwrapping Algorithms; Nov. 20, 2010; 21 pages.

Zhang, et al., "Novel method for structured light system calibration,:" Optical Engineering, 45(8), Aug. 2006, 8 pages.

Zhang & S. K. Nayar, "Projection Defocus Analysis for Scene Capture and Image Display," SIGGRAPH2006, pp. 907-915.

Zalevsky, et al., "The Concept of Superresolution," Optical Super-resolution, Library of Congress, 2004, 19 pages.

Zalevsky, et al., "Geometrical Superresolution," Optical Super-resolution, Library of Congress, 2004, 32 pages.

Office Action issued in U.S. Appl. No. 12/785,334 dated Nov. 20, 2012; 11 pages.

Office Action issued in U.S. Appl. No. 12/785,334 dated Apr. 30, 2013; 9 pages.

Notice of Allowance issued in U.S. Appl. No. 12/785,334 dated Aug. 5, 2013; 10 pages.

Office Action issued in U.S. Appl. No. 13/026,141 dated Sep. 26, 2013; 19 pages.

Office Action issued in U.S. Appl. No. 13/178,403 dated Jan. 29, 2014; 26 pages.

\* cited by examiner $N_p$ IS THE NUMBER OF COLUMNS IN THE PROJECTED IMAGE    $M_p$ IS THE NUMBER OF ROWS IN THE PROJECTED IMAGE

| TYPE OF SETUP | SCENE CONSTRAINTS | SETUP AND PATTERN CONSTRAINTS | OPTICAL SUPER RESOLUTION DIRECTION | CALIBRATED |
|---|---|---|---|---|
| FIGURES 3A-3B | NONE | $b_Y = b_Z = 0$ PATTERN WITH $\eta_0 = 0$ | ↔ | NO |
| FIGURE 5B | NONE | $b_Y = b_Z = 0$ WARP PATTERN WITH $\eta_0 = 0$, BY $H^\infty_{proj2com}$ | ↔ | YES |
| FIGURES 4A-4B | NONE | $b_X = b_Z = 0$ PATTERN WITH $\xi_0 = 0$ | ↕ | NO |
| FIGURE 1A OR NOT SHOWN | NONE | $b_X = b_Z = 0$ WARP PATTERN WITH $\xi_0 = 0$, BY $H^\infty_{proj2com}$ | ↕ | YES |
| FIGURE 5A | NONE | $b_Z = 0$, PATTERN WITH $\xi_0 \neq 0, \eta_0 \neq 0$ SUCH THAT $\frac{\xi_0}{N_p} b_X + \frac{\eta_0}{M_p} b_Y = 0$ | ONLY $tan^{-1}\left(\frac{\xi_0}{N_p} * \frac{M_p}{\eta_0}\right)$ | NO |
| FIGURE 1C | NONE | $b_Z = 0$, WARP PATTERN WITH $\xi_0 \neq 0, \eta_0 \neq 0$, BY $H^\infty_{proj2com}$ SUCH THAT $\frac{\xi_0}{N_p} b_X + \frac{\eta_0}{M_p} b_Y = 0$ | ONLY $tan^{-1}\left(\frac{\xi_0}{N_p} * \frac{M_p}{\eta_0}\right)$ | YES |
| FIGURES 2A-2B | NONE | $b_X = b_Y = b_Z = 0$ FOR ALL $\xi_0, \eta_0$ | ALL $tan^{-1}\left(\frac{\xi_0}{N_p} * \frac{M_p}{\eta_0}\right)$ | NO |
| FIGURE 1B | PLANAR FACET PARALLEL TO THE IMAGE PLANES OF THE CAMERA AND PROJECTOR | FOR ALL $b_X, b_Y, b_Z$ FOR ALL $\xi_0, \eta_0$ | ALL $tan^{-1}\left(\frac{\xi_0}{N_p} * \frac{M_p}{\eta_0}\right)$ | NO |

WHERE $H^\infty_{proj2com}$ IS THE INFINITE HOMOGRAPHY BETWEEN THE PROJECTOR AND THE CAMERA

FIG. 1D

| SETUP CONSTRAINTS | ILLUMINATION PATTERN CONSTRAINTS FOR OSR | | ILLUMINATION PATTERN CONSTRAINTS FOR SCENE RECOVERY | |
|---|---|---|---|---|
| $b_Y = b_Z = 0$ HORIZONTALLY COLLOCATED ACTIVE STEREO SETUP | SAMPLE PATTERN WITH $\xi_0 = 0$, WARPED BY $H_{p2e}^{\infty}$ | SAMPLE CAMERA IMAGE | SAMPLE PATTERN WITH $\xi_0 \neq 0$, WARPED BY $H_{p2e}^{\infty}$ | SAMPLE CAMERA IMAGE |
| $b_X = b_Z = 0$ VERTICALLY COLLOCATED ACTIVE STEREO SETUP | SAMPLE PATTERN WITH $\eta_0 = 0$, WARPED BY $H_{p2e}^{\infty}$ | SAMPLE CAMERA IMAGE | SAMPLE PATTERN WITH $\eta_0 \neq 0$, WARPED BY $H_{p2e}^{\infty}$ | SAMPLE CAMERA IMAGE |
| $b_Y = b_Z = 0$ HORIZONTALLY COLLOCATED PARALLEL STEREO SETUP | SAMPLE PATTERN WITH $\xi_0 = 0$, NO WARPING | SAMPLE CAMERA IMAGE | SAMPLE PATTERN WITH $\xi_0 \neq 0$, NO WARPING | SAMPLE CAMERA IMAGE |
| $b_X = b_Z = 0$ VERTICALLY COLLOCATED PARALLEL STEREO SETUP | SAMPLE PATTERN WITH $\eta_0 = 0$, NO WARPING | SAMPLE CAMERA IMAGE | SAMPLE PATTERN WITH $\eta_0 \neq 0$, NO WARPING | SAMPLE CAMERA IMAGE |
| $b_X = b_Y = b_Z = 0$ COINCIDENT ACTIVE STEREO SETUP | NO CONSTRAINTS ON $\xi_0, \eta_0$ | | NO CONSTRAINTS ON $\xi_0, \eta_0$ "PROJECTION DEFOCUS ANALYSIS FOR SCENE CAPTURE AND IMAGE DISPLAY", L. ZHANG AND S. K. NAYAR, ACM TRANS. ON GRAPHICS, JULY 2006 | |

FIG. 28

ENHANCING IMAGING PERFORMANCE THROUGH THE USE OF ACTIVE ILLUMINATION

CROSS-REFERENCE TO RELATED APPLICATION

This application is continuation of U.S patent application Ser. No. 13/178,403 entitled "Enhancing Imaging Performance Through the Use of Active Illumination," filed on Jul. 7, 2011, the entire contacts of which is hereby incorporated by reference for all purposes.

TECHNICAL FIELD

The present disclosure relates to optical super resolution and depth estimation using structured illumination.

BACKGROUND

Images captured by an imaging system may lack depth information and have finite spatial resolution. The loss of depth information may be attributed to the projective nature of image capture, while the loss of resolution may be attributed to, for example, optical blurring.

SUMMARY

In some embodiments, the system of the present disclosure includes an illumination system operable to project a plurality of illumination patterns onto an object. The illumination patterns may define a spatial periodicity. The system may also include an imaging system comprising a position spatially disposed from the projector, the camera being operable to capture an image. The plurality of illumination patterns may have an orientation based on the position and orientation of the illumination system relative to the imaging system.

In some embodiments, a method for capturing images of a scene includes identifying a plurality of spatially periodic patterns. The plurality of spatially periodic patterns may be determined based on the spatial orientation of an illumination system relative to an imaging system. The method may also include illuminating the scene with the plurality of spatially periodic patterns using the illumination system. At least one image of the scene may be captured with the imaging system, and the at least one image may include a plurality of modulated components. The plurality of modulated components may be based on the spatially periodic patterns modulated by the scene. The method may also include identifying at least one modulation frequency for the at least one captured image and using the identified modulation frequency to demodulate the modulated components of the at least one image. The demodulated at least one image may then be stored.

In some embodiments, a perspective imaging apparatus may include a perspective illumination system capable of projecting a plurality of illumination patterns. The plurality of illumination patterns may define a spatial periodicity. The illumination system may include an illumination center of perspective and the perspective imaging apparatus comprising an imaging center of perspective. The imaging system may be spatially disposed from the illumination system such that imaging center of perspective and the illumination center of perspective define a baseline, the baseline having a direction. The spatial periodicity of the plurality of illumination patterns may be oriented in a direction orthogonal to the baseline direction.

In some embodiments, the apparatus may include a perspective illumination system having an illumination center of perspective, operable to project a plurality of illumination patterns. The plurality of illumination patterns may define a spatial periodicity oriented in the vertical direction. The apparatus may also include a perspective imaging system, which may have an imaging center of perspective horizontally disposed from the illumination center of perspective.

In some embodiments, the apparatus may include a perspective illumination system having an illumination center of perspective operable to project a plurality of illumination patterns. The plurality of illumination patterns may define a spatial periodicity oriented in the horizontal direction. The apparatus may also include a perspective imaging system having an imaging center of perspective vertically disposed from the illumination center of perspective.

In embodiments of the disclosure, a method for recovering spatial frequencies may include identifying an orientation of a periodic illumination pattern. The method may also include illuminating a scene with the periodic illumination pattern. The method may further include capturing at least one image of the scene, the periodic illumination pattern modulated by the scene, and capturing at least one raw image of the scene. A frequency of the pattern from the captured images may be identified. The method may also include generating the captured image of the scene under complex sinusoidal illumination and generating the raw image of the scene under uniform or ambient illumination. The generated modulated image may be demodulated and combined with the raw image.

In some embodiments, a method for recovering spatial frequencies may include identifying the infinite homography relating to an illumination system and an imaging system. An orientation of a periodic illumination pattern based on the identified homography may also be identified. The method may also include identifying at least one modulated image of the scene, the periodic illumination pattern modulated by the scene. At least one raw image of the scene may also be identified. The method may further include identifying a frequency of the modulating pattern from the identified modulated image. The at least one identified modulated image may be demodulated and combined with the at least one raw image.

In some embodiments, a method of synthesizing an optical transfer function may include identifying one or more frequencies of a periodic illumination pattern based on a shape and support of a desired optical transfer function. At least one modulated image of the scene may be identified, where the periodic illumination pattern may be modulated by the scene. The method may include identifying at least one raw image of the scene and demodulating the at least one modulated image. The raw image and the demodulated image may be combined.

In some embodiments, a method for realizing computational band-pass filtering may include identifying a frequency of a periodic illumination pattern based on a center frequency of a band-pass filter. An image of a scene may be identified under complex sinusoidal illumination. The identified image may be demodulated and stored.

In certain instances of the embodiments, the illumination system includes an illumination optical axis and an illumination center of perspective, and the imaging system includes an imaging optical axis and an imaging center of perspective. The illumination optical axis and the imaging optical axis may be parallel or substantially parallel. The imaging center of perspective may be vertically disposed relative to the illumination center of perspective, and the spatial periodicity of the plurality of illumination patterns may be oriented horizontally.

In certain instances of the embodiments, the illumination system includes an illumination optical axis and an illumination center of perspective, and the imaging system includes an imaging optical axis and an imaging center of perspective. The illumination optical axis and the imaging optical axis may be parallel or substantially parallel. The imaging center of perspective may be horizontally disposed relative to the illumination center of perspective, and the spatial periodicity of the plurality of illumination patterns may be oriented vertically.

In certain instances of the embodiments, the optical axes of the imaging and illumination systems are parallel or substantially parallel. The center of perspective of the imaging system and the center of perspective of the illumination system may be separated by a slanted or diagonal baseline, and the spatial periodicity of the plurality of illumination patterns may be oriented orthogonal to the diagonal baseline.

In certain instances of the embodiments, the optical axes of the imaging and illumination systems are not parallel, but the centers of perspective of the imaging and illumination systems are located in the same pupil plane. The spatial periodicity of the plurality of illumination patterns may be pre-warped such that the patterns appear periodic to the imaging system. The warping of the pattern is based on the "orientation" of the imaging system relative to the illumination system. For example, in certain embodiments, the imaging system's center of perspective may be disposed horizontally from that of the illumination system. In such an instance, the pattern may be pre-warped such that the orientation of the spatial pattern appears periodic in the vertical direction when viewed by the imaging system. In certain instances, the center of perspective of the imaging system is vertically disposed relative to that of the illumination system. The spatial pattern may be pre-warped such that when viewed by the imaging system, it has a horizontal periodicity.

In certain instances of the embodiments, the imaging system and the illumination system may share an optical axis.

In certain instances of the embodiments, the spatial periodicity of the illumination patterns may be oriented horizontally.

In certain instances of the embodiments, the spatial periodicity of the illumination patterns may be oriented vertically.

In certain instances of the embodiments, the spatial periodicity of the illumination patterns may be oriented at an arbitrary angle relative to the horizontal.

In certain instances of the embodiments, the system and/or apparatus may further include a processor operable to perform operations. Such operations may include receiving one or more captured images from the camera. The operations may also include identifying a modulating frequency component for the one or more captured images and using the modulation frequency to demodulate the one or more captured images based on the modulation frequency. The processor may identify un-modulated components for the one or more captured images and combine the un-modulated components of the captured image with the demodulated components of the captured image.

In certain instances of the embodiments, the illumination system may be a first illumination system and the plurality of illumination patterns may be a first plurality of illumination patterns. The system may further include a second illumination system capable of projecting a second plurality of illumination patterns onto an object. The orientation of the plurality of illumination patterns may be based on the position and orientation of the second illumination system relative to the imaging system.

In certain instances of the embodiments, an un-modulated image of the scene may be identified. The un-modulated image may be combined with the demodulated image to form a combined image. The resulting combined image may be stored.

In certain instances of the embodiments, identifying the at least one modulated image of the scene may include capturing the at least one modulated image of the scene.

In certain instances of the embodiments, identifying the at least one modulated image of the scene may include generating the image of the scene under complex sinusoidal illumination.

In certain instances of the embodiments, identifying the at least one raw image of the scene may include capturing at least one raw image of the scene under uniform or ambient illumination.

In certain instances of the embodiments, raw image of the scene may be identified from the modulated images.

In certain instances of the embodiments, aliasing management may be performed on the at least one image.

In certain instances of the embodiments, identifying a modulation frequency may include calculating a Fourier transform of the at least one image, and determining one or more modulation frequencies from the Fourier transform of the at least one image.

In certain instances of the embodiments, aliasing management may be performed to capture recovered spatial frequencies.

In certain instances of the embodiments, the illumination pattern may be pre-warped based on the infinite homography relating to an illumination system and an imaging system.

In certain instances of the embodiments, identifying an image of the scene may include synthesizing an image of the scene.

In certain instances of the embodiments, identifying an image of the scene may include capturing an image of the scene under uniform or ambient illumination.

In certain instances of the embodiments, identifying the at least one modulated image of the scene may include capturing the at least one modulated image of the scene.

In certain instances of the embodiments, identifying the at least one raw image of the scene comprises capturing at least one raw image of the scene.

In certain instances of the embodiments, identifying the at least one modulated image of the scene comprises generating the image of the scene under complex sinusoidal illumination.

In certain instances of the embodiments, identifying the at least one raw image of the scene comprises generating raw image of the scene under uniform or ambient illumination.

The details of one or more embodiments described in the present disclosure are set forth in the accompanying drawings and the description below. Other features, objects, and advantages of the present disclosure will be apparent from the description, drawings, and claims.

DESCRIPTION OF DRAWINGS

FIG. 1D is a table showing example configuration parameters for parallel and non-parallel embodiments of the present disclosure.

FIG. 28 is an table showing parameters for the various collocated and coincident camera+projector configurations.

DETAILED DESCRIPTION

This disclosure relates, in general, to devices, systems, and methods for the use of Structured Illumination (SI) in simultaneously overcoming the band-limited nature of an imaging system Optical Super Resolution (OSR) and recovering topographic information (Active Scene Recovery).

Amplitude modulation that results from the multiplicative superposition (product/modulation) of the illumination pattern and the spatial detail in the scene informs the use of Structured Illumination to realize OSR. The superposition produces sum and difference frequency components, the latter of which is useful for realizing OSR.

Figure 18:
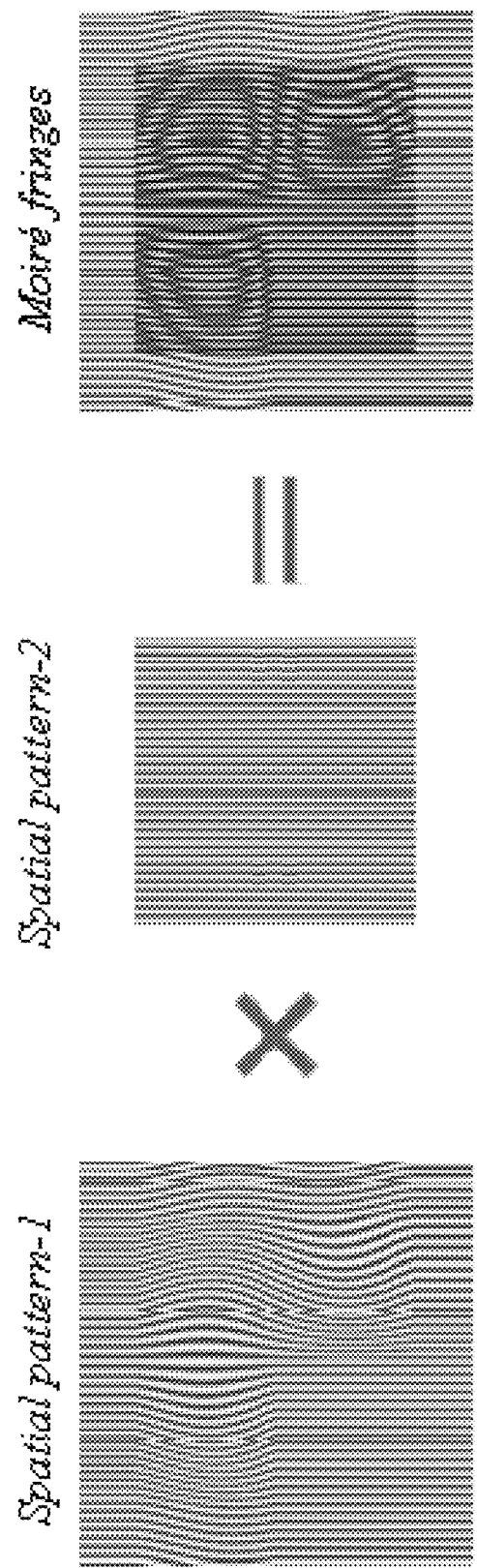
FIG. 18 is a graphical illustration of multiplicative superposition of two spatial patterns.
Figure 19:
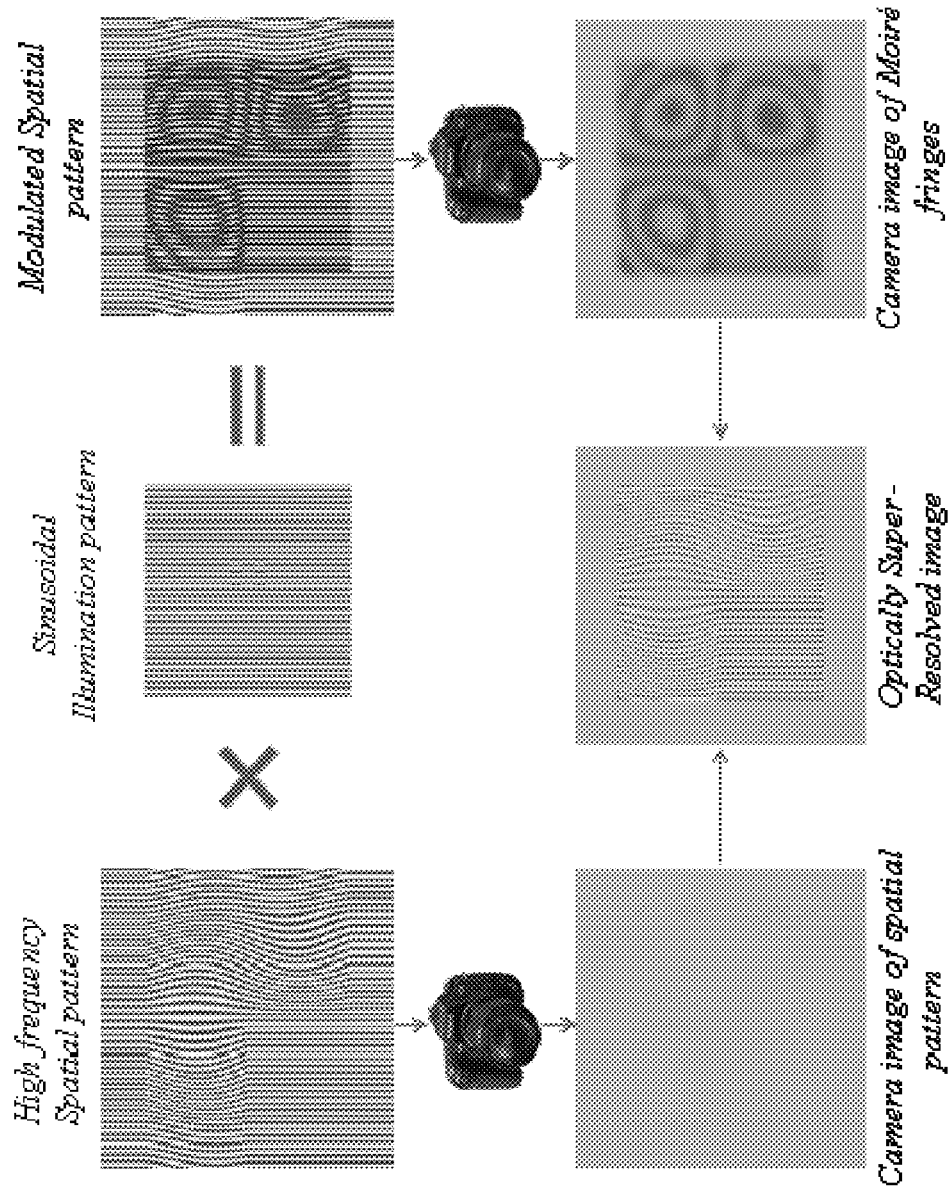
FIG. 19 is a graphical illustration of a principle underlying Optical Super Resolution using structured illumination.

FIG. 18 is a graphical illustration of multiplicative superposition of two spatial patterns. Amplitude modulation may result from the multiplicative superposition (product/modulation) of, e.g., two spatial patterns, such as those shown in FIG. 18. The superposition produces sum and difference frequency components, the latter of which is useful for realizing OSR. FIG. 18 illustrates this principle. The camera is unable to resolve the fine spatial detail in Spatial pattern-1, due to is band-limited nature. FIG. 19 is a graphical illustration of a principle underlying Optical Super Resolution using structured illumination. Modulation of the high-frequency spatial pattern by a sinusoidal pattern produces low frequency Moiré fringes (difference frequencies) that are visible to (resolved by) the camera, and evident in row 2 of FIG. 19. If the frequency of the sinusoidal pattern is known, the frequency of the invisible spatial pattern can be deduced from the frequency of the captured Moiré fringes. The result is shown in the row 2 and column 2 inset of FIG. 19. As a result of the modulation, the camera is able to resolve spatial detail that was previously unresolved.

The sinusoidal pattern in the above example represents the Structured Illumination pattern, while the high-frequency spatial pattern represents unresolved spatial detail in the scene. The product of the patterns produces low-frequency Moiré fringes that assist in facilitating resoling spatial detail beyond the optical cutoff.

SI-OSR techniques developed for microscopy do not apply to a broader class of imaging systems such as consumer cameras. The reason is microscopes are designed to behave as orthographic imaging systems in which the apparent size of objects does not change with its depth and/or position within the field-of-view. In contrast, a vast majority of imaging systems are perspective devices plagued by viewpoint-dependent foreshortening. Consequently, the act of observing a scene illuminated by a sinusoidal pattern is not sufficient to realize strict amplitude modulation from the camera viewpoint.

A camera observing a scene illuminated by a known spatial pattern (e.g., periodic pattern, coded light pattern, single light stripe) notices phase distortions in the pattern induced by topographic variations in the scene. Methods for active scene recovery extract topographic information from these distortions.

The following paragraphs describe one of several camera-projector arrangements that can recover spatial detail past the camera optical cutoff and recover topographic information (in some cases, simultaneously).

Figure 21:
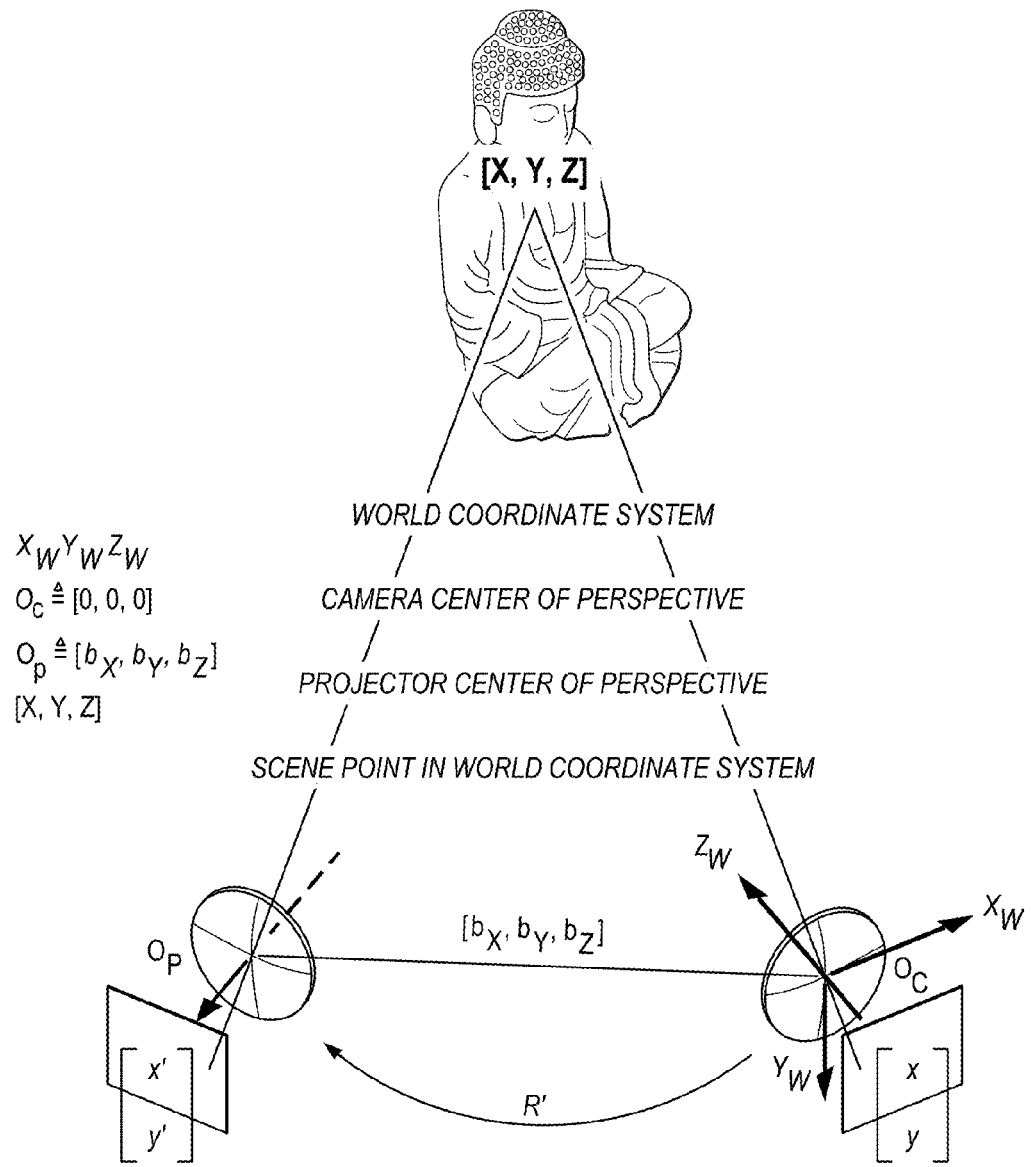
FIG. 21 is a schematic showing a specific camera+projector arrangement designed to super-resolve and recover topographic information.

FIG. 21 is a schematic showing a specific camera+projector arrangement designed to super-resolve and recover topographic information. The points $O_c$ and $O_p$, in the figure represent the camera and projector center-of-perspective (COP) respectively. Points in the 3D scene are described in a world coordinate system (WCS) that is aligned with the camera coordinate system, and centered at $O_c$. The matrix R' represents the rotation matrix that aligns the WCS with the projector coordinate system. The projector and camera image planes are located at distances $Z_p$, $Z_c$ behind the respective COP's. The values $s_p$, $s_c$ represent the size of the projector and camera pixel in millimeters. The values ($c_x$, $c_y$), ($c'_x$, $c'_y$) represent the projection of the camera and projector COP onto the respective image planes. Alternately, they represent the point of intersection of the camera and projector optical axes, with the respective image planes. $M_p \times N_p$, $M_c \times N_c$ (rows×columns) represent the size of the projector and camera images in pixels. The values (x, y), (x', y') represent projections of the scene point (X, Y, Z) onto the camera and projector image planes. The matrices K, K' represent the intrinsic calibration matrices of the camera and projector, respectively. These matrices are comprised of quantities such as the magnification ($Z_c/s_c$, $Z_p/s_p$) and ($c_x$, $c_y$), ($c'_x$, $c'_y$), among other things.

Figure 23:
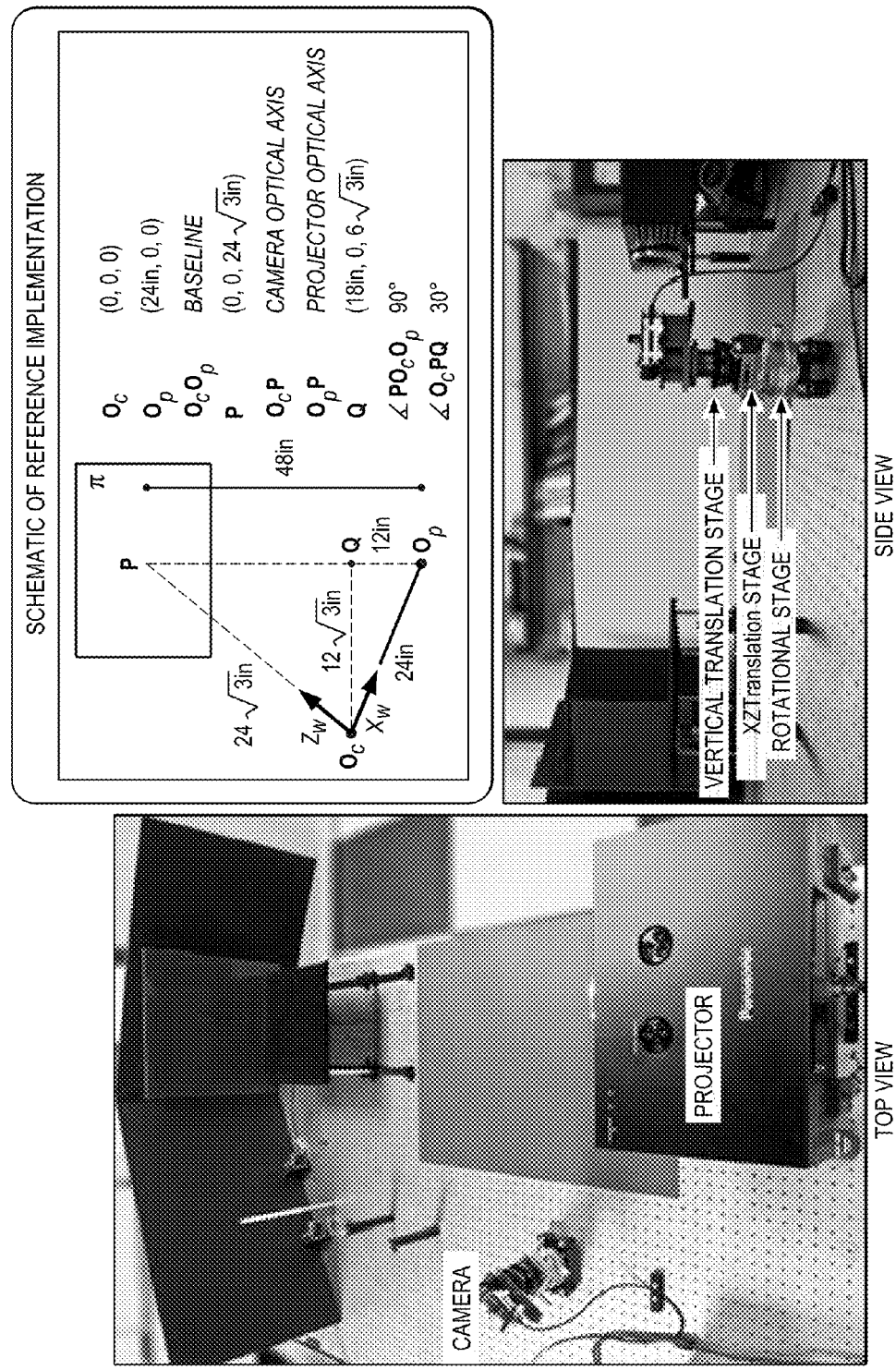
FIG. 23 is an illustration of a collocated camera/projector configuration.

The term "collocated active stereo setup" is used in this disclosure to refer to camera+projector arrangements in which the line joining the center-of-perspective of the two devices $O_c O_p$ is (substantially) parallel to the camera image plane. In FIG. 21, the camera+projector arrangement is collocated when $b_z=0$. FIG. 23 is an illustration of a collocated camera/projector configuration. FIG. 23 shows a reference implementation of a collocated stereo setup that can simultaneously realize OSR and recover topographic information. The optical axes of the camera and projector subtend an angle of 30 degrees. The camera projector baseline is 24 inches. Example configuration is described below:

| Projector | Camera |
| --- | --- |
| Panasonic AE-3000U | Sumix 11M5M + 16-mm Computar lens |
| Image size 1400 × 1050 | Aperture settting: F/#10 |
| | Optical cutoff: 180 line-pairs/mm in the camera image plane |

A camera in a collocated active stereo setup may observe a three-dimensional scene under the following illumination:

$$s_\theta(x', y') = \frac{A}{2} + \frac{A}{2}\sin\left(\frac{2\pi}{h_{31}x' + h_{32}y' + h_{33}}\left[\frac{\xi_0}{N_p} \frac{\eta_0}{M_p} 0\right]\right.$$
$$\left.\underbrace{\begin{bmatrix} h_{11} & h_{12} & h_{13} \\ h_{21} & h_{22} & h_{23} \\ h_{31} & h_{32} & h_{33} \end{bmatrix}}_{H}\begin{bmatrix} x' \\ y' \\ 1 \end{bmatrix} + \theta\right), \quad \text{Eqn. (1)}$$

where warping matrix H =

-continued $$\begin{cases} KR'^T K'^{-1} = (H_{p2c}^\infty) \text{ when the optical axes of} \\ \quad \text{camera \& projector are not parallel} \\ I_3 \text{(identity matrix) when the optical axes of} \\ \quad \text{camera \& projector are parallel} \end{cases}$$

$\theta$ is the phase offset in radians $N_p, M_p$: number of rows and columns in the projected image $\xi_0, \eta_0$: spatial frequency of the illumination pattern The matrix H in Eqn. (1) describes the manner in which the illuminating pattern is warped to accommodate the angular disparity in the camera and projector viewpoints. The matrix $H_{p2c}^\infty = KR'^T K'^{-1}$ denotes the infinite homography that relates the projector and camera views. The expression for the image captured by the camera under the illumination of Eqn. (1) is given by:

$$i_\theta(x,y) = [A_{0,0,z} r(x,y) \otimes h(x,y)] + i_{ambient}(x,y) + A_{\xi_0,\eta_0,z} \sin(\varphi(x,y)+\theta) r(x,y) \otimes h(x,y) \quad \text{Eqn. (2), where:}$$

$A_{0,0,z}$, $A_{\xi_0,\eta_0,z}$ effect of projector defocus on frequencies (0, 0) and ($\xi_0$, $\eta_0$)

$r(x,y)$ intensity loss along $(x', y') \to (X, Y, Z) \to (x, y)$ due to material properties $h(x, y)$ optical blur kernel The first two terms in Eqn. (2) represent the image captured by the camera under a combination of ambient illumination and uniform projector illumination. The last term in Eqn. (2) represents the image captured by the camera under structured illumination (e.g., sinusoidal illumination). The expression for the instantaneous phase of the sinusoidal pattern, as perceived by the camera, is given below:

$$\varphi(x, y) = \underbrace{\left[2\pi K_o \left(\frac{\xi_0}{N_p} x + \frac{\eta_0}{M_p} y\right)\right]}_{\text{LINEAR PHASE}} + \underbrace{\boxed{\varphi_0}}_{\text{CONST.}} + \underbrace{\left[2\pi \frac{1}{Z} K_d \left(\frac{\xi_0}{N_p} c_x + \frac{\eta_0}{M_p} b_Y\right)\right]}_{\text{SCENE-DEPENDENT PHASE}}, \quad \text{Eqn. (3)}$$

where
optical axes of camera and projector are not parallel $\kappa_0=1$, $\varphi_0=0$, $$K_d = \frac{Z_p}{s_p},$$

optical axes of camera and projector are parallel $$K_o = \frac{Z_p s_c}{s_p Z_c},$$

$$\varphi_0 = 2\pi \left(\frac{\xi_0}{N_p} c'_x + \frac{\eta_0}{M_p} c'_y\right) - 2\pi K_o \left(\frac{\xi_0}{N_p} c_x + \frac{\eta_0}{M_p}\right), K_d = \frac{Z_p}{s_p}$$

Careful examination of Eqn. (3) reveals that the camera observes a scene-dependent modulation in the amplitude and phase of the captured illumination pattern. In isolation, each of these components provides the basis for realizing OSR and scene recovery in a collocated active stereo setup.

It follows from Eqn. (1) that when the orientation of the baseline vector is orthogonal to the orientation of the illumination pattern, i.e., $$\left(\frac{\xi_0}{N_p} b_X + \frac{\eta_0}{M_p} b_Y\right) = 0$$

Figure 22:
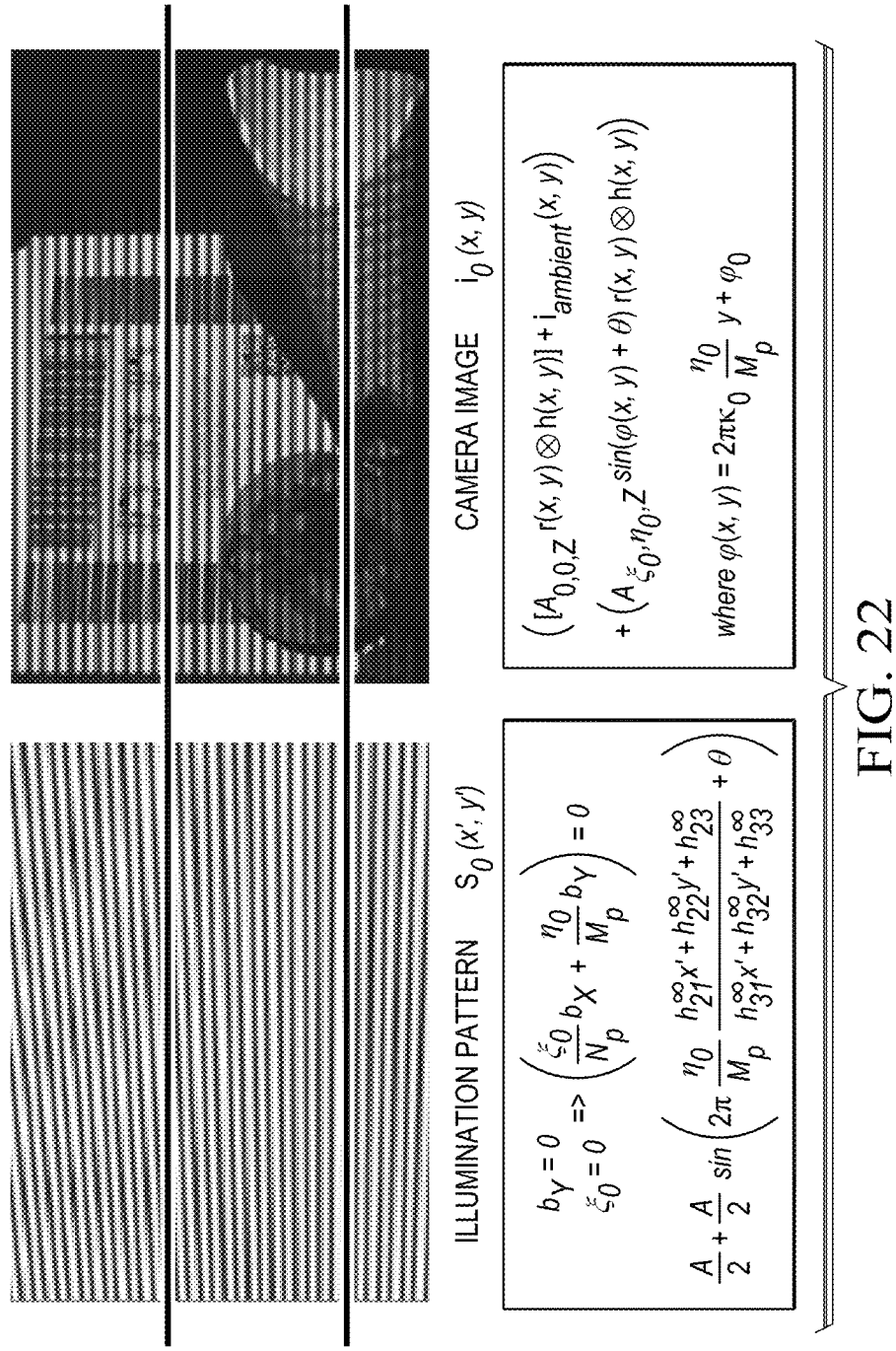
FIG. 22 is an example camera image from a horizontally collocated camera/projector arrangement.

(pattern orientation constraint), the illumination pattern as perceived by the camera does not exhibit any scene-dependent phase distortion. FIG. 22 is an example camera image from a horizontally collocated camera/projector arrangement. FIG. 22 illustrates this behavior for a horizontally collocated setup ($b_Y=b_Z=0$) in which the optical axes of the camera and projector are not parallel.

Equation (3) reveals that illumination pattern as perceived by the camera is periodic and undistorted, despite the fact that the illuminating pattern is warped and aperiodic. In this case, the camera strictly perceives the amplitude of the periodic pattern as being modulated by spatial detail in the scene. The camera image $i_\theta(x, y)$ contains spatial frequencies past the optical cutoff, due to the sinusoidal amplitude modulation.

Figure 24:
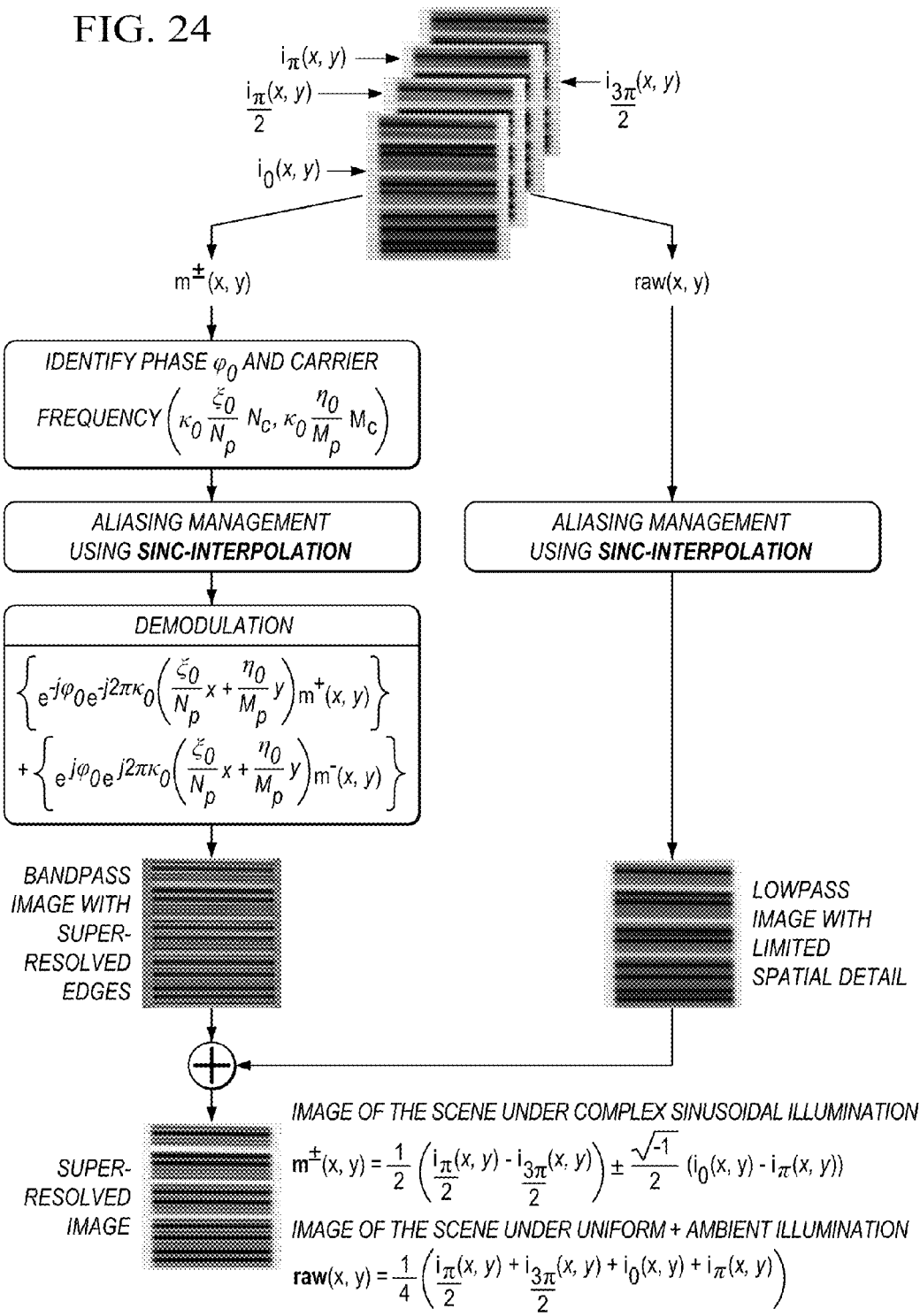
FIG. 24 is a workflow for Optical Super Resolution using Structured Illumination.
Figure 27:
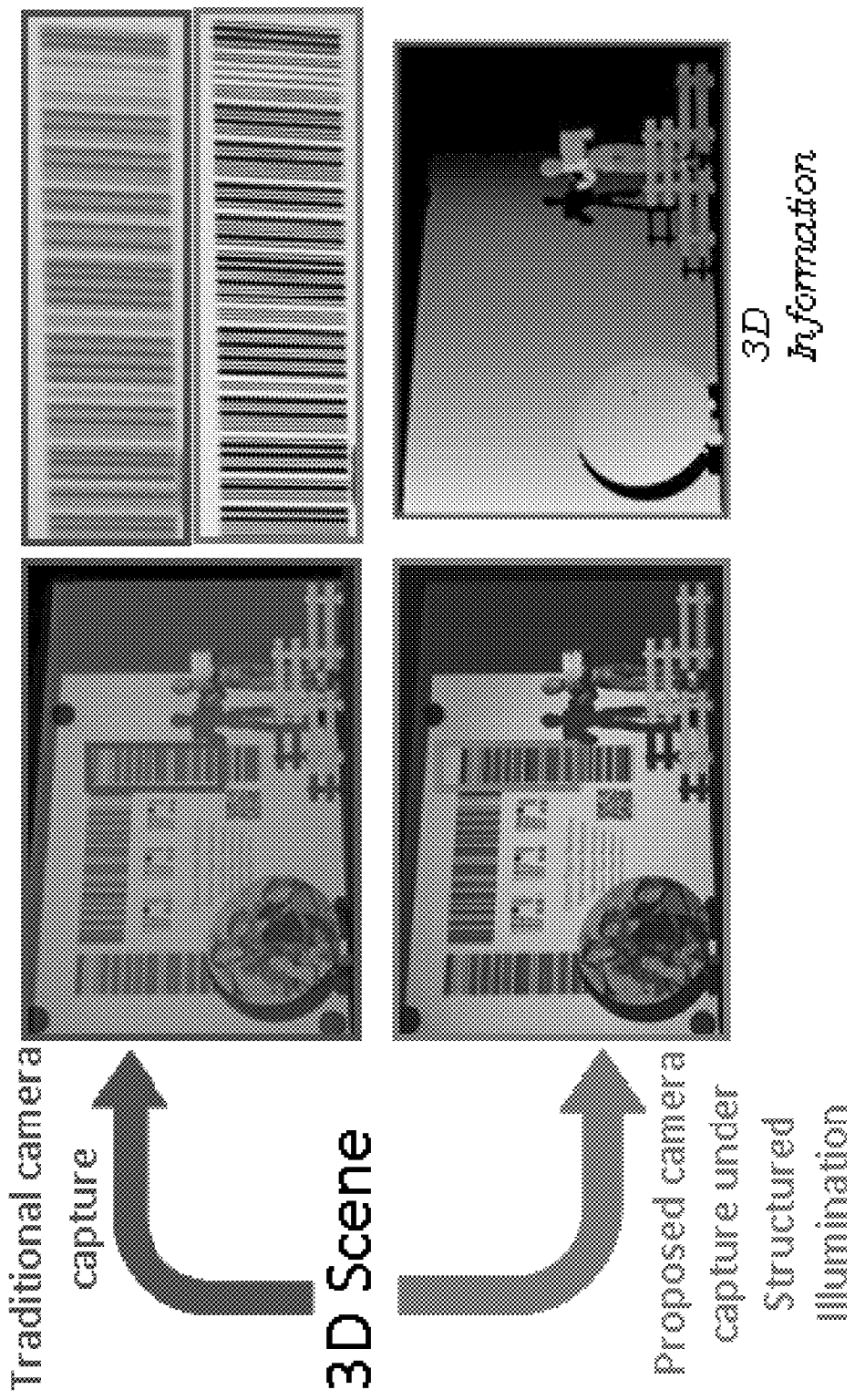
FIG. 27 is an illustration of a result of Optical Super Resolution and scene recovery in the reference implementation illustrated in FIG. 23.

To identify the super-resolved image, the modulated spatial frequencies are restored to their rightful position. The process entails identifying the carrier frequency $$\left(K_o \frac{\xi_0}{N_p} N_c, \frac{\eta_0}{M_p} M_c\right),$$

the complex constant $\varphi_0$, and image interpolation to avoid aliasing during demodulation. FIG. 24 illustrates this process. FIG. 24 is a workflow for Optical Super-Resolution using Structured Illumination. The result of Optical Super-Resolution in the reference implementation of FIG. 23 is shown in FIG. 27. FIG. 27 is an illustration of a result of Optical Super Resolution and scene recovery in the reference implementation illustrated in FIG. 23.

Figure 25:
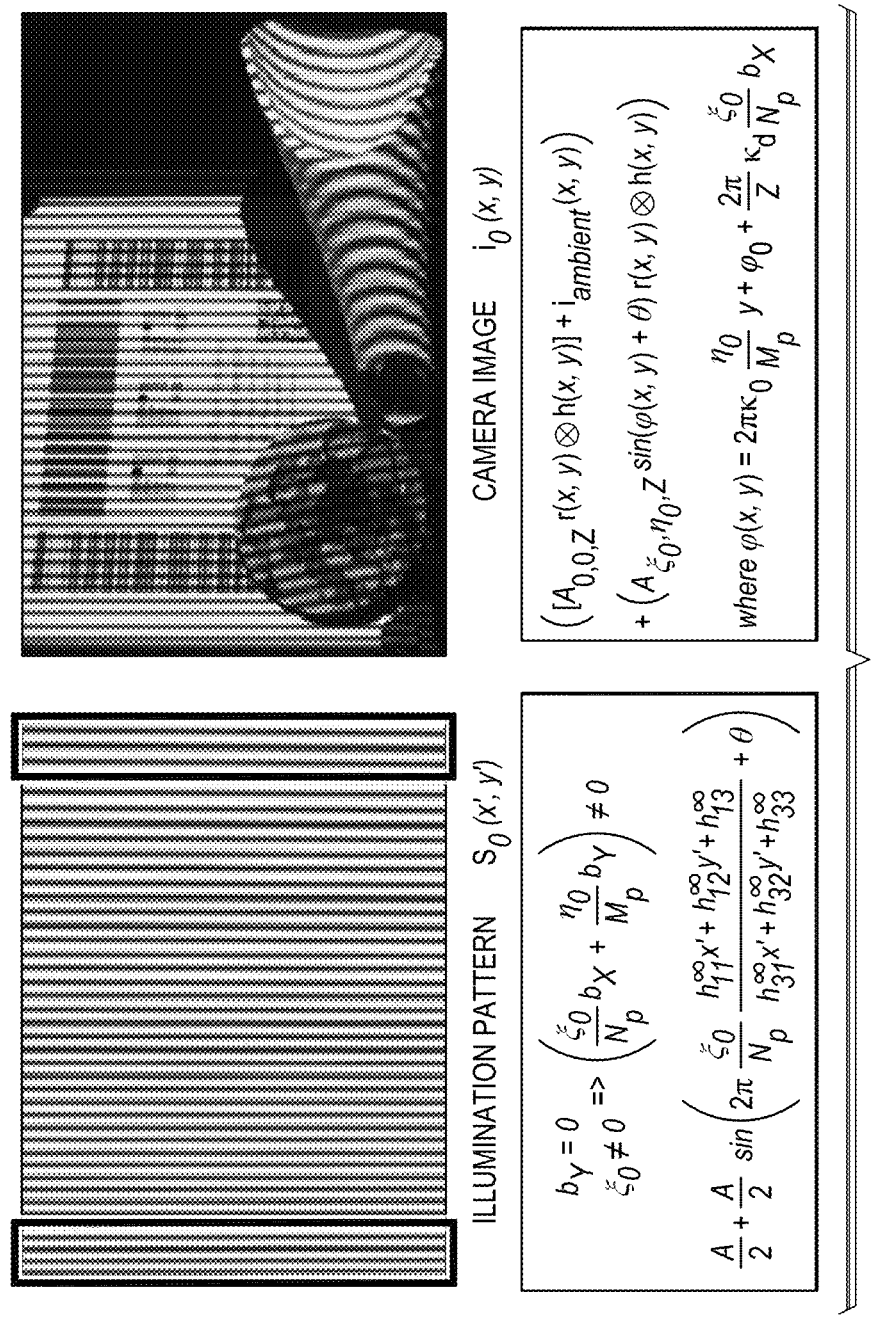
FIG. 25 is an illustration of an illumination pattern and a camera image in a horizontally collocated camera+projector arrangement, where the orientation of the projected illumination pattern does not satisfy the pattern orientation constraint.

It follows from Eqn. (3) that when the orientation of the baseline vector is not orthogonal to (e.g., is aligned with) the orientation of the illumination pattern, i.e., $$\left(\frac{\xi_0}{N_p} b_X + \frac{\eta_0}{M_p} b_Y\right) \neq 0,$$

the illumination pattern as perceived by the camera exhibits scene-dependent phase distortion. FIG. 25 is an illustration of an illumination pattern and a camera image in a horizontally collocated camera+projector arrangement, where the orientation of the projected illumination pattern does not satisfy the pattern orientation constraint. FIG. 25 illustrates this behavior for a horizontally collocated setup ($b_Y=b_Z=0$) in which the optical axes of the camera and projector are not parallel. Careful examination of FIG. 25 reveals that the illuminating pattern is warped and aperiodic, unlike traditional methods for active scene recovery. The warping reduces the fringe overcrowding resulting from the angular disparity in the camera and projector viewpoints. FIG. 25 shows the camera image in a horizontally collocated camera/projector arrangement, where the orientation of the projected pattern does not satisfy the pattern orientation constraint.

Figure 26:
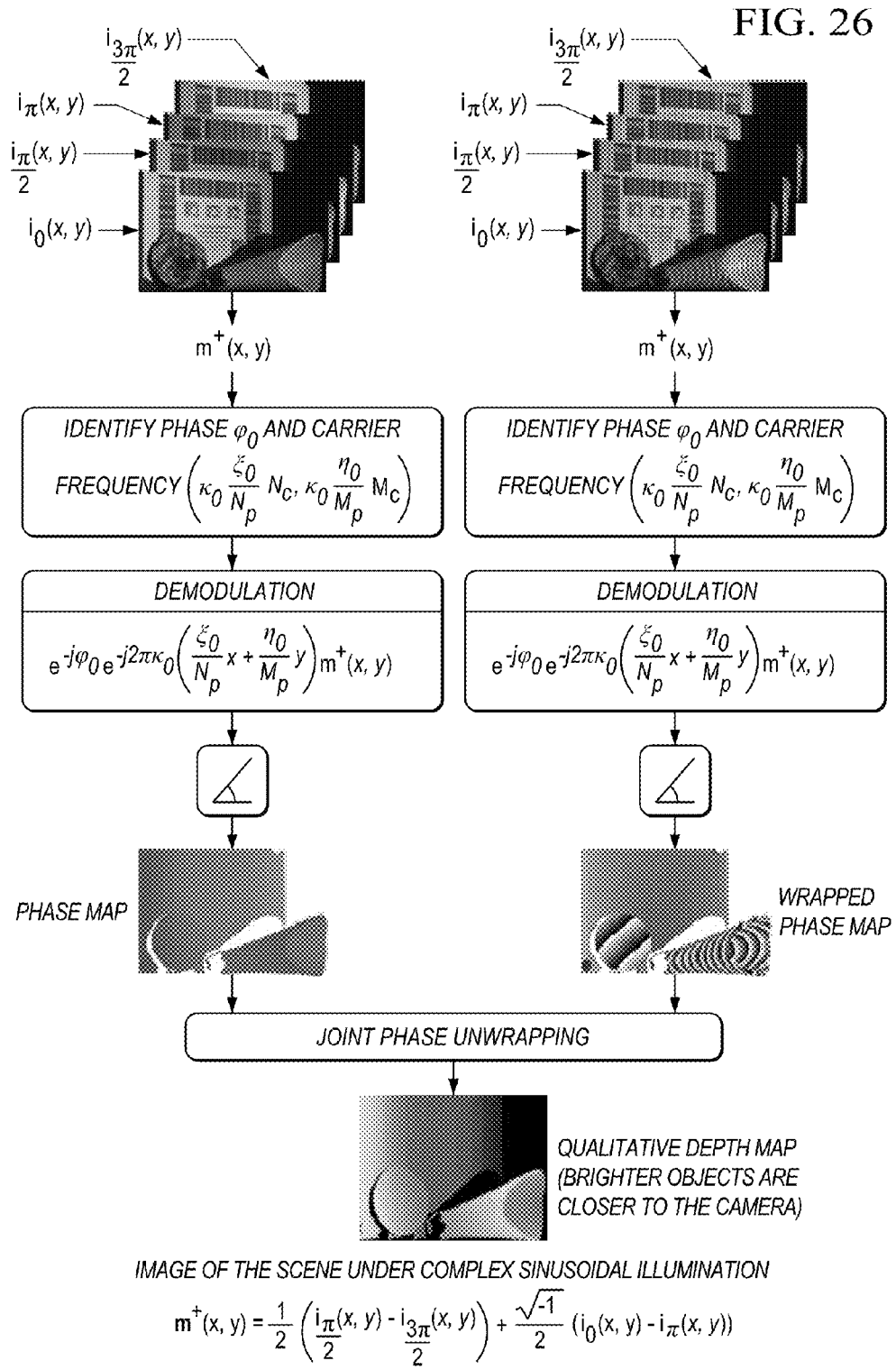
FIG. 26 is an example workflow for recovering topographic information using Structured Illumination.

The key step in recovering topographic information is identifying the term $$\frac{2\pi}{Z} K_d \left( \frac{\xi_0}{N_p} b_X + \frac{\eta_0}{M_p} b_Y \right)$$

that depends on the depth of each scene point. The process entails identifying the carrier frequency $$\left( K_o \frac{\xi_0}{N_p} N_c, \frac{\eta_0}{M_p} M_c \right),$$

the complex constant $\varphi_0$, and phase unwrapping. FIG. 26 is an example workflow for recovering topographic information using Structured Illumination. The result of scene recovery in the reference implementation of FIG. 23 is shown in FIG. 27. Other techniques for active scene recovery can be used in lieu of the method suggested above.

FIG. 28 is an table showing parameters for the various collocated and coincident camera+projector configurations. FIG. 28 also shows example spatial periodicities for OSR and depth recovery for the collocated configurations. FIG. 28 lists camera+projector arrangements and spatial periodicities of illumination patterns that can realize OSR, and recover topographic information (in some cases, simultaneously).

This disclosure relates, in general, to devices, systems, and methods for achieving Optical Super Resolution (OSR) using structured illumination. In embodiments, the devices, systems, and methods of implementing and achieving OSR overcome the fundamental limit on the resolution of an imaging system without altering its physical parameters.

Figure 9:
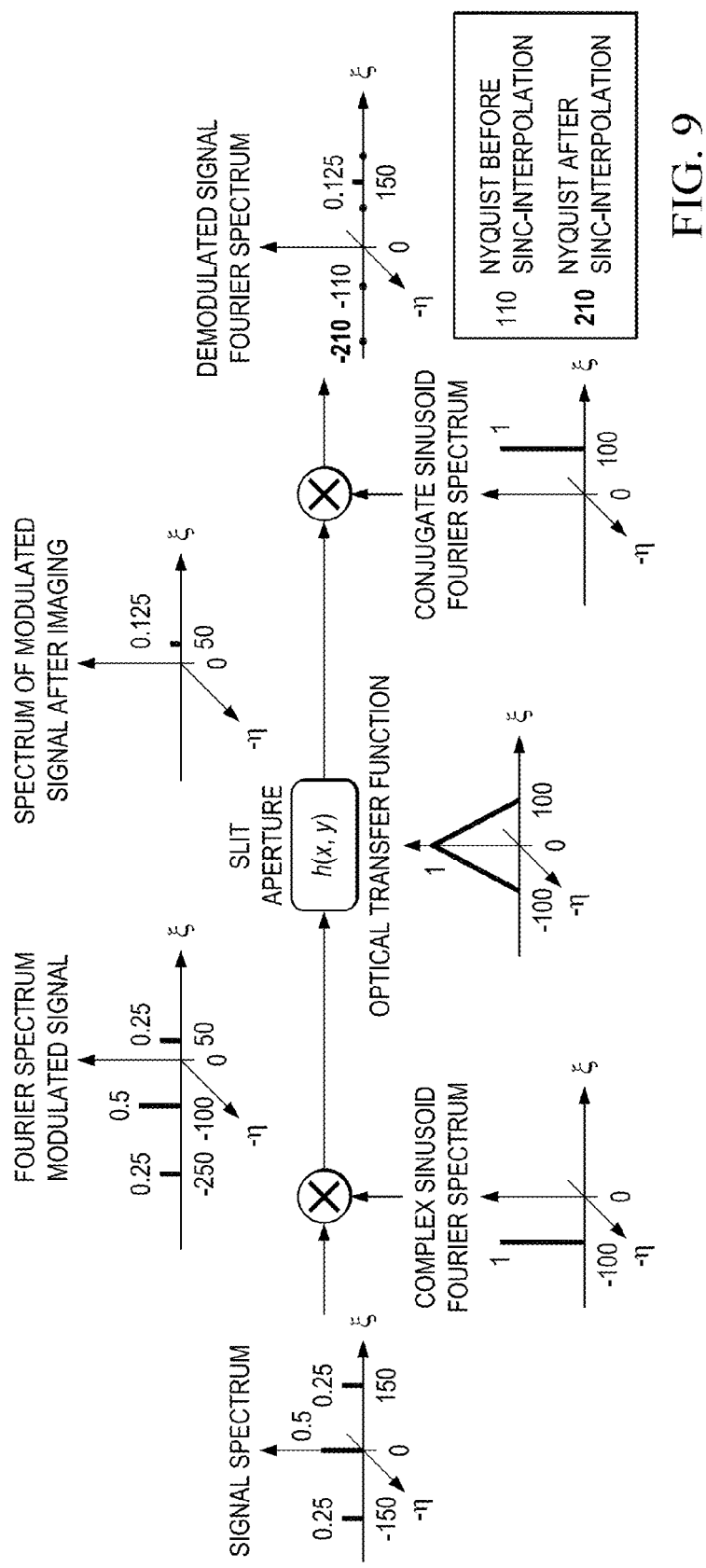
FIG. 9 is a process flow diagram illustrating, by way of example, Structured Illumination based Optical Super Resolution, for an imaging system with a slit aperture in accordance with the present disclosure.

The OSR systems, methods, and apparatuses described in the present disclosure strive to resolve spatial detail exceeding the optical passband by illuminating the scene with structured light patterns. The term "optical passband" is known to those of ordinary skill in the art and may be understood to mean the set of spatial frequencies that are permitted by the imaging system. FIG. 9, for example, illustrates how spatial frequencies outside the optical passband may be filtered by the optical transfer function associated with, for example, a slit aperture. The optical transfer function acts as a low pass filter with a cutoff frequency of |fx|=100. Spatial frequencies located at |fx|=150 in the example signal spectrum are filtered out by the optical transfer function associated with the slit aperture.

FIG. 9 is a process flow diagram illustrating, by way of example, Structured Illumination based Optical Super Resolution, for an imaging system with a slit aperture in accordance with the present disclosure. FIG. 9 illustrates the process flow for an OSR process illustrating the Fourier spectra of a signal having a DC component and a sinusoidal component. The signal spectrum includes peaks at DC in addition to a peak at |fx|=150. The optical transfer function specifies a passband limited to |fx|=100. As a result, the spatial frequency component at |fx|=150, with peaks outside the passband will not be captured by the camera. A complex sinusoid may be used to modulate the object spectrum, shifting the high frequency components within the passband. In FIG. 9, this operation is represented in the Fourier spectrum of the modulated signal. In the example, the peaks are shifted to the left (−fx), such that the peak at fx=150 is now at ft=50, and within the passband of the optical transfer function. The remainder of the information shown in the Fourier spectrum in FIG. 9 is outside the passband, and is essentially filtered out. The modulated object spectrum may be demodulated using the conjugate of the sinusoid used during modulation. An example complex sinusoid Fourier transform and its conjugate are shown in FIG. 9. After computational demodulation, the peak may be seen in the Fourier spectrum as residing at the original frequency, prior to the modulation and imaging. These high frequency peaks correspond to an increase in the resolution of the image (i.e., Optical Super Resolution). In the event that the demodulated frequency exceeds the Nyquist frequency of the camera sensor, it will appear aliased after demodulation.

Further, FIG. 9 illustrates aliasing management based on sinc-interpolation to expand the Nyquist band to encompass the frequencies now present in the super-resolved image. Sinc-interpolation, for example, addresses issues with aliasing that may arise when the demodulated spatial frequencies exceed the Nyquist frequency of the imaging system.

The principle underlying the proposed method for OSR is the ability to modulate the amplitude of a periodic pattern with scene information. In particular, modulating the amplitude of a sinusoid with scene information prior to imaging by a camera allows the camera to directly capture spatial frequencies that exceed the bandwidth of the camera lens assembly. Demodulation (performed either within the camera or external to the camera) restores the modulated spatial detail to its rightful spatial frequency. The demodulated and the raw image captured by the camera may be combined to obtain the super-resolved image. The modulated image containing band pass information may be useful on its own for applications such as fingerprint matching. The proposed structured illumination OSR scheme can be used to realize computational band-pass filtering, as illustrated in FIG. 12B. FIG. 12B is a schematic illustrating the shift in spatial frequency for computational band-pass filtering. Thus, the band pass images (i.e., the modulated images) may be used without combining them with the raw image data.

Figure 3A:
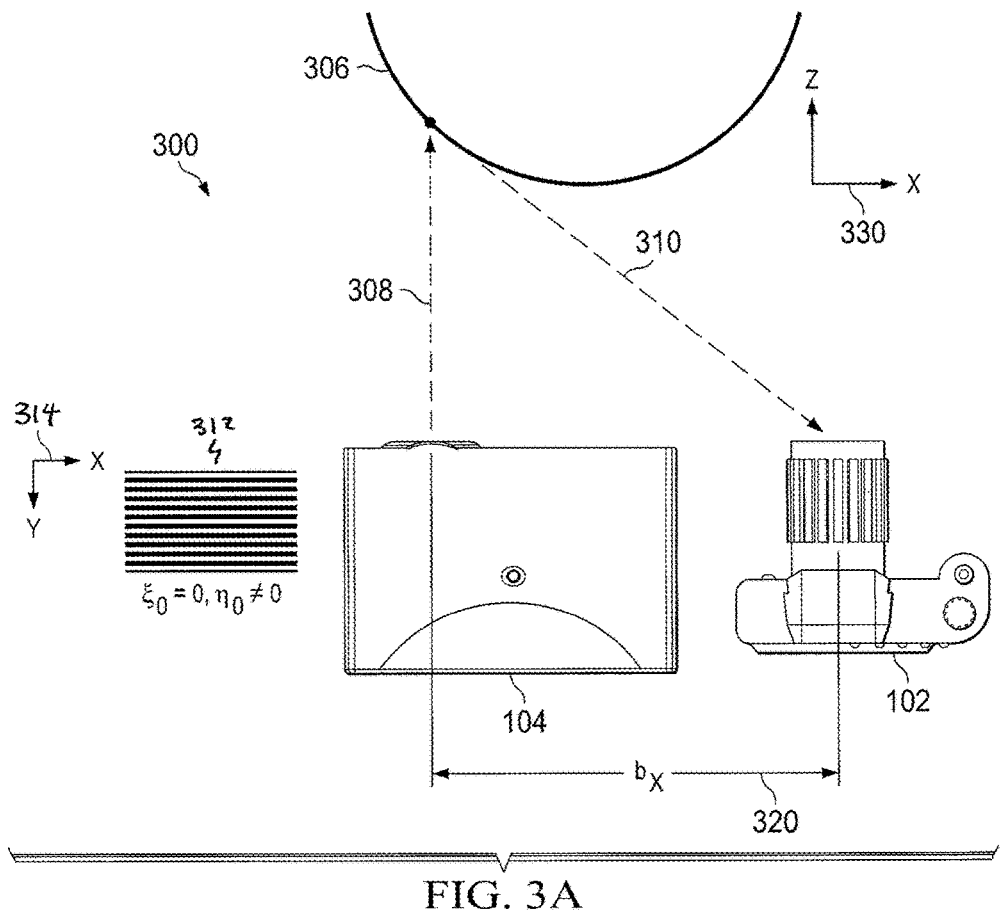
FIG. 3A is a schematic illustrating a system for achieving structured illumination Optical Super Resolution using a camera horizontally collocated with a projector in accordance with embodiments of the present disclosure.

The proposed method realizes complex sinusoidal modulation by illuminating the scene with a series of phase shifted patterns. The difference in viewpoint between the imaging and illumination systems may induce scene dependent frequency+phase distortion in the observed periodic pattern, affecting the ability to realize pure amplitude modulation. For example, FIG. 3C is a schematic illustrating scene dependent distortion in the projected pattern as seen by the camera, due to the difference in the camera and projector viewpoints. FIG. 3C illustrates the resulting distortion in an observed periodic pattern based on the difference in view point between a camera and a projector. The present disclosure reveals a family of camera+projector arrangements and illumination patterns, which can be used to realize pure amplitude modulation, independent of scene geometry.

Figure 1A:
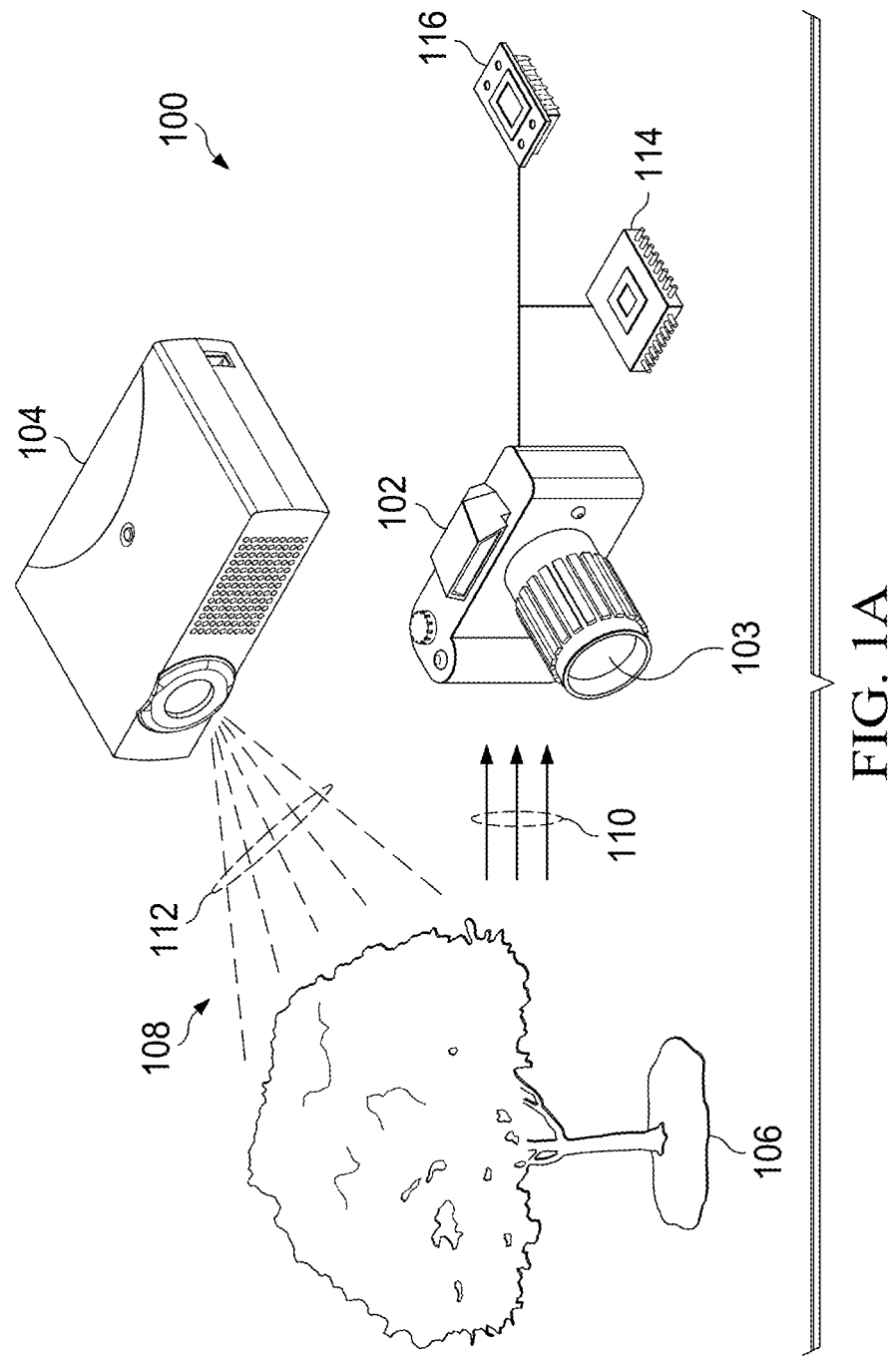
FIG. 1A is a schematic illustrating a system for achieving structured illumination Optical Super Resolution in accordance with embodiments of the present disclosure.

FIG. 1A is a schematic illustrating a system for achieving structured illumination Optical Super Resolution in accordance with embodiments of the present disclosure. FIG. 1A is a schematic illustrating system 100, which includes an imaging device 102 and an illumination system 104. FIG. 1A illustrates the imaging system as a camera, but it is to be understood that the imaging system 102 may be any imaging device. Illumination system 104 is shown in FIG. 1A as a projector, but could be any illumination system capable of projecting spatial patterns In embodiments, the structure of the illumination patterns may be configured or selected by a user. For the sake of brevity, the term "illumination system" may be used interchangeably with the word "projector." It is to be understood that the illumination system may be any illumination system capable of projecting spatial patterns onto a scene, and the use of the term "projector" is not meant to limit the scope of the present disclosure. Likewise, the term "imaging system" may be used interchangeably with the word "camera" throughout this disclosure without deviating from the scope of the claims. FIG. 1A illustrates illumination system 104 projecting structured light 108 onto an object 106. Object 106 is the subject of a scene to be captured by camera 102, and may be of arbitrary shape and size. The light 108 projected by the illumination system 104 may be incoherent light or coherent light, and includes structured patterns 112. In embodiments, the structured patterns 112 may be a sinusoid, such as those that can be combined to yield a complex sinusoid during processing. An example is to successively project raised sine and cosine patterns (e.g., $0.5\pm0.5 \sin(2\pi\xi_0 x)$, $0.5\pm0.5 \cos(2\pi\xi_0 x)$), and digitally recombine the results using Euler's formula, to realize complex sinusoidal modulation. In embodiments, the patterns may be any set of patterns such that the algebraic combination of the corresponding images results in a modulation of scene information exceeding the optical cutoff, to within the optical passband, which can subsequently be demodulated. Further, the structured patterns may be oriented horizontally or vertically, or may be oriented at an angle relative to the horizontal, consistent with the disclosure below. In addition, the structured patterns may be a bi-level periodic pattern (such as square wave) with the same periodicity as the desired sinusoidal patterns.

In embodiments, camera 102 may have components including, but not limited to, a lens 103 and an image sensor (not shown), and may also include internal processing 114 and memory 116. Camera 102 may be tethered, connected to, or integrated into another electronic device, such as a personal computer ("PC") or a personal communications device, such as a cellular phone, smart phone, personal digital assistant, BLACKBERRY®, iPhone, etc. As such, certain components, such as a processor 114 or memory 116 may be external to the camera unit but in communication therewith. FIG. 1A illustrates the camera 102 and projector 104 as located separately from one another, but a plurality of camera/projector configurations are contemplated by this disclosure including, but not limited to, configurations where the camera and projector are integrated into a single device or housing. Camera 102 is shown as a hand-held, personal camera, but it is to be understood that camera 102 may be any camera capable of capturing one or more images of a scene. Further, camera 102 may be a monochrome camera or a color camera and may be a digital or analog camera.

Figure 1B:
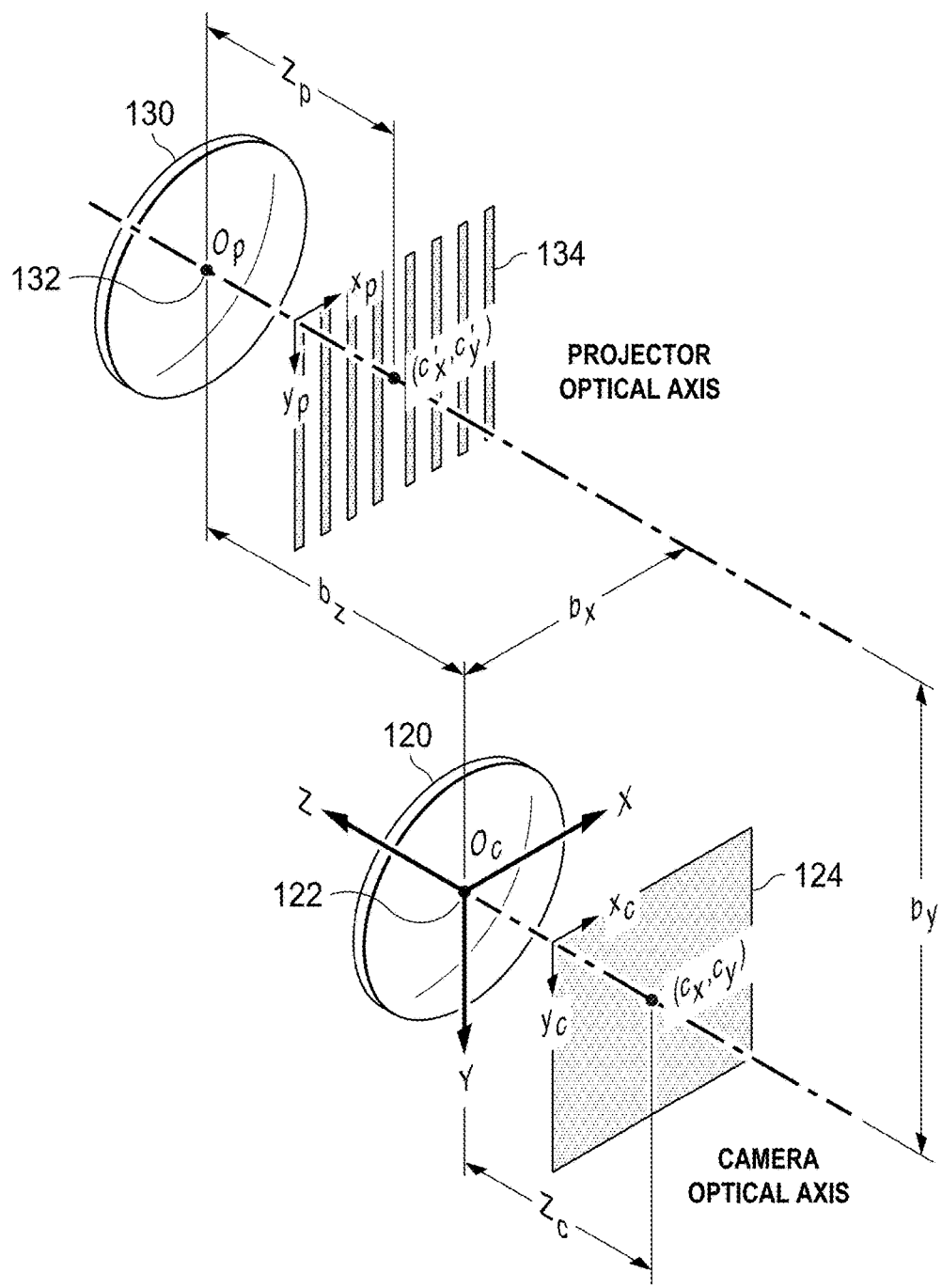
FIG. 1B is a schematic illustrating configuration geometry for the basic components of a system or apparatus for achieving structured illumination.

FIG. 1B is a schematic illustrating configuration geometry for the basic components of a system or apparatus for achieving structured illumination. FIG. 1B illustrates components of an example imaging system and an example illumination system. Specifically, FIG. 1B illustrates an imaging system lens 120 (here, a camera lens) spatially disposed from a lens 130 associated with an illumination system (here, a projector lens). Center of perspective Oc 122 and center of perspective Op 132 may generally be defined as a theoretical point or area associated with the intersection of optical rays projected or received through the lens. In embodiments, the center of perspective may be approximated as the center of a lens for certain types of lenses. For compound lens assemblies, the center of perspective may be the center of the entrance pupil. In certain embodiments, the illumination system and/or the imaging system may not have a lens, but each may still include or define a center of perspective. The pupil plane may be defined as a plane containing the center of perspective, whose normal vector is the optical axis (e.g., of the corresponding lens).

Referring to FIG. 1B, lens 120 is separated from camera image plane 124 by a distance Zc; lens 130 is separated from illumination system projection plane 134 by a distance Zp. Plane 134 defined by $x_P$ and $y_P$. Further, position of imaging system lens 120 relative to the illumination lens 130 (or vice versa) may be defined herein by a baseline connecting the point Oc 122 and Op 132. In embodiments, the baseline may have a length b and vector components $b_X$, $b_Y$, and $b_Z$, or some combination thereof. For the purpose of the illustration, the optical axes of the camera 102 and the projector 104 are assumed to be parallel or substantially parallel, with the user determining the baseline between the camera and the projector. The term "baseline" is used in this disclosure to mean the direction vector joining the center of perspective of the camera to that of the projector. In embodiments, Zc defines a distance from the imaging system image plane 124 from the imaging system's center of perspective. Image plane 124 is defined by $x_C$ and $y_C$, and may be a distance $Z_C$ away from $O_C$. Similarly, in certain embodiments, Zp defines a distance between the illumination system center of perspective and the illumination source projection plane 134. In the present disclosure, the world coordinate system centered at $O_c$ is aligned with the camera coordinate system, as shown in FIG. 1B.

Referring to FIG. 1A, in embodiments, imaging system 102 and the illumination system 104 may be coincident. The term "coincident" is used in this disclosure to mean that the camera and the projector share the same center of perspective. The term "collocated" is used in this disclosure to mean that the center of perspective of the camera and the projector are displaced and do not share an optical axis, and $b_Z=0$. In embodiments of a collocated configuration, baseline b may be defined by vector components $b_X$ and $b_Y$, wherein the imaging system shares a pupil plane with the illumination system. It is to be understood, however, that OSR may be achieved in a collocated configuration where the illumination system does not share a pupil plane with the imaging system. For example, the baseline b may have a slight z-displacement ($b_Z$) such that the pupil planes of the illumination system and the imaging system are parallel or substantially parallel. Small $b_Z$ components to the displacement (e.g., relative to the distance from the centers of perspective of the camera and projector to the scene point) may not affect the operation of the OSR system. Further, the threshold for the magnitude of $b_Z$ may be defined as the point at which the difference in viewpoint between the camera and projector is sufficient to induce scene dependent phase modulation distortions (aperiodicities) in the detected illumination pattern (i.e., detected by the camera), as shown in FIG. 3C.

In addition, in embodiments of collocated configurations, the pupil plane of the imaging system may not be parallel to the pupil plane of the illumination system. In such embodiments, the baseline b may still lie in the pupil plane of the camera. In FIG. 1B, the optical axes for the imaging system and the illumination system may be parallel or substantially parallel.

Figure 1C:
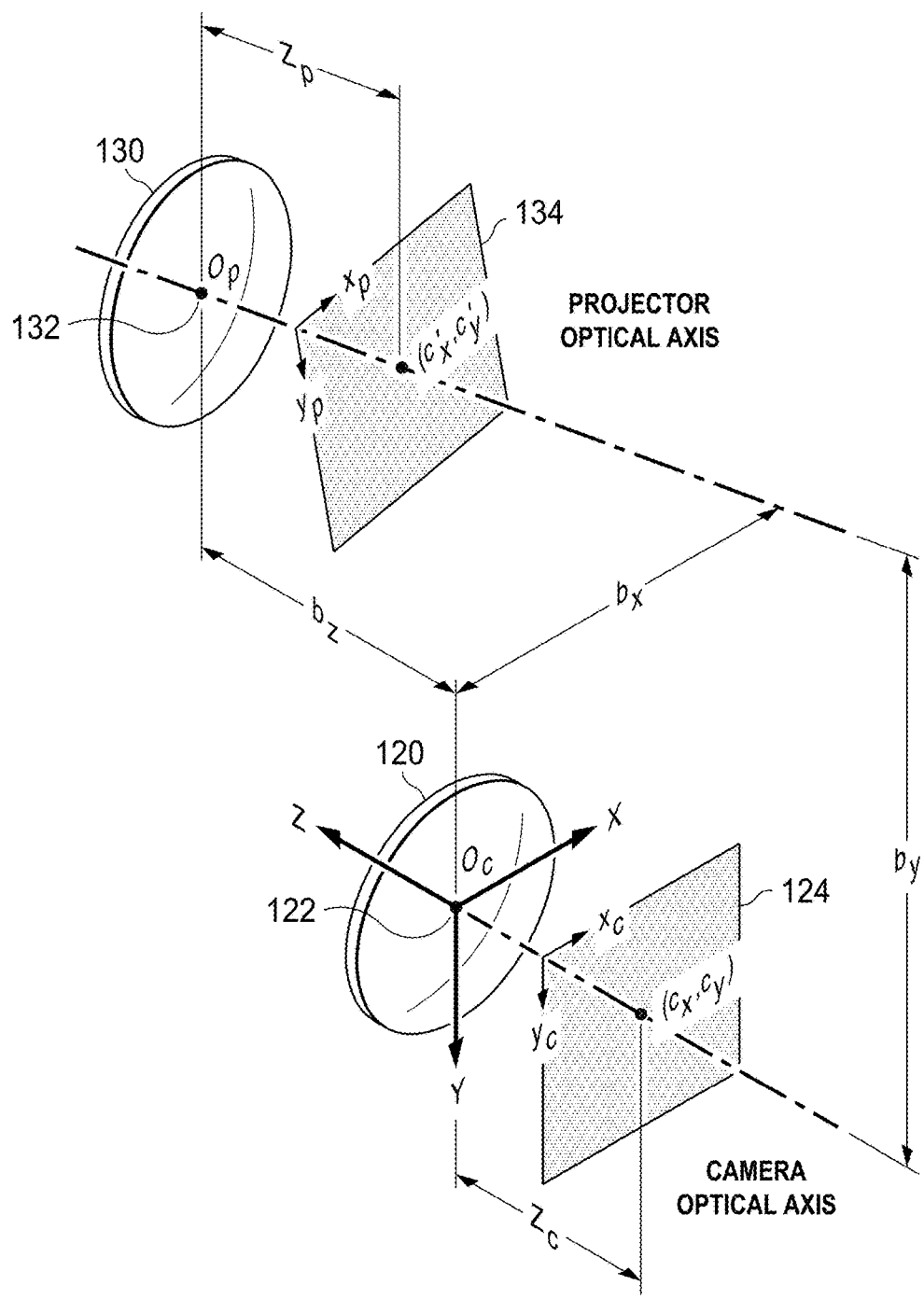
FIG. 1C is a schematic illustrating configuration geometry for the basic components of a crossed axis embodiment of a system or apparatus for achieving structured illumination.

FIG. 1C is a schematic illustrating configuration geometry for the basic components of a crossed axis embodiment of a system or apparatus for achieving structured illumination. In FIG. 1C, the optical axes are not parallel. In this non-parallel axes configuration, the spatial periodicity of the illumination pattern may be selected and/or configured to project a pre-warped pattern such that it appears periodic when viewed by the imaging system, no matter the scene geometry.

FIG. 1D is a table showing example configuration parameters for parallel and non-parallel embodiments of the present disclosure. The example configurations for the parallel and non-parallel axes configurations are illustrated by example in FIGS. 1B-C. The term "OSR direction" indicates the orientation of the spatial periodicity of the projected pattern as viewed by the imaging system. The term "calibrated" may be understood to mean that configuration parameters of the system may be known. For example, the spatial relationship of the camera relative to the projector may be known. The term "collocated" means that $b_z=0$ on FIG. 1D and may include configurations with parallel axes or non-parallel axes.

Figure 2A:
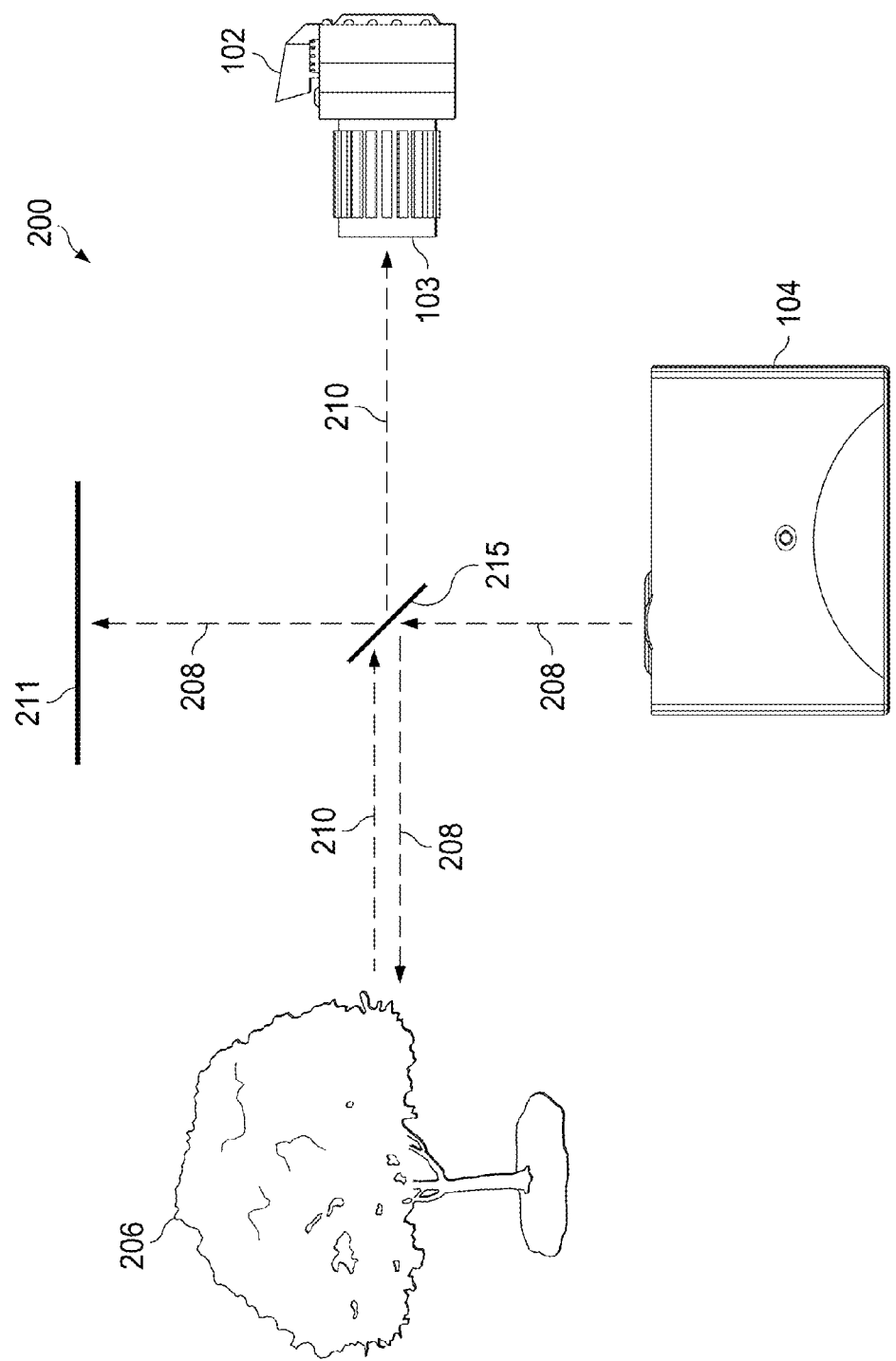
FIG. 2A is a schematic illustrating a system for achieving structured illumination Optical Super Resolution using a camera coincident to a projector in accordance with embodiments of the present disclosure.
Figure 2B:
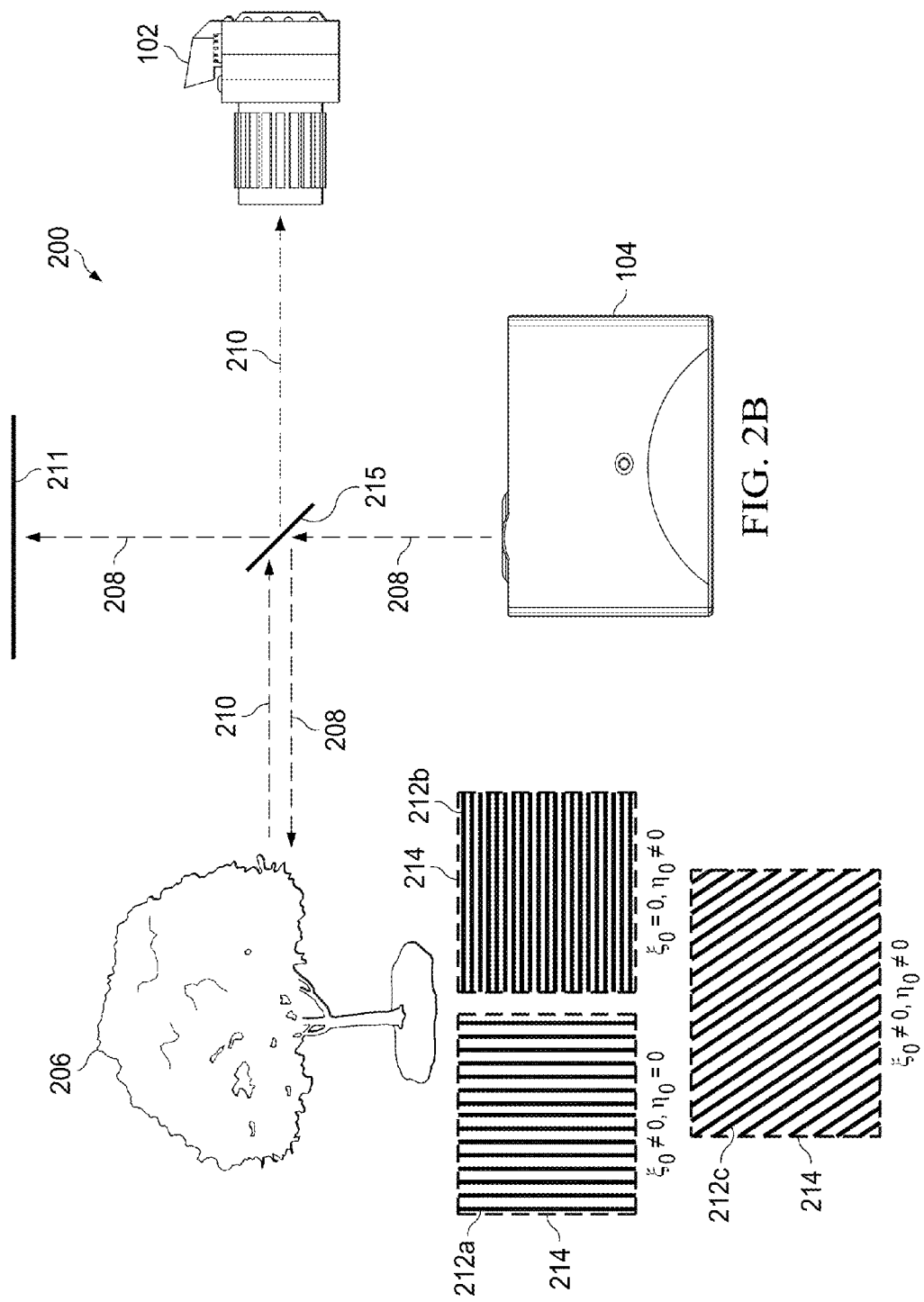
FIG. 2B is a schematic illustrating a system for achieving structured illumination Optical Super Resolution using a camera coincident to a projector and illustrating example spatial pattern orientations in accordance with embodiments of the present disclosure.

FIGS. 2A-B illustrate a coincident configuration. Camera 102 and the projector 104 are shown to be spatially disposed from one another, while sharing the same optical axes. This may be achieved by using optical elements, such as a beam splitter, to redirect light from multiple optical paths into a single optical path. In embodiments, the coincident configuration may be one where the imaging system 102 and the illumination system 104 share the same centers of perspective. FIGS. 2A-B are discussed in more detail below. In embodiments, the camera 102 and the projector 104 may be horizontally, vertically, or arbitrarily collocated. FIGS. 3A, 4A-B, and FIG. 6 illustrate embodiments where the camera 102 is collocated with the projector 104. The image planes of the camera and projector may or may not be parallel.

The OSR method of the present disclosure involves modulating the amplitude of a periodic pattern with scene information. For an arbitrary camera+projector arrangement, the difference in viewpoint between the camera and projector may induce lateral displacements or frequency changes in the periodic pattern, as observed by the camera. For example, FIG. 3C illustrates a distortion in the pattern as viewed by a camera, induced by the difference in viewpoint between the camera and the projector. As such, embodiments of the camera and projector may either be coincident or collocated. Further, the orientation of the spatial pattern used for OSR in a collocated camera+projector setup with parallel optical axes, is parallel or substantially parallel to the baseline between the camera 102 and the projector 104. For example, realizing OSR in a vertically collocated camera+projector setup with parallel optical axes, requires the use of periodic patterns with periodicity in the horizontal direction, and constant intensity in the vertical direction.

Returning to FIG. 1A, depending on the spatial configuration of the camera 102 relative to the projector 104, the projected pattern 108 from the projector 104 may create shadows on the object 106 (e.g., a 3-D object) as viewed by the camera 102. In addition, relative displacement between the camera 102 and projector 104, may induce object 106 dependent distortion in the illumination pattern as viewed by the camera 102. The patterns 112 may be chosen based on the relative orientations and positions of the camera 102 and the projector 104 to control the distortion in the projected pattern 112 as seen by the camera (e.g., to avoid the distortion in the OSR case). In certain instances, the spatial configuration of the camera 102 relative to the projector 104 may be configured for depth estimation based on differences in the phase of the received, modulated signal reflected from the scene.

FIG. 1A illustrates the basic system components, whereas other figures described in detail below, illustrate various camera/projector configurations that may be used to achieve Optical Super Resolution. The configurations may be generic and assembled with little consideration to control parameters.

Light 110 reflected from the object 106 is received by the lens 103 of camera 102. Light 110 may include scene detail obtained under ambient light (if any) and/or artificial unstructured light, and may include modulated spatial detail from the object 106, due to the projected structured light 108 (if any). As discussed in more detail below, the amplitude of the illumination pattern may be modulated by scene information. In embodiments, the modulation shifts spatial frequencies outside the passband of the imaging system (e.g., camera 102) into the passband. The modulated components may be demodulated to recover the spatial detail representing high spatial frequencies of the object, which would normally fall outside the passband of the imaging system (e.g., the camera lens). The resulting demodulated image signal may be combined with the raw image of the scene obtained under uniform illumination and/or ambient light, to form a super-resolved image.

FIGS. 2A-B, for example, illustrate an embodiment of a coincident configuration, where the camera 102 and the projector 104 share the same center of perspective and optical path. FIG. 3A illustrates the camera 102 collocated with projector 104, where camera 102 is displaced horizontally from projector 104. The illumination patterns have a spatial periodicity in the vertical direction (i.e., shown in FIG. 3C as horizontal stripes). In FIG. 3A, camera 102 and projector 104 may have image planes that are parallel. That is, the centers-of-perspective of the illumination system and the imaging systems are substantially aligned. In this configuration, the system may achieve super resolution and may estimate depth (i.e., resolve dimensions of the object or scene). The configuration illustrated in FIGS. 4A, B, and 6 may also be arranged such that the camera 102 and projector 104 having substantially parallel image planes may also be used to estimate depth information in addition to achieving Optical Super Resolution.

Figure 5A:
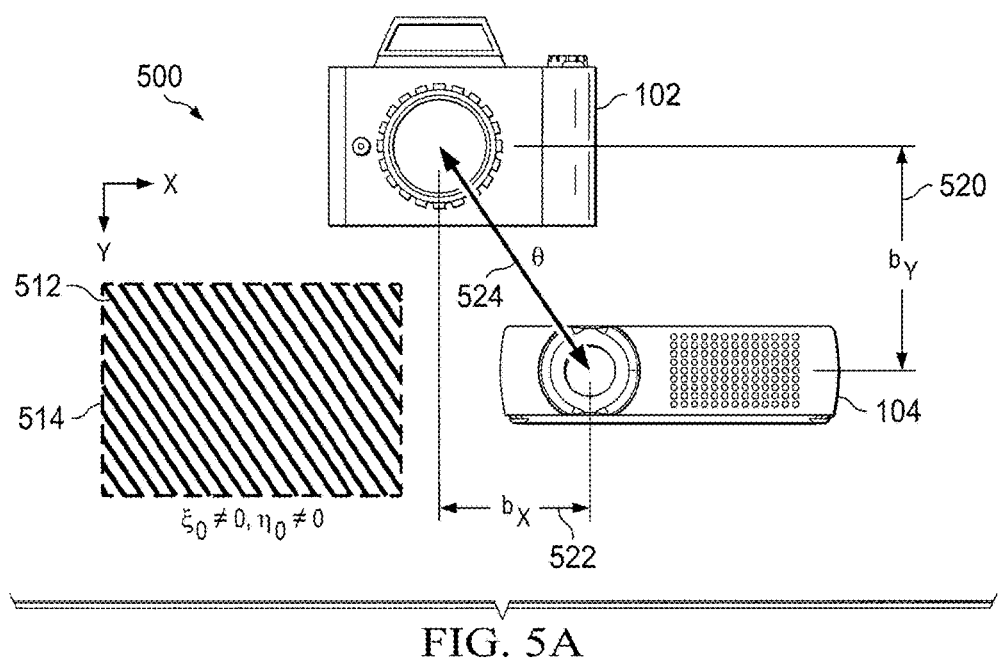
FIG. 5A is a schematic illustrating a system for achieving structured illumination Optical Super Resolution using a camera diagonally displaced with respect to a projector and an example illumination pattern orientation in accordance with embodiments of the present disclosure.
Figure 5B:
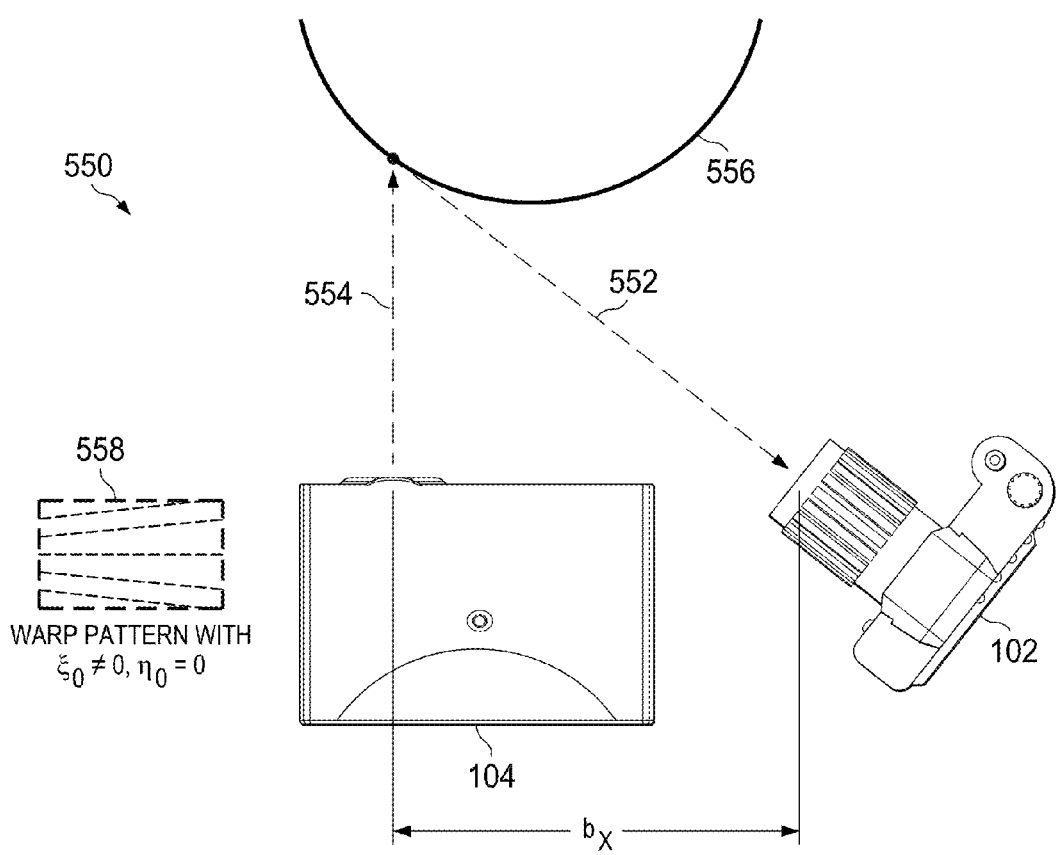
FIG. 5B is a schematic illustrating a calibrated system for achieving structured illumination Optical Super Resolution using an imaging system and an illumination system having crossed optical axes.

FIG. 5A shows the illumination system collocated from the imaging system, where the collocation displacement has both X and Y components. FIG. 5A shows a corresponding spatial pattern for a parallel axis configuration (i.e., the optical axis of the imaging system is parallel to the illumination system), but FIG. 5A also supports a crossed axis configuration. FIG. 5B is a schematic illustrating a calibrated system for achieving structured illumination Optical Super Resolution using an imaging system and an illumination system having crossed optical axes. FIG. 5B shows a crossed axis configuration of the imaging system and the illumination system, as well as a representation of a warped spatial pattern. In embodiments of the crossed axis system, the camera may be horizontally, vertically, or "diagonally" collocated from the projector at an arbitrary or predetermined angle.

In embodiments, the demodulation frequency can be identified by examining the input parameters of the structured illumination and the configuration of the camera and projector. In some implementations, the demodulation frequency can be determined or measured as the shift in the peak value of the magnitude spectrum of the camera images obtained in the presence and absence of structured illumination.

FIGS. 2A-B illustrate an embodiment of a system 200 consistent with the present disclosure for achieving Optical Super Resolution. FIG. 2A is a schematic illustrating a system for achieving structured illumination Optical Super Resolution using a camera coincident to a projector in accordance with embodiments of the present disclosure. The embodiment illustrated in FIG. 2A represents a coincident hardware configuration, where camera 102 shares the center of perspective and optical axes with the projector 104. In operation, the projector 104 projects structured light 208. In the embodiment shown in FIG. 2A, the projected light is incident upon a beam splitter 215. The projected light 208 is directed by the beam splitter 215 onto the scene 206. Reflected light 210 from the object 206 passes through beam splitter 215 on the same optical path as projected light 208. Reflected light passes through beam splitter 215 and into camera lens 103, where it may be captured and subjected to processing. Some of the projected light 208 passes through beam splitter 215 upon initial incidence, and may be incident upon surface 211, or may be allowed to dissipate without further incidence. FIG. 2A illustrates projected light 208 and reflected light 210 on different physical paths, but this is for illustrative purposes.

FIG. 2B is a schematic illustrating a system for achieving structured illumination Optical Super Resolution using a camera coincident to a projector and illustrating example spatial pattern orientations in accordance with embodiments of the present disclosure. FIG. 2B illustrates example illumination patterns 212a-c that may be used in the coincident configuration illustrated in FIGS. 2A-B. In a coincident configuration, as in the example one shown in FIGS. 2A-B, the projected light and the light captured by the lens share the same optical path. The lack of spatial distortion of the projected pattern, as seen by the camera in a coincident setup, allows for the use of different orientations for the periodic patterns 212a-c. Periodic pattern 212a can be characterized as having the following parameters: $\xi \neq 0$; $\eta = 0$. Periodic pattern 212b can be characterized as having the following parameters: $\xi = 0$; $\eta \neq 0$. Periodic pattern 212c can be characterized as having the following parameters: $\xi \neq 0$; $\eta \neq 0$. Periodic patterns 212a-c are shown within image plane 214. The image plane 214 is shown as a rectangular box around each of spatial patterns 212a-c. For illustrative purposes, the rectangular boxes represent image plane 214 to show that the spatial pattern 212c may be rotated to an arbitrary angle without rotating the image plane 214.

FIG. 3A is a schematic illustrating a system for achieving structured illumination Optical Super Resolution using a camera horizontally collocated with a projector in accordance with embodiments of the present disclosure. FIG. 3A illustrates an example collocated configuration of system 300, where the pupil planes of the camera 102 and projector 104 are parallel or substantially parallel. In system 300, camera 102 is "horizontally" disposed relative to the projector 104. The horizontal disposition is represented by a displacement $b_X$ 320. In embodiments, displacement $b_X$ 320 may represent the horizontal component of the spatial position of the camera relative to the projector (and/or vice versa, the spatial position of the projector relative to the camera). The orientation of the spatial patterns projected by the projector in the embodiment illustrated in FIG. 3A is shown to be periodic in the y direction, as defined by the Cartesian coordinate system 314 shown in FIG. 3A (not to be confused with coordinate system 330, which defines the direction for the spatial displacement of the camera 102 relative to the projector 104). The camera may receive a signal 310 from the object 306. For a point of reference, Cartesian coordinate map 330 illustrates the reference coordinate directions for system 300. In embodiments, the periodicity of the spatial patterns may be orthogonal to the direction of spatial disposition of the camera relative to the projector. In FIG. 3A, the periodicity of the spatial patterns for achieving Optical Super Resolution of horizontally oriented features of object 306 is shown to be in the y direction. In embodiments, projected light 308 may be a sinusoid, with periodicity in the y direction.

The camera 102 and projector 104 of FIG. 3A are shown with parallel image planes. In such an embodiment, the system configuration shown in FIG. 3A may be used to achieve Optical Super Resolution of horizontal features of object 306 using the spatial pattern orientation depicted by patterns 312. Pattern 312 can be characterized as having the following parameters: $\xi = 0$; $\eta \neq 0$. In addition, by rotating patterns 312 by, for example, 90 degrees, the projection may produce distortions of the patterns on the object 306, which may be used to recover scene depth information from the camera viewpoint.

Figure 3B:
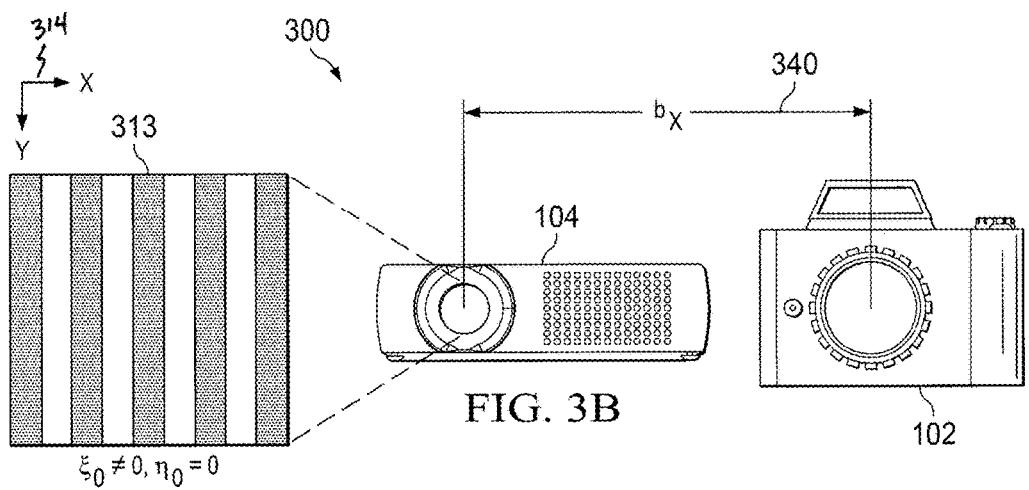
FIG. 3B is a schematic illustrating a system for achieving structured illumination Optical Super Resolution using a camera horizontally collocated with a projector and illustrating an example spatial pattern orientation in accordance with embodiments of the present disclosure.
Figure 3C:
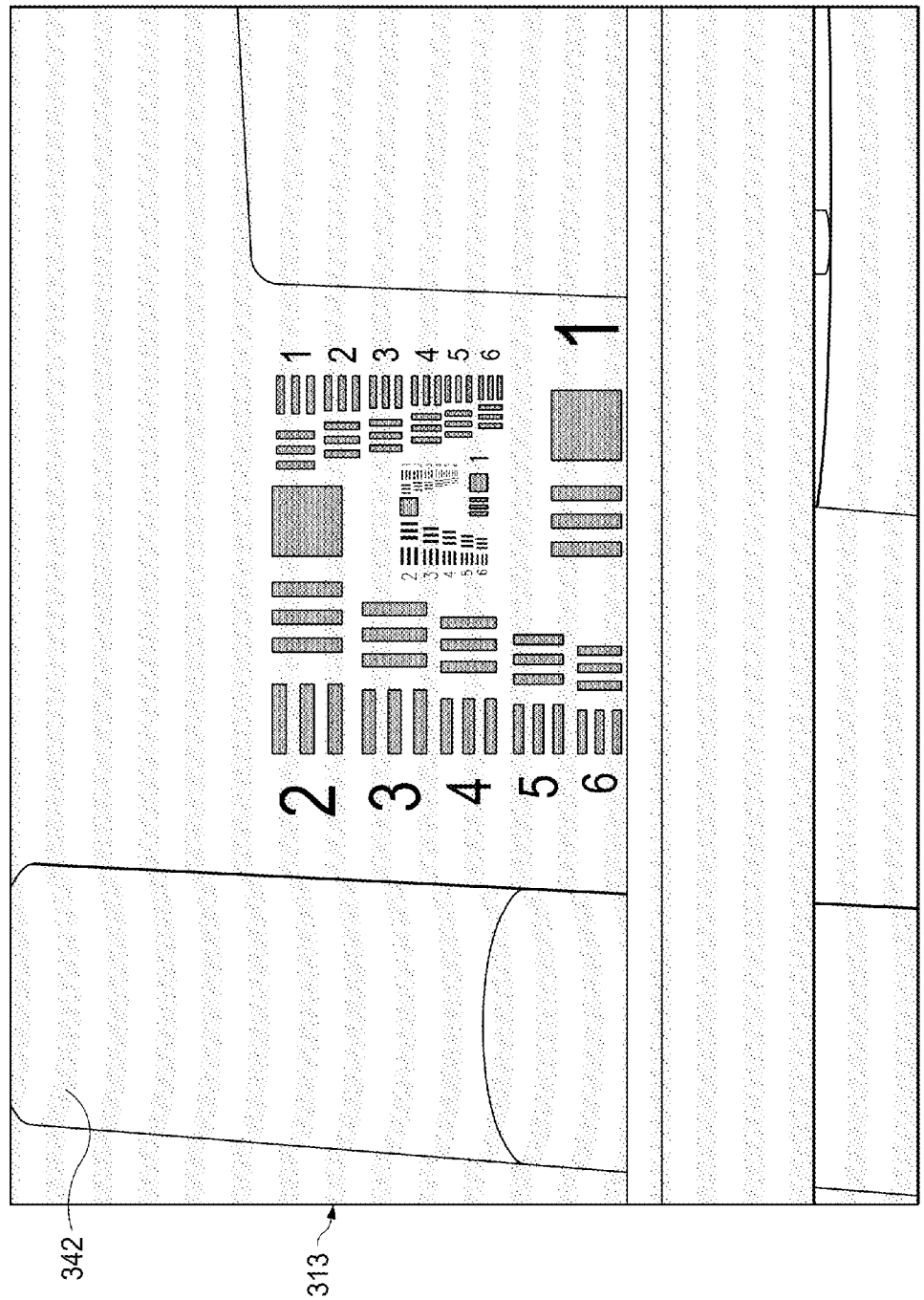
FIG. 3C is a schematic illustrating scene dependent distortion in the projected pattern as seen by the camera, due to the difference in the camera and projector viewpoints.

FIG. 3B is a schematic illustrating a system for achieving structured illumination Optical Super Resolution using a camera horizontally collocated with a projector and illustrating an example spatial pattern orientation in accordance with embodiments of the present disclosure. For example, FIG. 3B illustrates the system 300 including camera 102 and projector 104 displaced horizontally from one another by displacement $b_X$ 340. Projector 104 is shown as projecting a spatial pattern 313 having a spatial periodicity oriented in the same direction as the displacement $b_X$ 340 (i.e., horizontal periodicity). Spatial pattern 313 can be characterized as having the following parameters: $\xi \neq 0$; $\eta = 0$. With the collocated configuration shown in FIG. 3A (having "horizontal" spatial disposition $b_X$ 340 of the camera 102 relative to the projector 104), distortions may appear. FIG. 3C illustrates an example three-dimensional object, such as object 306 shown in FIG. 3A) and projected spatial patterns 313. In FIG. 3C, the periodicity of the spatial patterns is oriented in the vertical direction and distortions 342 appear on the 3-D object. Such a result illustrates an imaging system horizontally disposed from the illumination system.

Figure 4A:
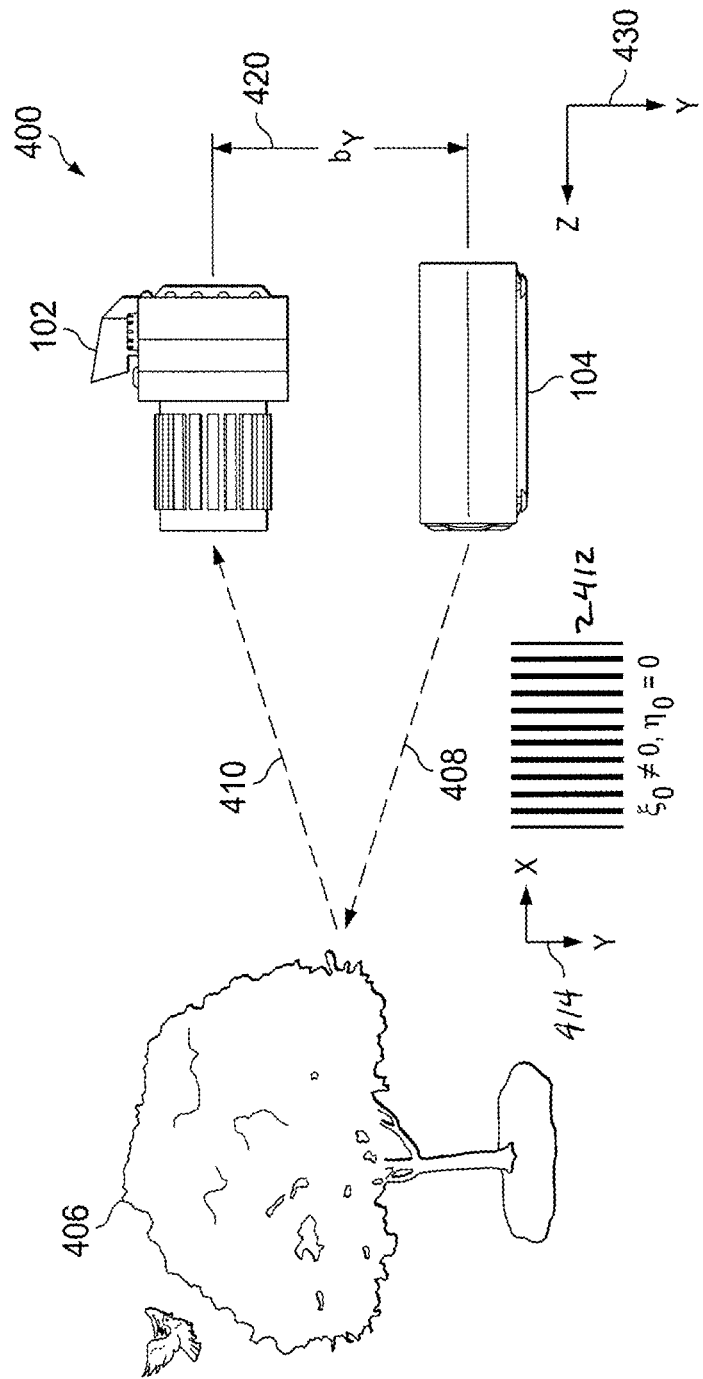
FIG. 4A is a schematic illustrating a system for achieving structured illumination Optical Super Resolution using a camera vertically collocated with a projector and an example illumination pattern orientation in accordance with embodiments of the present disclosure.
Figure 4B:
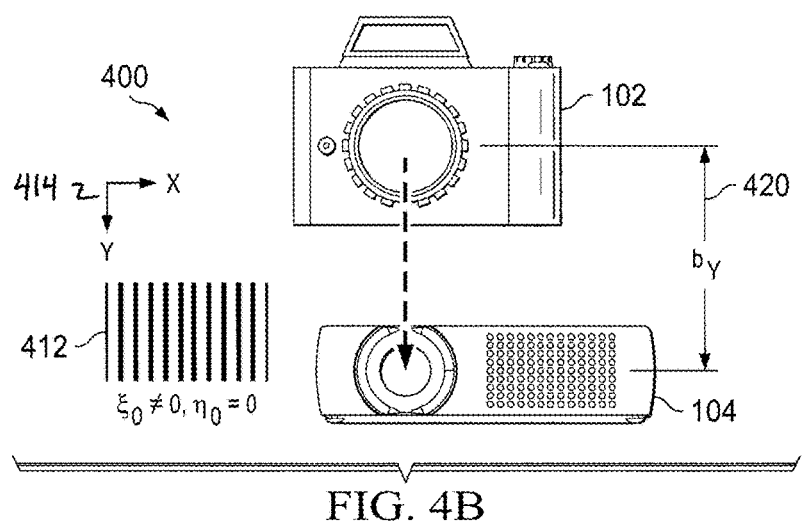
FIG. 4B is a schematic illustrating a different perspective view of the system of FIG. 4A for achieving structured illumination Optical Super Resolution using a camera horizontally collocated with a projector in accordance with embodiments of the present disclosure.

FIG. 4A is a schematic illustrating a system for achieving structured illumination Optical Super Resolution using a camera vertically collocated with a projector and an example illumination pattern orientation in accordance with embodiments of the present disclosure. FIG. 4A illustrates an embodiment of system 400 where camera 102 is collocated with projector 104. FIG. 4B is a schematic illustrating a different perspective view of the system of FIG. 4A for achieving structured illumination Optical Super Resolution using a camera horizontally collocated with a projector in accordance with embodiments of the present disclosure. In FIGS. 4A-B, the spatial disposition of the camera 102 relative to the projector 104 is in the vertical direction. The vertical disposition is represented by a displacement $b_Y$ 420. The displacement of camera 102 is shown in FIG. 4a as displacement $b_Y$ 420. The orientation of the spatial patterns projected by the projector in the embodiment illustrated in FIG. 4A is shown to be periodic in the x direction, as defined by the coordinate system 414 (not to be confused with the coordinate system 430, which shows the coordinate system defining the spatial displacement of the camera 102 relative to the projector 104). For a point of reference, Cartesian coordinate map 430 illustrates the reference coordinate directions for system 400. In embodiments, the periodicity of the spatial patterns 412 may be orthogonal to the direction of spatial disposition of the camera 102 relative to the projector 104. Periodic pattern 412 can be characterized as having the following parameters: $\xi \neq 0$; $\eta = 0$. In FIG. 4A, because displacement $b_Y$ 420 is the component of the spatial disposition, the periodicity of the spatial patterns 412 for achieving Optical Super Resolution of horizontally oriented features of object 406 is shown to be in the x direction. In embodiments, projected light 408 may be a sinusoid, with its periodicity in the x direction.

FIG. 5A illustrates system 500, which, in embodiments, may include camera 102 and projector 104. Camera 102 is shown as spatially disposed at an angle θ from projector 104, with horizontal component $b_X$ 522 and vertical component $b_Y$ 520. Spatial pattern 512 is illustrated as having an orientation of its periodicity in a direction orthogonal to the direction of the displacement defined by the angle θ 524, and may be used for Optical Super Resolution. For illustrative purposes, the rectangular boxes represent image plane 514 to show that the spatial pattern 512 may be rotated to an angle orthogonal to the angle θ without rotating the image plane. Pattern 512 can be characterized as having the following parameters: $\xi \neq 0$; $\eta \neq 0$.

FIG. 5B illustrates system 550 where the baseline connecting the center of perspective Oc of the imaging system 102 with the center of perspective Op of the illumination system 104 are within the pupil plane of the imaging system 102. In system 550, which may be a calibrated system configuration, the optical axis 552 of the imaging system is not parallel to the optical axis 554 of the illumination system. Illumination system 104 is configured to project a spatial pattern 558 onto object 556 that when viewed from the imaging system 102 viewpoint, exhibits periodicity, no matter the scene geometry. Such a crossed axis configuration may be collocated, so that $b_Z=0$. Warp pattern 558 can be characterized as having the following parameters: $\xi \neq 0$; $\eta=0$.

Figure 6:
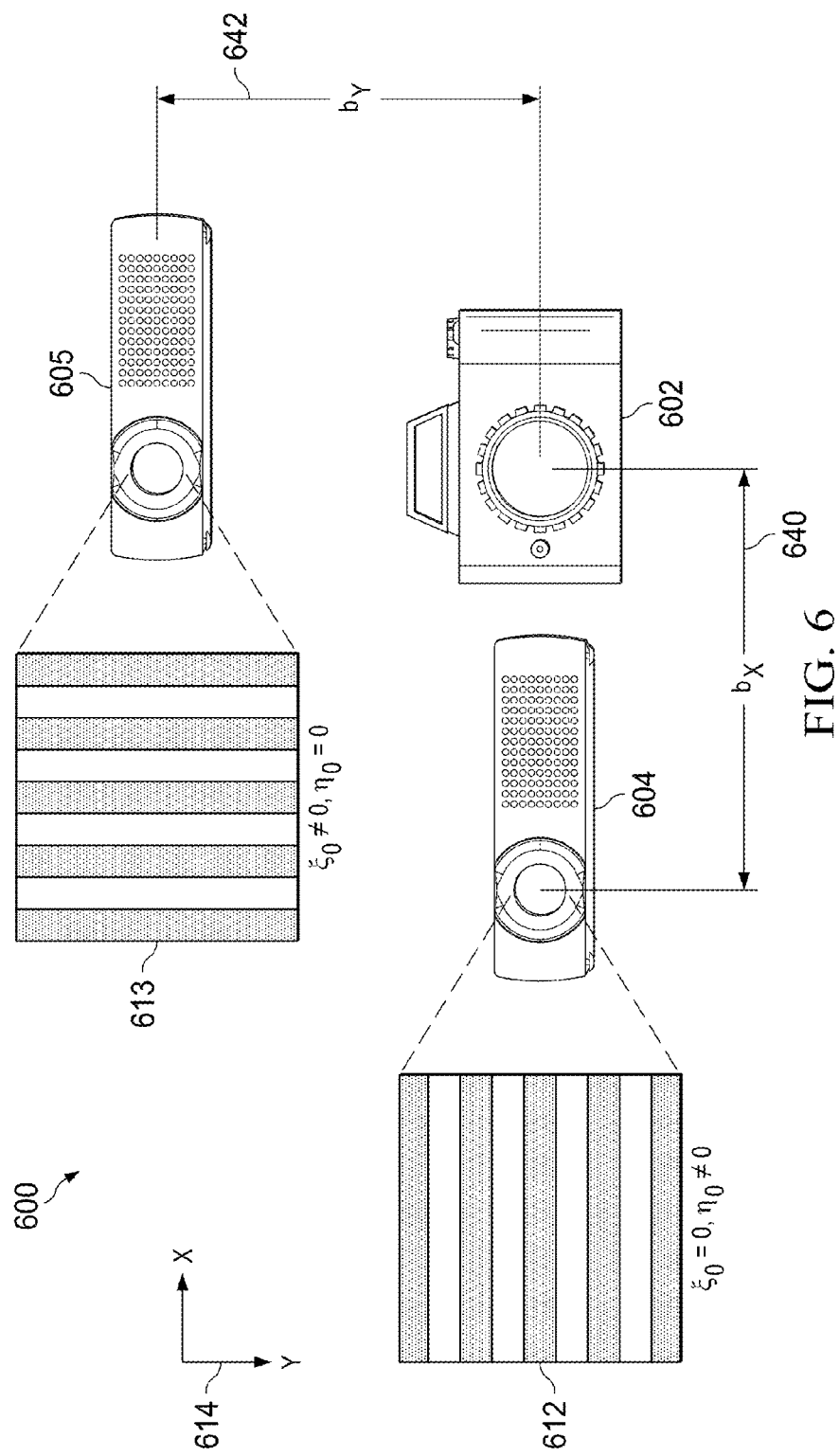
FIG. 6 is a schematic illustrating a system for achieving structured illumination Optical Super Resolution using a camera horizontally collocated with a first projector and vertically collocated with a second projector and example illumination pattern orientations in accordance with embodiments of the present disclosure.

FIG. 6 is a schematic illustrating a system for achieving structured illumination Optical Super Resolution using a camera horizontally collocated with a first projector and vertically collocated with a second projector and example illumination pattern orientations in accordance with embodiments of the present disclosure. FIG. 6 illustrates an embodiment of the present disclosure showing system 600 having two illumination systems and one imaging system. In FIG. 6, illumination system 604 is horizontally collocated from imaging system 602, displaced from imaging system 602 by some baseline defined by $b_X$ 640. Illumination system 605 is vertically collocated from imaging system 602, displaced by some baseline defined by $b_Y$ 642. For OSR, illumination system 604 projects a spatial pattern 612 with spatial periodicity oriented in the y direction, and illumination system 605 projects a spatial pattern 613 with spatial periodicity oriented in the x direction. The x and y directions are defined for illustrative purposes by the Cartesian map 614. Pattern 612 can be characterized as having the following parameters: $\xi=0$; $\eta \neq 0$.

Figures 7, 10:
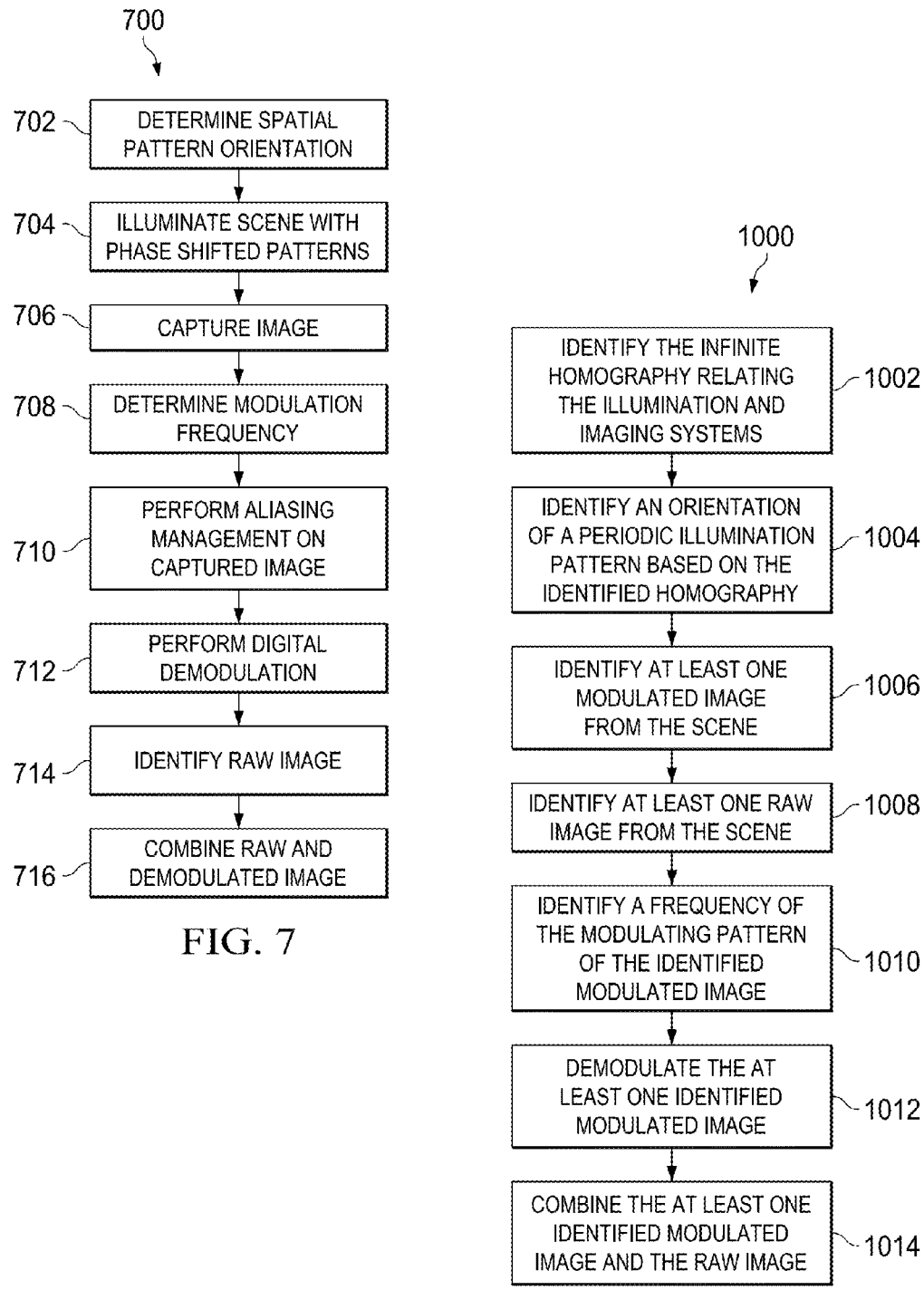
FIG. 7 is a process flow diagram for achieving Optical Super Resolution in accordance with the present disclosure.
FIG. 10 is a process flow diagram for recovering spatial frequencies.

FIG. 7 is a process flow diagram for achieving Optical Super Resolution in accordance with the present disclosure. FIG. 7 is a process flow diagram 700 illustrating the steps involved in achieving Optical Super Resolution according to the present disclosure. As described above, the orientation of the spatial patterns projected by the projector 104 may be determined based on the configuration of the hardware components (such as the camera 102 and the projector 104). For a given hardware configuration, spatial patterns may be identified (Step 702). Identifying the spatial patterns may include identifying the orientation of the periodicity of the spatial patterns. In addition, the type of spatial patterns may be identified, such as whether the patterns are to be a sinusoid or some other spatial patterns. In addition, other parameters may be identified, such as the amplitude and the frequency of the periodic signal, and whether the patterns will include phase shifted components. In some embodiments, the imaging system may receive a plurality of images of the scene. For example, four patterns may be projected and received (e.g., $0.5*(1+\sin(2\pi\xi_0 x))$, $0.5*(1-\sin(2\pi\xi_0 x))$, $0.5*(1+\cos(2\pi\xi_0 x))$, and $0.5*(1-\cos(2\pi\xi_0 x))$) to realize complex sinusoidal modulation using Euler's formula. In other circumstances, three images of the scene may be projected and received (e.g., $0.5+0.25*\cos(2\pi\xi_0 x)+0.25*\sin(2\pi\xi_0 x)$, $0.5+0.25*\cos(2\pi\xi_0 x)-0.25*\sin(2\pi\xi_0 x)$, $0.5-0.25*\cos(2\pi\xi_0 x)+0.25*\sin(2\pi\xi_0 x)$). The three aforementioned patterns may be received as a single frame in embodiments where the three image patterns are in different color planes of a single image.

Processing may occur on each of the color planes separately to demodulate and then may be recombined to achieve OSR imaging. Another example may involve using an equivalent system with polarization states. The captured images contain scene information corresponding to the ambient or unstructured light, as well as modulated scene information due to the structured light. The processor may then demodulate each image and combine the resulting demodulated images with the raw image of the scene (un-modulated image of scene), to create the super-resolved image.

Figure 8A:
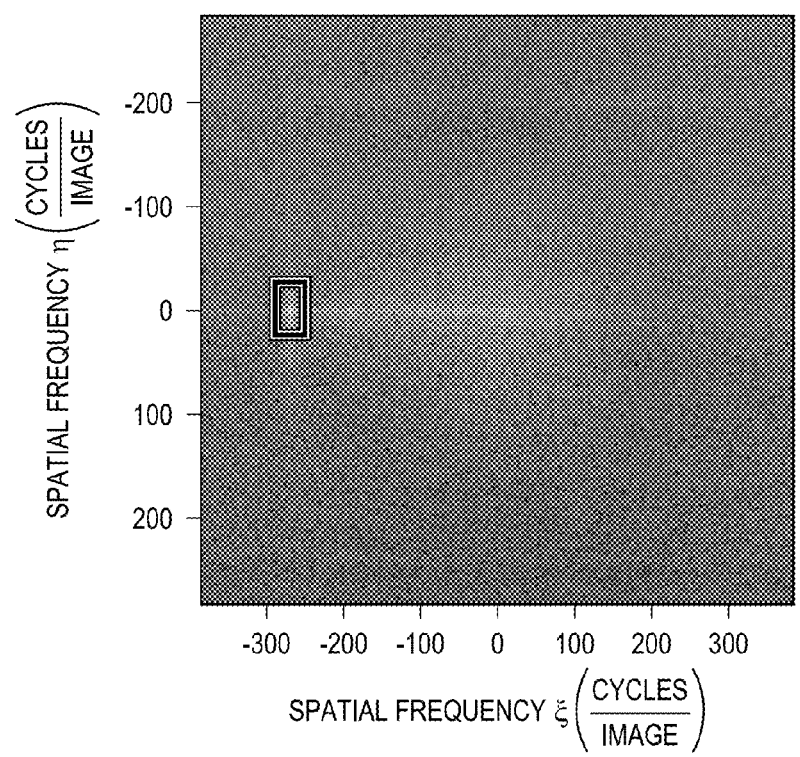
FIGS. 8A-B are example Fourier spectra illustrating spatial frequency peaks used to identify a demodulation frequency in accordance with embodiments of the present disclosure.
Figure 8B:
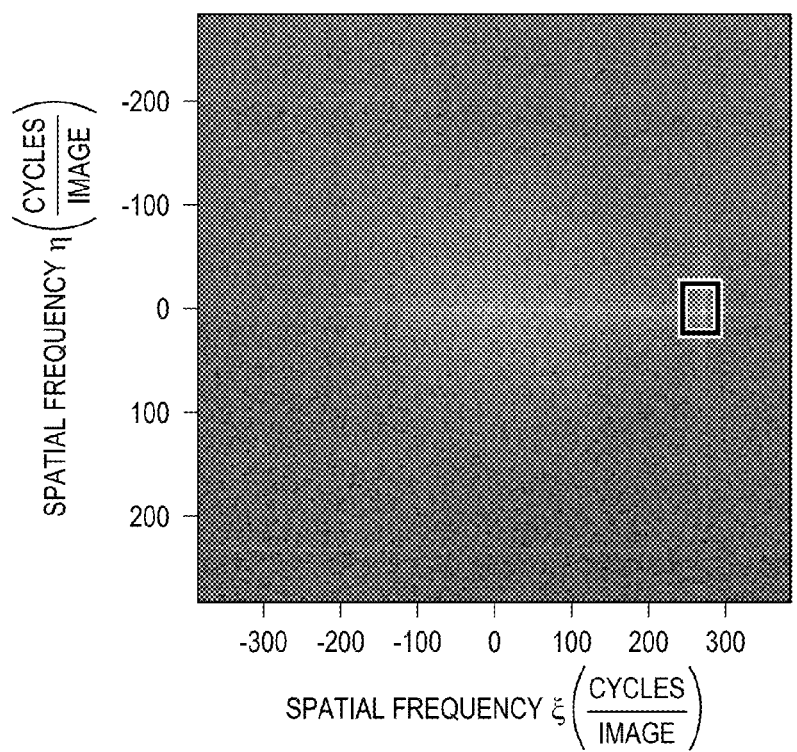

The scene or object 106 is illuminated by the projector 104, which projects the patterns onto the object 106 (Step 704). In embodiments, the projected light may pass through a beam splitter prior to becoming incident upon the object 106. Light reflected from the object 106 is captured by the camera 102 (Step 706). In embodiments, camera lens 103 focuses the light onto an image sensor, such as a CCD. The captured image may include frequency components based on ambient or other unstructured light, as well as the modulated frequencies corresponding to the features on the object 106. In embodiments, the modulation frequency of the modulated image signal may be identified (Step 708) from the captured images. For example, the Fourier transform of the modulated image may be used to identify the modulating frequency. FIGS. 8A-B are example Fourier spectra illustrating spatial frequency peaks used to identify a demodulation frequency in accordance with embodiments of the present disclosure. FIGS. 8A-B illustrate an example of the Fourier spectra of the modulated image, showing peaks at certain frequencies away from the DC. The demodulating frequency may be determined as the mean value of the absolute difference in the frequencies of these peaks with respect to DC. In implementations, aliasing management (for example, by way of sinc-interpolation) may be used to ensure that the demodulated frequencies do not appear aliased due to finite pixel pitch of the imaging system (Step 710). Other interpolation methods known to those of skill in the art may be used to perform the aliasing management described herein without deviating from the scope of the disclosure. It is to be understood that OSR may be achieved without performing aliasing management.

The modulated images may be demodulated to recover spatial frequencies outside the optical passband (Step 712). The un-modulated image may also be identified (Step 714), and the demodulated images may be combined with the un-modulated image to achieve a super-resolved image (Step 716). The resulting super resolved image may then be stored or output. Certain of the steps described above may be performed in a different order compared to the order described.

FIG. 10 is a process flow diagram for recovering spatial frequencies. FIG. 10 illustrates a process flow diagram 1000 for Optical Super Resolution using Structured Illumination. The operations may be performed in a processor. The infinite homography $H_{p2c}^{\infty}$ (in Eq. (1)) relating the pupil planes of the imaging and illumination system may be identified (1002). Alternately, the homography induced by a planar facet that is parallel to the pupil plane of the illumination system, may be used instead of the infinite homography. The illumination patterns may be identified as the result of warping a sinusoidal pattern whose orientation of periodicity is orthogonal to the baseline vector (1004).

At least one modulated image of the scene due to structured illumination may be identified (1006). In embodiments, the modulated image may be captured or may be synthesized. At least one raw image of the scene due to unstructured illumination may be identified (1008). In embodiments, the raw image may be captured or synthesized. The frequency of the modulating pattern may be identified (1010) from the modulated image. The at least one identified modulated image may be demodulated (1012). The at least one demodulated image with the at least one raw image may be combined (1014).

Figure 11A:
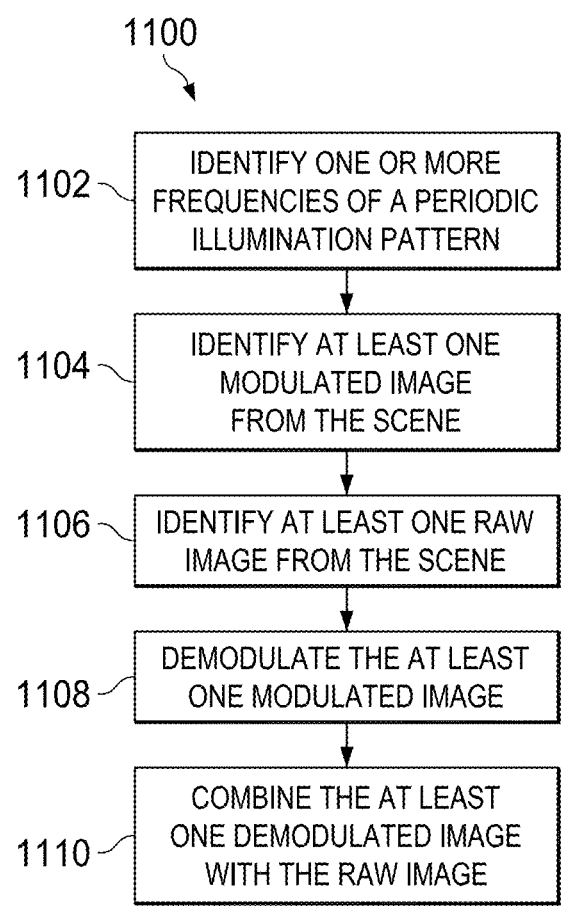
FIG. 11A is a process flow diagram illustrating a method of synthesizing an optical transfer function.

FIG. 11A is a process flow diagram 1100 illustrating a method of synthesizing an optical transfer function. One or more frequencies of a periodic illumination pattern may be identified based on a shape of a desired optical transfer function (1102). At least one image may be captured (1104). The image may include scene information, where the periodic illumination pattern may be modulated by the scene. In addition, one or more images may be identified that represent un-modulated scene information (1106). That is, at least one raw image of the scene may be captured or synthesized. An image of a scene under complex sinusoidal illumination may be identified (1108). In embodiments, the modulated image(s) may be synthesized or may be captured. Further, a raw image of the scene based on uniform illumination may be synthesized. The synthesized image may be demodulated. The demodulated image or images may be combined with the raw image (1110).

Figure 11B:
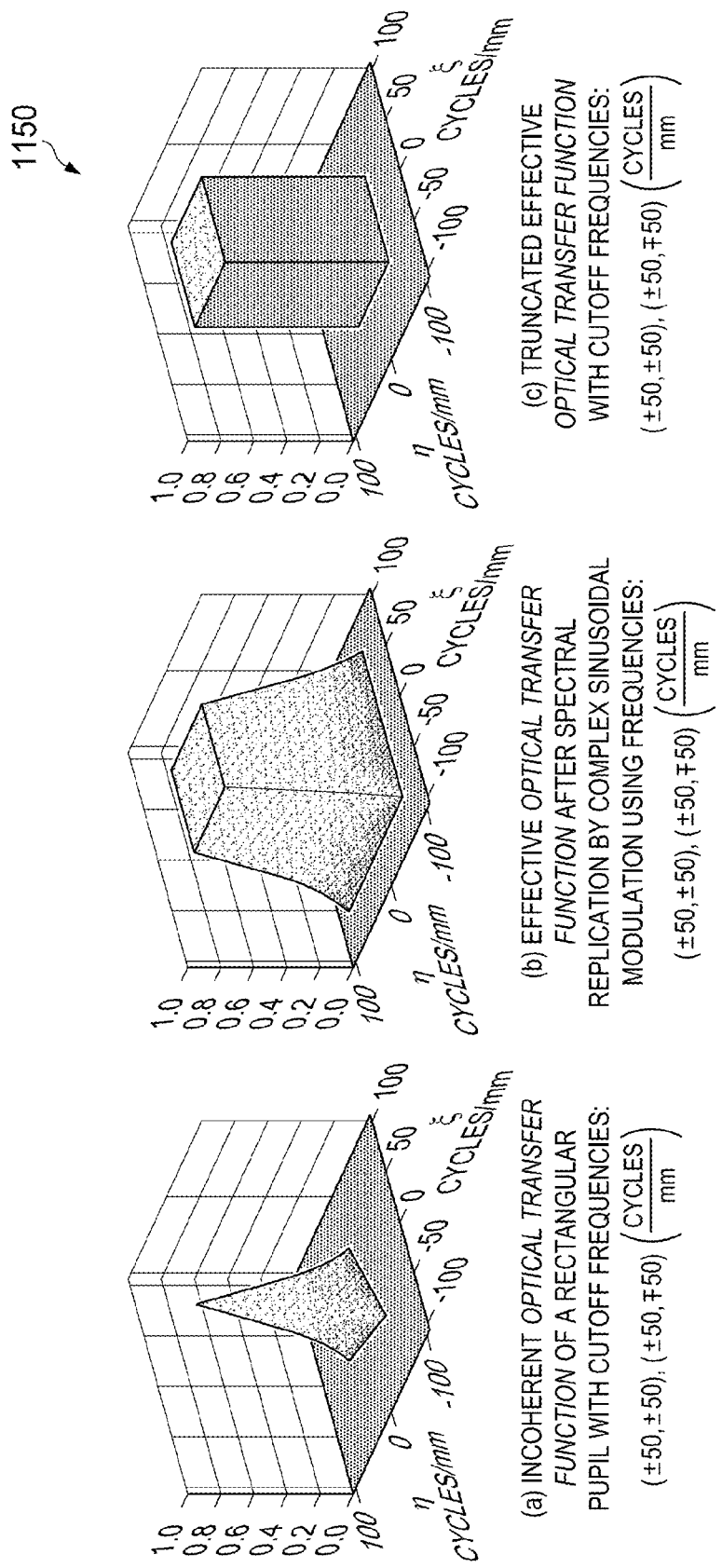
FIG. 11B illustrates graphical representations of three-dimensional optical transfer functions synthesized according to the present disclosure.

FIG. 11B illustrates graphical representations 1150 of 2D three dimensional optical transfer functions synthesized according to the present disclosure. FIG. 11B(a) illustrates an incoherent OTF of a rectangular pupil with particular cutoff frequencies. In FIG. 11B(b) illustrates the effective OTF after spectral replication by complex sinusoidal modulation using the frequencies shown in FIG. 11B(a). The OTF of FIG. 11B(c) is truncated based on the frequencies identified in FIG. 11B(a), to realize an ideal low-pass filter.

Figure 12A:
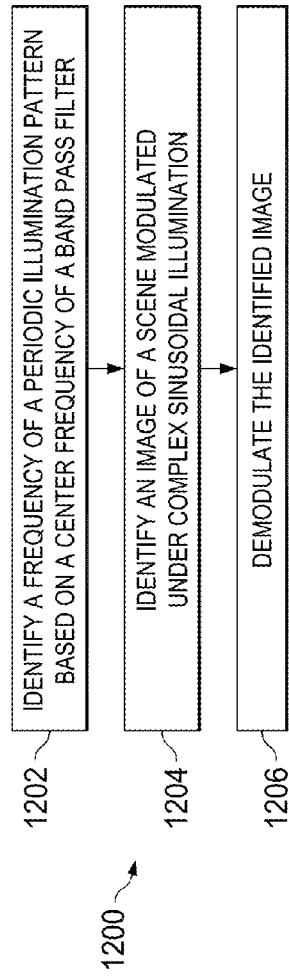
FIG. 12A is a process flow diagram illustrating a method for realizing computational band-pass filtering.
Figure 12B:
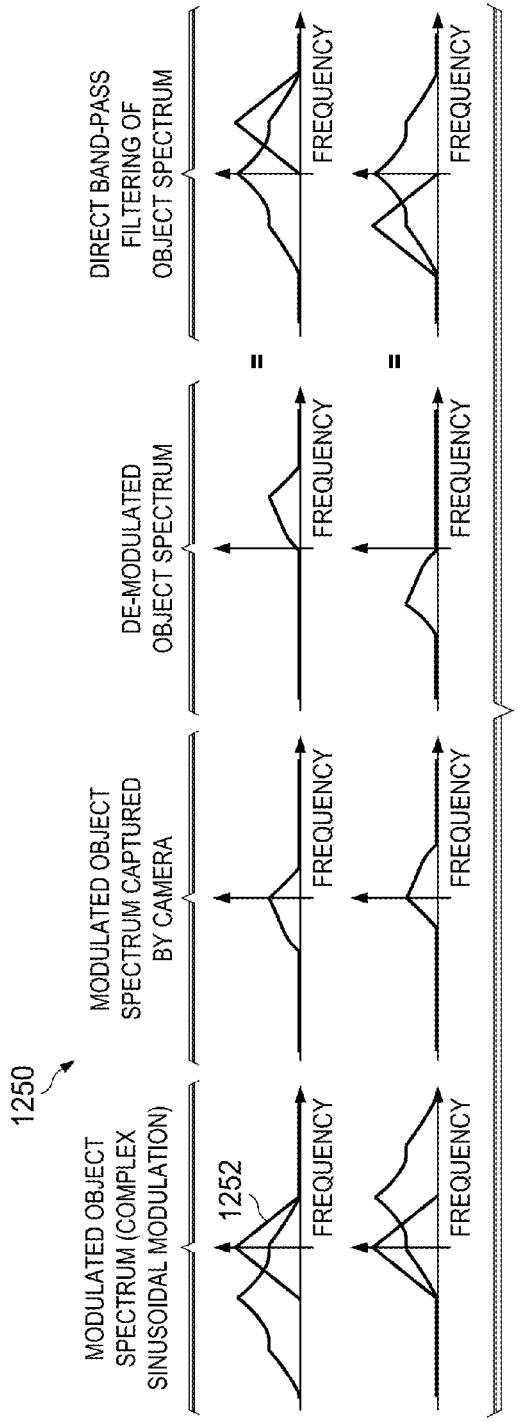
FIG. 12B is a schematic illustrating the shift in spatial frequency for computational band-pass filtering.

FIG. 12A illustrates a process flow diagram 1200 illustrating a method for realizing computational band-pass filtering. A frequency of a periodic illumination pattern may be identified based on a center frequency of a band-pass filter (1202). An image of a scene obtained under complex sinusoidal illumination may be identified (1204), by projecting phase shifted illumination patterns. In embodiments, the modulated image may be synthesized or may be captured by an imaging system. The modulated image may be demodulated (1206). The demodulation may be performed using an identified or determined modulation frequency. The demodulated synthesized image may be stored. In embodiments, the demodulated synthesized image may be stored without combining the image with raw image data to form a "complete" synthesized, super resolution image.

Figure 13A:
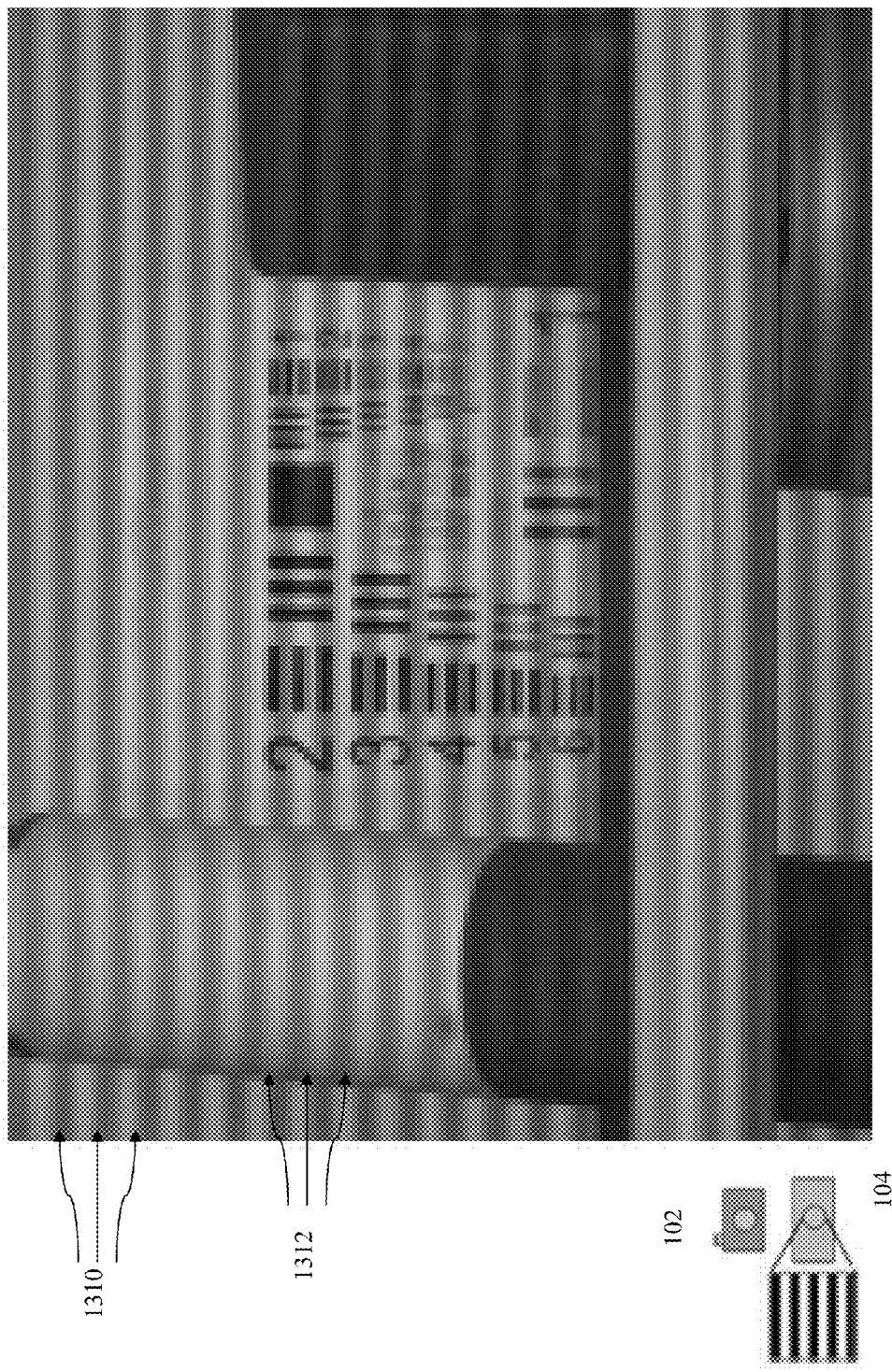
FIG. 13A is an illustration of an example scene illuminated with a vertically periodic pattern by an illumination system vertically collocated from a camera.
Figure 13B:
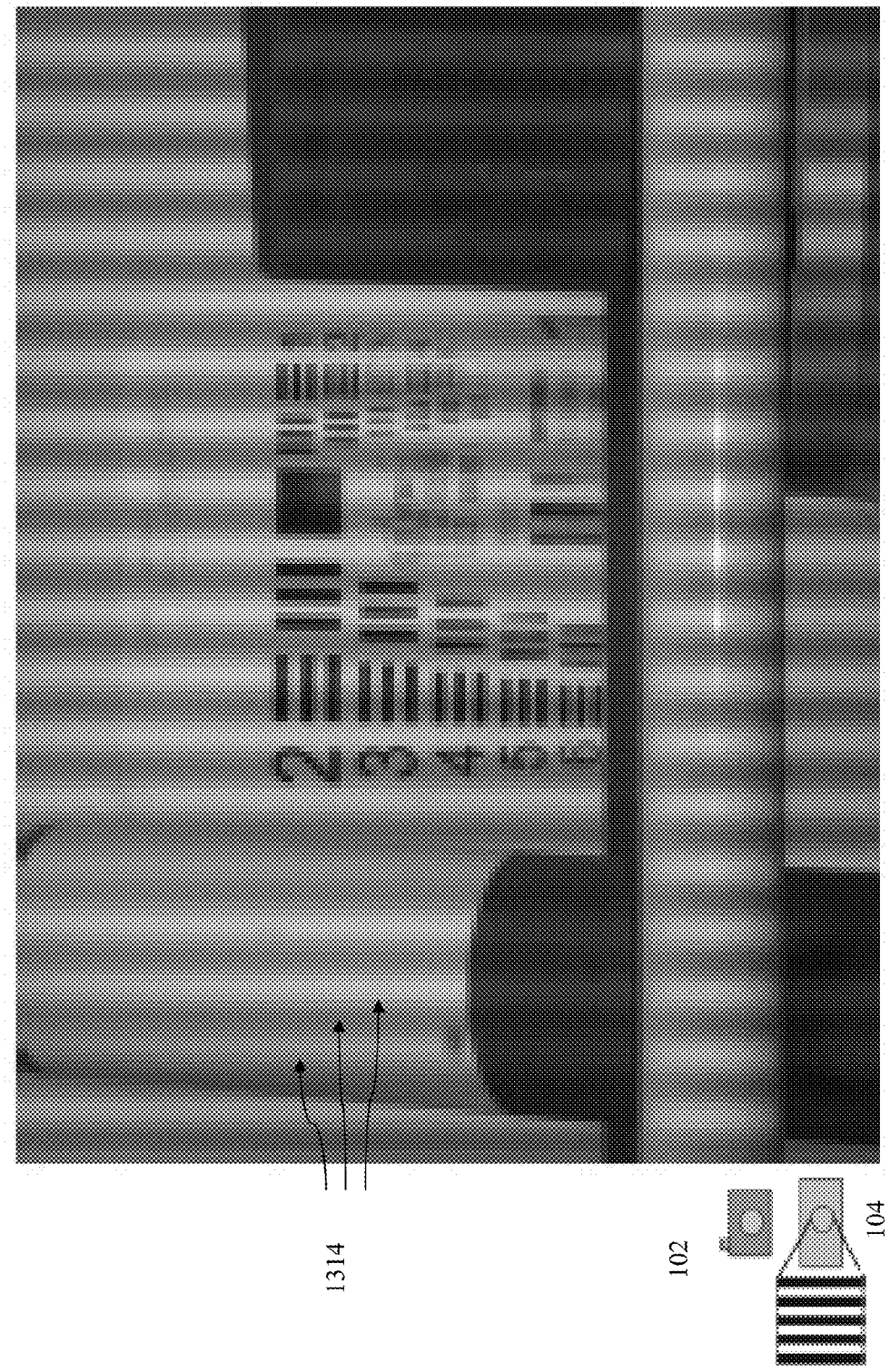
FIG. 13B is an illustration of an example scene illuminated with a horizontally periodic pattern by an illumination system vertically collocated from a camera.

The collocated camera+projector configuration described above may be used to identify a qualitative depth map of the scene in addition to Optical Super Resolution imaging. FIG. 13A is an illustration of an example scene illuminated with a vertically periodic pattern by an illumination system vertically collocated from a camera. FIG. 13A is an illustration of an example scene illuminated with a vertically periodic pattern 1310 by an illumination system 104 vertically collocated from a camera 102. The illumination patterns 1310 have a spatial periodicity in the vertical direction (i.e., shown in FIG. 13A as horizontal stripes). The periodicity of the spatial patterns experience phase distortions 1312 due to bending at depth discontinuities, in when viewed by the camera 102. FIG. 13B is an illustration of an example scene illuminated with a horizontally periodic pattern by an illumination system vertically collocated from a camera. In contrast, FIG. 13B is an illustration of an example scene illuminated with a horizontally periodic pattern 1314 (shown as vertical stripes) with an illumination system 104 that is vertically collocated from a camera 102. In FIG. 13B, even though the three-dimensional topography of the scene is the same as in FIG. 13A, the illumination pattern appears undistorted to the camera. The configuration shown in FIG. 13B may be used to achieve Optical Super Resolution, as described above.

In FIG. 13A, techniques from phase measurement profilometry may be used to recover surface topology from the depth dependent phase distortions experienced by the illumination pattern as viewed by the camera, in an uncalibrated, collocated camera+projector configuration shown therein.

Figure 14A:
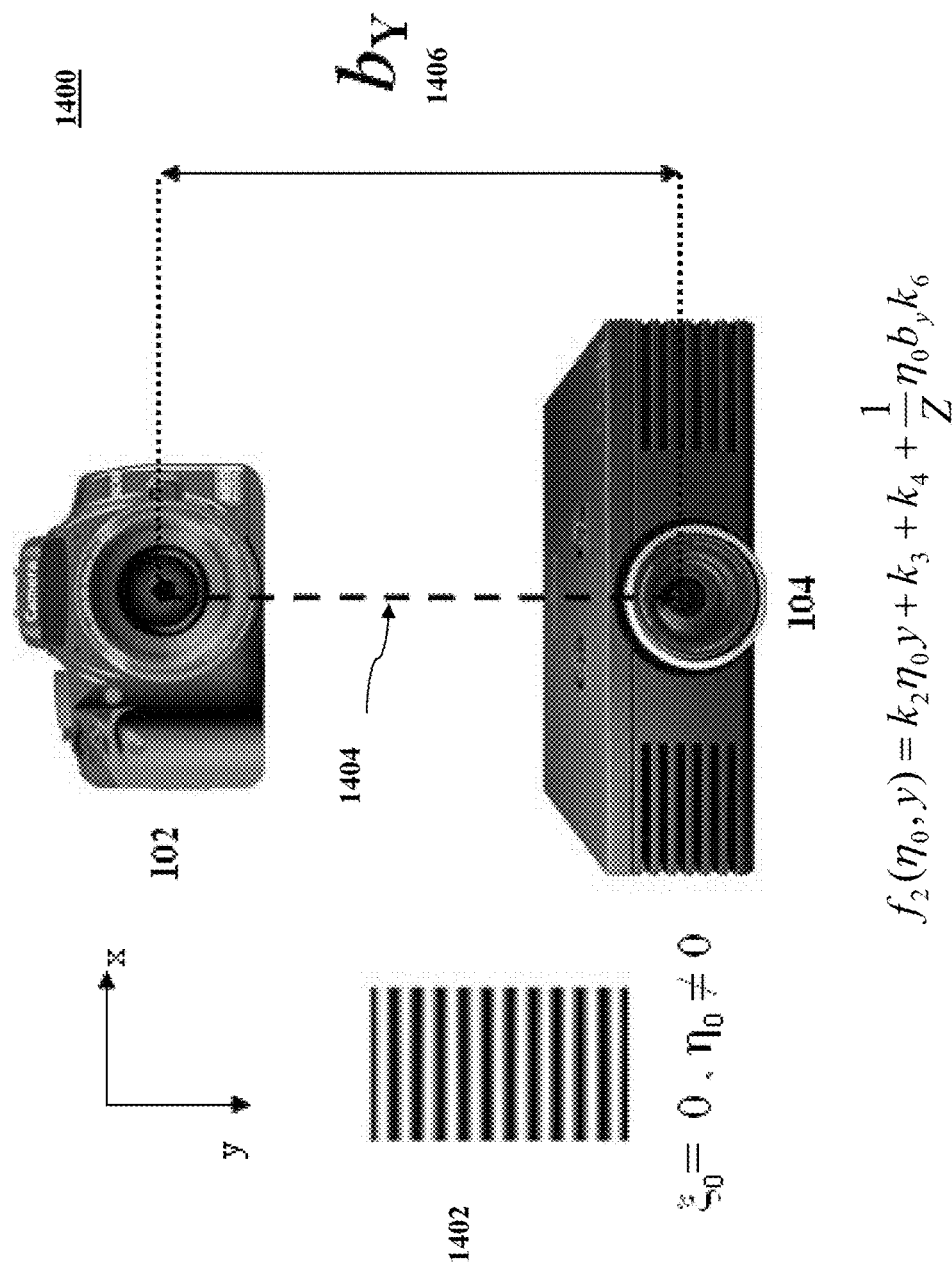
FIG. 14A is a schematic illustrating a camera+projector arrangement system for recovering topographic information using an imaging system that is vertically collocated with an illumination system, and illustrating an example spatial pattern having an orientation in accordance with embodiments of the present disclosure.

FIG. 14A is a schematic illustrating a camera+projector arrangement system 1400 for recovering topographic information using an imaging system 102 that is vertically collocated with an illumination system 104, and illustrating an example spatial pattern 1402 having an orientation in accordance with embodiments of the present disclosure. In FIG. 14A, the orientation of the spatial pattern 1402 is orthogonal or substantially orthogonal to a baseline 1404 defining the relative positions of the imaging system 102 and the illumination system 104. In this example, the baseline 1404 is parallel or substantially parallel to the axis defined by $b_Y$ 1406 which, in this case, is vertical or substantially vertical. The pattern 1402 shown in FIG. 14A for depth estimation in a vertically collocated configuration may be represented quantitatively, where $\eta_0 \neq 0$ and $\xi_0 = 0$.

Figure 14B:
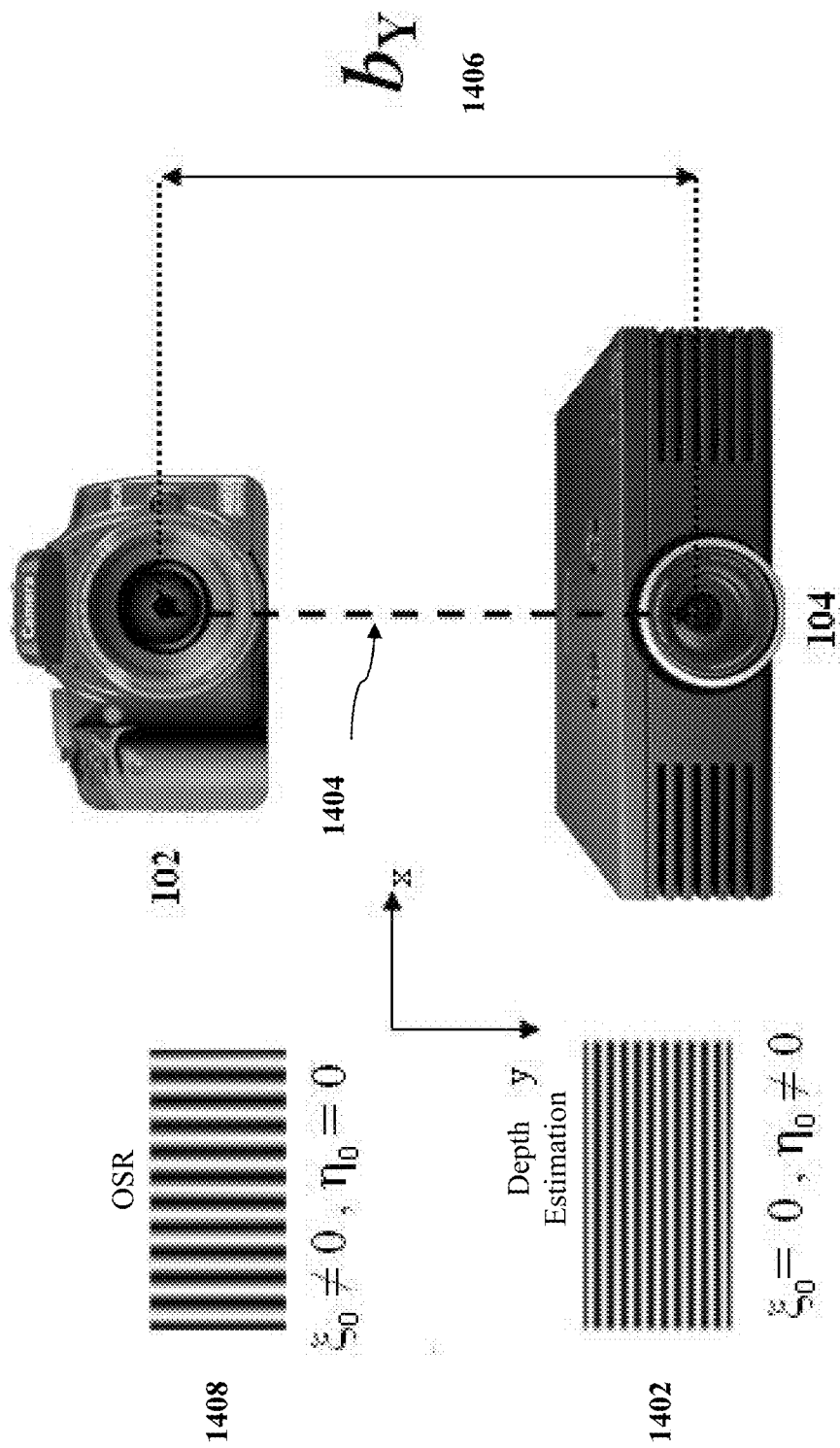
FIG. 14B is a schematic illustrating a system for achieving optical superresolution and depth estimation using an imaging system vertically collocated with an illumination system and illustrating an example spatial pattern orientation in accordance with embodiments of the present disclosure.

The illumination system 104 may project structured light onto a scene. The structured light would include all spatial patterns 1402, as shown in FIG. 14A, that appear periodic from the standpoint of the camera 102. In general, it is to be understood that the structured illumination presents a spatial periodicity from the camera viewpoint. In certain embodiments, the projector 104 may project an illumination pattern based on known scene geometry, so that the pattern appears undistorted (and periodic) when viewed by the camera. The modulated images captured by the camera can now be used to realize Optical Super-Resolution. The geometry of the scene may be determined based on the depth estimation methods described in this disclosure, FIG. 14B is a schematic illustrating a system 1400 for achieving optical superresolution and depth estimation using an imaging system 102 vertically collocated with an illumination system 104, and illustrating an example spatial pattern orientation 1402 for depth estimation and spatial pattern 1408 for OSR, in accordance with embodiments of the present disclosure. In the example collocated configuration shown in FIG. 14B, the spatial periodicity of the pattern 1402 viewed by the camera would be vertical or substantially vertical (horizontal stripes) relative to the baseline 1404 for depth estimation. Baseline 1404 in this example implementation is parallel or substantially parallel to the axis defined by $b_Y$ 1406. The projector 104 would also be configured to project spatial patterns 1408, which are horizontal or substantially horizontal in periodicity (vertical stripes from the camera 102 perspective) for Optical Super Resolution. Spatial pattern 1408 may be represented quantitatively, where $\eta_0=0$ and $\xi_0 \neq 0$.

Figure 15A:
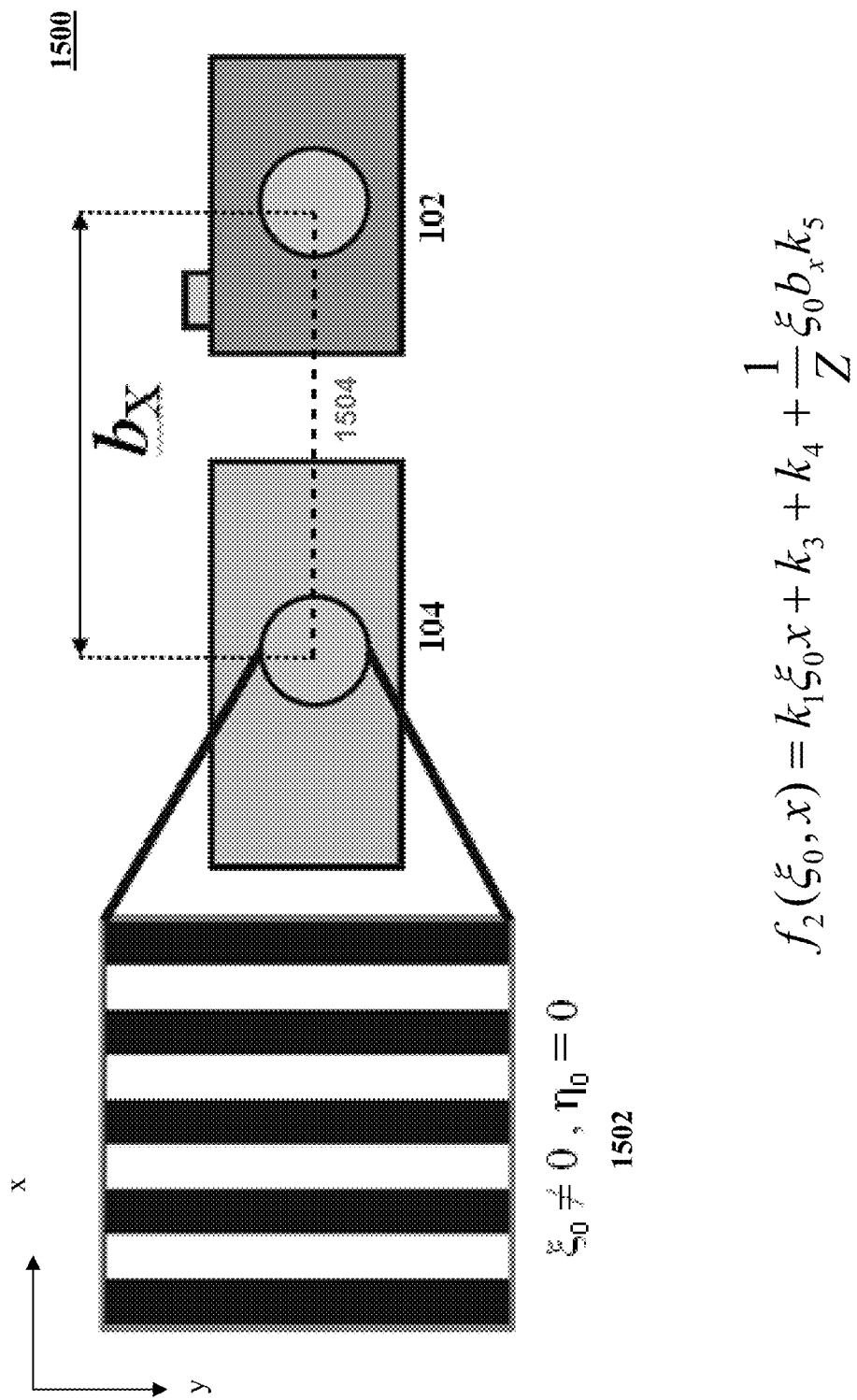
FIG. 15A is a schematic illustrating a system for achieving depth estimation using an imaging system horizontally collocated with an illumination system and illustrating an example spatial pattern orientation in accordance with embodiments of the present disclosure.

FIG. 15A is a schematic illustrating a system 1500 for achieving depth estimation using an imaging system 102 vertically collocated with an illumination system 104, and illustrating an example spatial pattern 1502 having an orientation in accordance with embodiments of the present disclosure. In FIG. 15A, the orientation of the spatial pattern 1502 is orthogonal or substantially orthogonal to a baseline 1505 defining the relative positions of the imaging system 102 and the illumination system 104. In this example, the baseline 1504 is parallel or substantially parallel to the axis defined by $b_X$ 1506, which in this case is horizontal or substantially horizontal (vertical stripes). The pattern 1502 shown in FIG. 15A for depth estimation in a horizontally collocated configuration may be represented quantitatively, where $\eta_0=0$ and $\xi_0 \neq 0$.

The illumination system 104 may project structured light onto a scene. The structured light would include the spatially periodic patterns 1502, as shown in FIG. 15A, from the perspective of the camera 102.

Figure 15B:
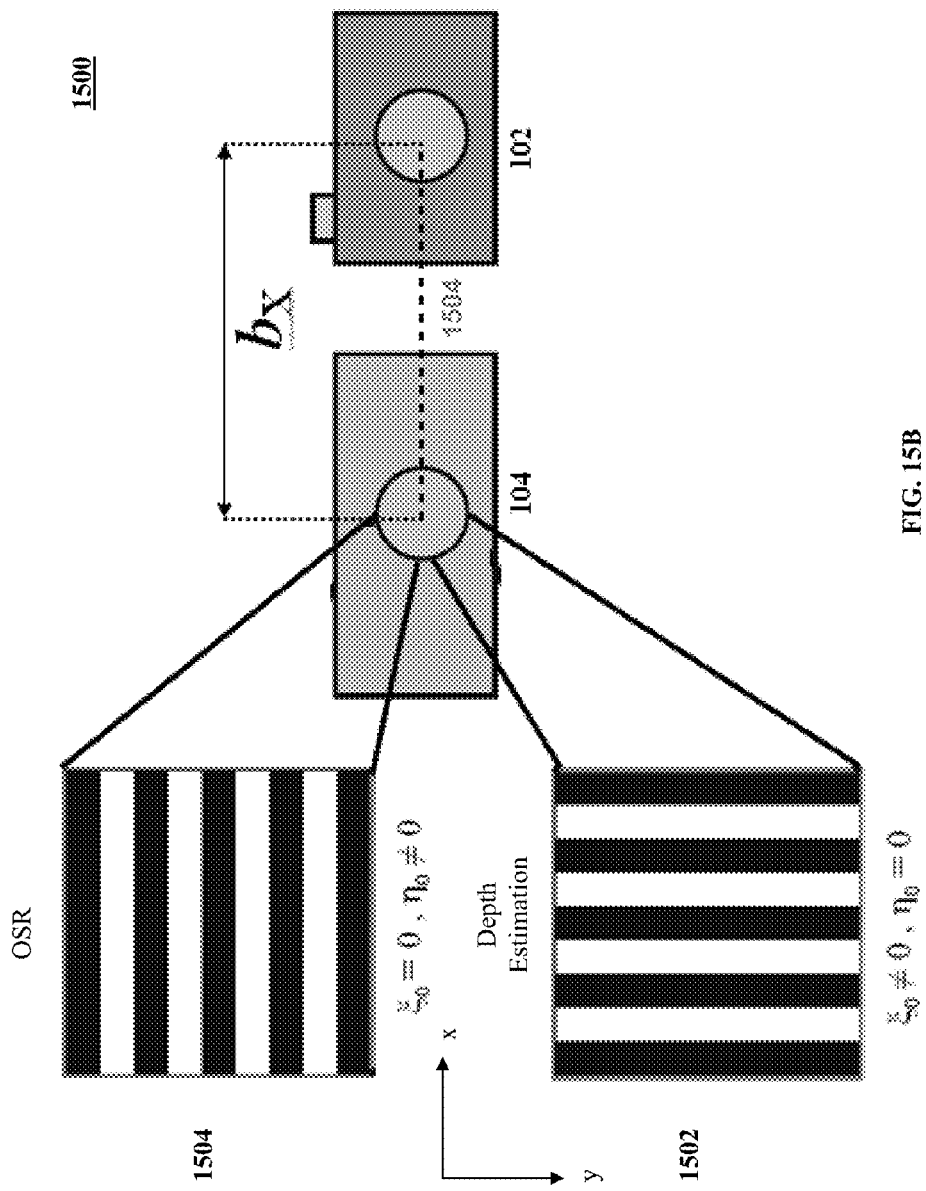
FIG. 15B is a schematic illustrating a system for achieving optical super resolution and depth estimation using an imaging system horizontally collocated with an illumination system and illustrating example spatial pattern orientations in accordance with embodiments of the present disclosure.

FIG. 15B is a schematic illustrating a system 1500 for achieving optical super resolution and depth estimation using an imaging system 102 horizontally collocated with an illumination system 104, and illustrating example spatial pattern orientation 1502 for depth estimation and spatial pattern 1504 for OSR, in accordance with embodiments of the present disclosure. In the example collocated configuration shown in FIG. 15B, the spatial periodicity of the pattern 1502 viewed by the camera would be horizontal or substantially horizontal (vertical stripes) relative to the baseline 1504 for depth estimation. The projector 104 would also be configured to project spatial patterns, which are vertical or substantially vertical in periodicity (horizontal stripes from the camera 102 perspective) for Optical Super Resolution. Spatial pattern 1508 may be represented quantitatively, where $\eta_0 \neq 0$ and $\xi_0=0$.

Figure 16A:
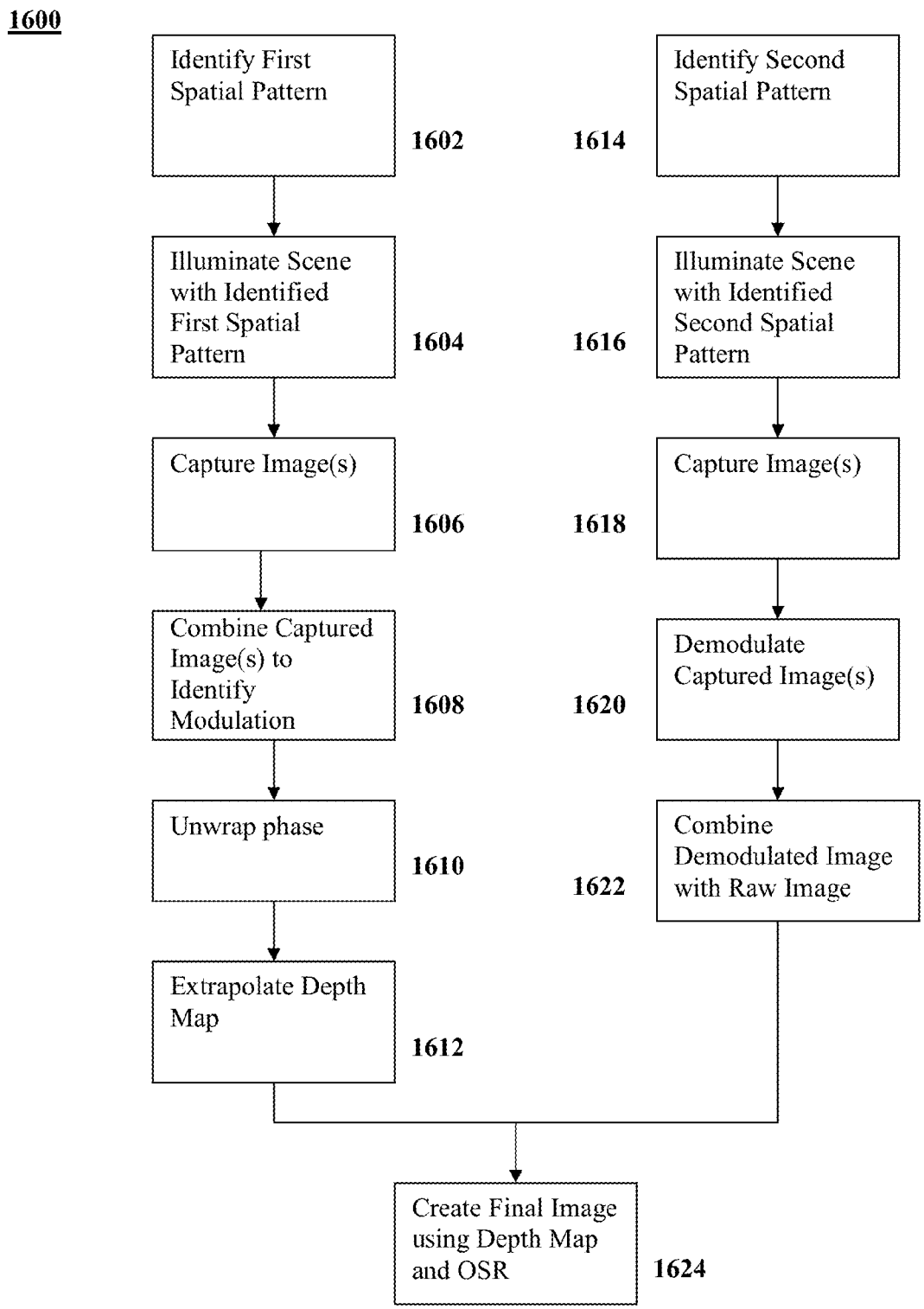
FIG. 16A is a process flow diagram for achieving depth estimation and Optical Super Resolution from a collocated camera and projector configuration according to the present disclosure.
Figure 16B:
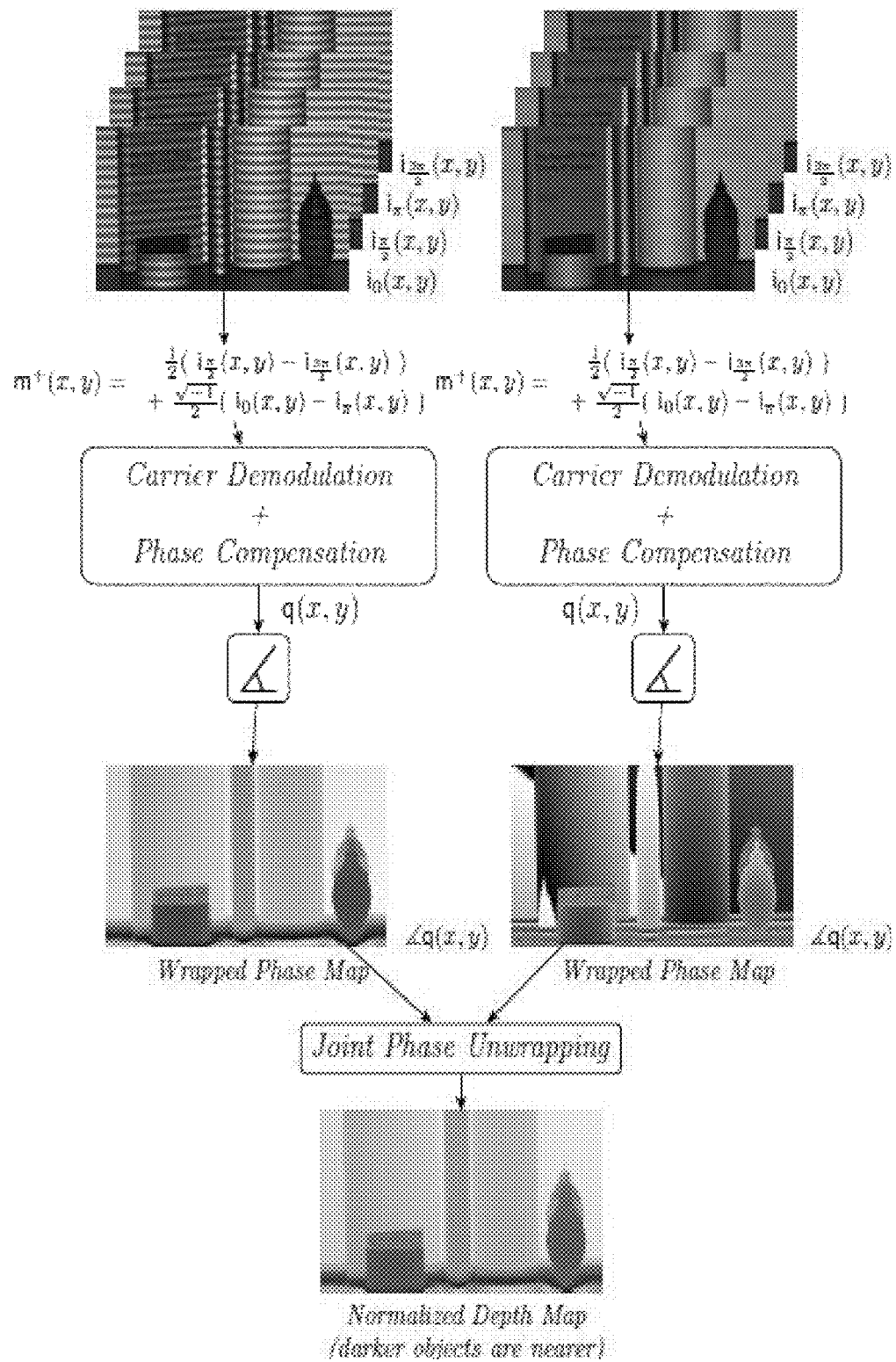
FIG. 16B is a process diagram illustrating depth estimation using phase unwrapping by projecting structured illumination having periodic patterns of differing frequencies.

FIG. 16A is a process flow diagram 1600 for achieving depth estimation from a collocated camera and projector configuration according to the present disclosure. The process flow shown in diagram 1600 is described below in a particular order of operations, but it is to be understood that alternative orders of operation may be performed without deviating from this disclosure. The process may begin by identifying a first spatial pattern (1602). The first spatial pattern may be based on the location of an illumination system relative to an imaging system. Similarly, the first spatial pattern may be oriented with a vertical periodicity in situations where depth estimation is the objective. In the example provided in FIG. 16A, the first spatial pattern is identified with depth estimation as the objective. The scene may be illuminated with the identified first spatial pattern (1604). One or more images may be captured (1606). The captured images may be combined to obtain the image of the scene under complex sinusoidal modulation. The modulating frequency and the associated complex constant may be identified (1608). The phase may be unwrapped to recover the depth Z for particular coordinates (e.g., x or y) (1610). In order to facilitate the unambiguous phase unwrapping, the scene may be illuminated with an additional sinusoidal pattern of lower frequency. FIG. 16B is a process diagram illustrating depth estimation using phase unwrapping by projecting structured illumination having periodic patterns of differing frequencies. The process shown on the right-hand side uses the low frequency sinusoid.

In the example described above, the first spatial pattern is described for use in recovering a depth map (1612). In that example, a second spatial pattern may be used to achieve optical super resolution in a manner consistent with this disclosure. A second pattern may be identified (1614). The second pattern may be identified based on the camera+projector configuration. The scene may be illuminated with the second spatial pattern (1616). In such instances, the second spatial patterns may be used to illuminate the scene either prior to or after illuminating the scene with the first spatial patterns. In certain embodiments, the second pattern may be identified based on the depth map determined using the first spatial patterns. In those instances, the second pattern could be configured to satisfy the parameters for OSR. The depth map can be used to identify the pattern to be used for OSR. The images are captured (1618). The modulation frequency is identified and the captured images are demodulated (1620). The resulting demodulated images are combined to obtain the super-resolved image (1622). The super-resolved image may also be combined with the depth map to simultaneously obtain enhanced lateral resolution, and knowledge of scene geometry (1624).

Figure 17A:
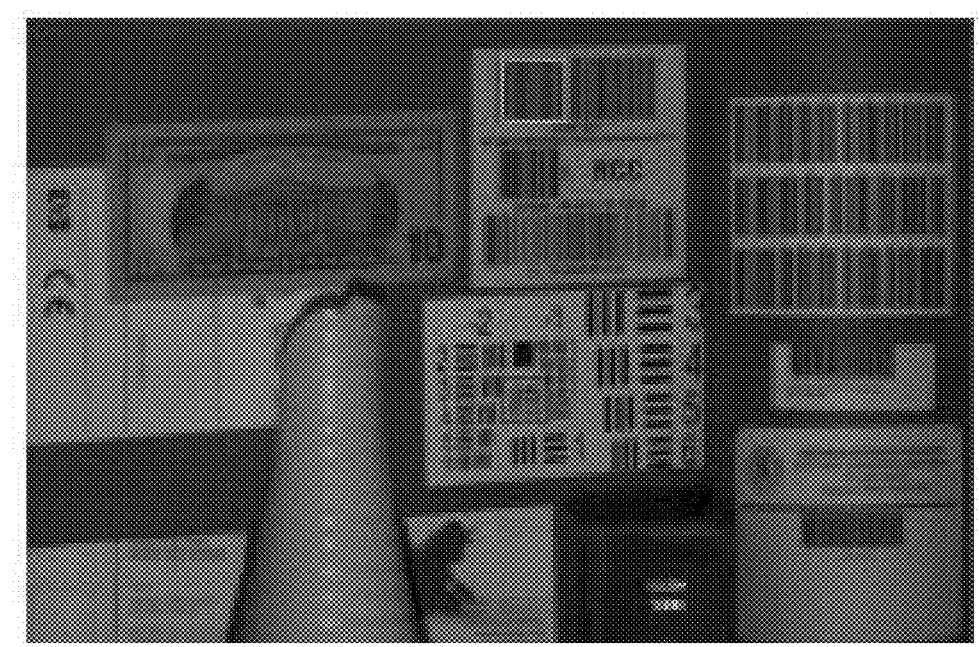
FIG. 17A is an illustration of an example scene.
Figure 17B:
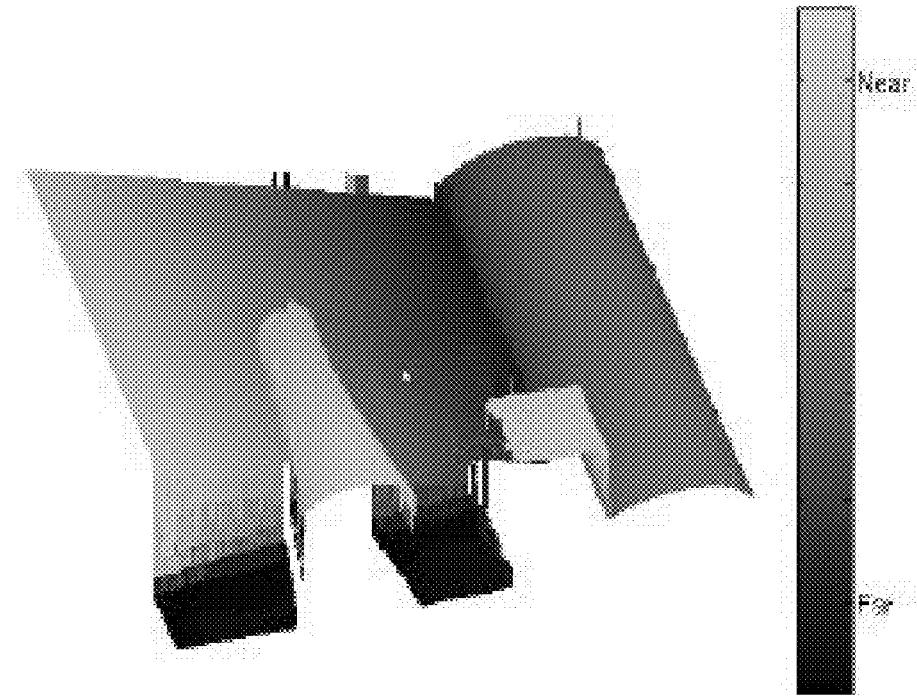
FIG. 17B is an illustration of a depth map of the scene shown in FIG. 20.
Figure 20:
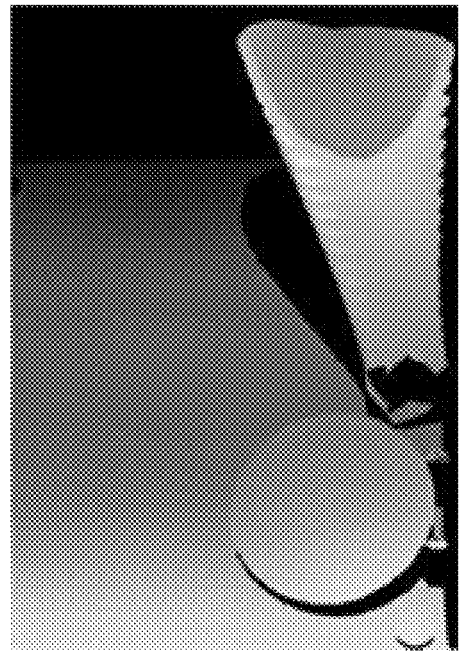
FIG. 20 is an example illustration of recovering topographic information using structured light.
Figure 20:
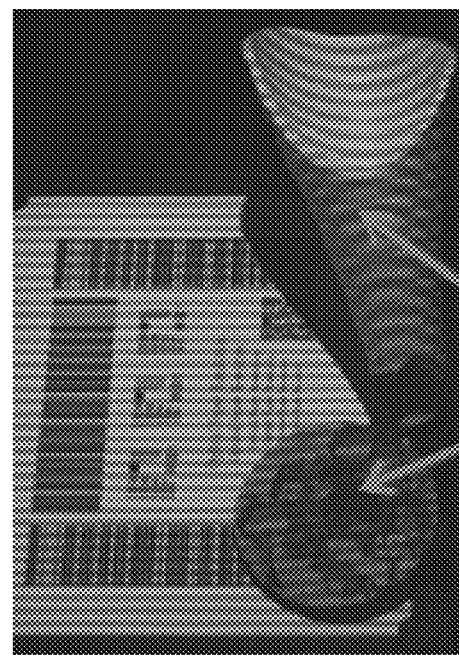

FIG. 17A is an illustration of an example scene. FIG. 17B is an illustration of a depth map of the scene shown in FIG. 20. FIG. 20 is an example illustration of recovering topographic information using structured light.

The Optical Super Resolution methods and systems disclosed herein may have applications beyond taking high-resolution images. For example, the concepts described in this disclosure may be used for high resolution surveillance. Further, the concepts may be used in bar code scanning, counterfeit detection, and high-resolution 3-D image scanning Other embodiments and advantages are recognizable by those of skill in the art by the foregoing description and the claims. In embodiments, some or all of the operations described in this disclosure may be performed. The order of operations described in the forgoing paragraphs and embodied in the method claims recited below are not meant to limit the order of the operations, and the steps may be performed in a different order as understood by those of skill in the art.

What is claimed is:

1. A method for capturing images of a scene, the method comprising:

illuminating the scene with a first set of spatially periodic patterns using an illumination system;

identifying one or more first images of the scene, the one or more first images having a plurality of first modulated components based on modulating the scene with the first set of spatially periodic patterns;

identifying at least one first modulation frequency for the one or more first images;

using the identified first modulation frequency to demodulate the modulated components of the one or more first images and create demodulated one or more first images;

identifying a depth map of the scene based on phase distortions identified in the demodulated one or more first images;

illuminating the scene with a second set of spatially periodic patterns using the illumination system, wherein the second pattern is based on the depth map determined using the first spatial patterns;

identifying one or more second images of the scene, the one or more second images having a plurality of second modulated components based on modulating the scene with the second set of spatially periodic patterns;

identifying at least one second modulation frequency for the one or more second images;

using the identified second modulation frequency to demodulate the modulated components of the one or more second images and create demodulated one or more second images;

combining the demodulated one or more second images with at least one un-modulated image of the scene to obtain a super-resolution image; and obtain lateral resolution and scene geometry of the scene based on combining the depth map with the combined super-resolution image.

2. The method of claim 1, wherein identifying the at least one un-modulated image of the scene comprises capturing at least one un-modulated image of the scene under unstructured illumination with an imaging system.

3. The method of claim 1, wherein identifying the at least one un-modulated image of the scene comprises generating an un-modulated image of the scene.

4. The method of claim 1, wherein identifying the one or more first images of the scene comprises capturing the one or more first images of the scene with an imaging system under structured illumination, the one or more first images including a plurality of modulated components scene.

5. The method of claim 1, wherein identifying the one or more first images of the scene comprises generating the one or more first images of the scene under structured illumination.

6. The method of claim 1, further comprising performing aliasing management on the one or more first images or the one or more second images.

7. The method of claim 1, wherein identifying the modulation frequency comprises:
calculating a Fourier transform of the one or more first images or the one or more second images; and
determining one or more modulation frequencies from the Fourier transform of the one or more first images or the one or more second images.

8. The method of claim 1, wherein illuminating the scene with the second set of spatially periodic patterns using the illumination system occurs prior to illuminating the scene with the first set of spatially periodic patterns using the illumination system; and the method further comprises using the depth map to identify a spatial orientation for the first set of spatially periodic patterns.

9. A perspective imaging apparatus comprising:
a perspective illumination system having an illumination center of perspective, the perspective illumination system operable to:
project a first plurality of illumination patterns onto a scene, the first plurality of illumination patterns defining a first spatial periodicity and a first frequency;
project a second plurality of illumination patterns onto the scene, the second plurality of illumination patterns defining a second spatial periodicity and a second frequency, the second spatial periodicity shifted spatially from the first spatial periodicity; the second plurality of illumination patterns projected after the first plurality of illumination patterns;
a perspective imager having an imaging center of perspective, the imaging center of perspective and the illumination center of perspective share an optical axis; and
the perspective imaging apparatus operable to:
receive first image information that includes the first plurality of illumination patterns,
demodulate the first image information,
identify a depth map of the scene based on phase distortions identified in the demodulated one or more first images;
receive second image information that includes the second plurality of illumination patterns, the second plurality of illumination patterns being based on the depth map,
demodulate the second image information,
combine the demodulated second image information with at least one un-modulated image of the scene to obtain a super-resolution image; and
obtain lateral resolution and scene geometry of the scene based on combining the depth map with the combined super-resolution image.

10. A non-transitory computer readable medium storing instructions to cause a processor to perform operations comprising:
illuminating a scene with a first set of spatially periodic patterns using an illumination system;
identifying one or more first images of the scene, the one or more first images having a plurality of first modulated components based on modulating the scene with the first set of spatially periodic patterns;
identifying at least one first modulation frequency for the one or more first images;
using the identified first modulation frequency to demodulate the modulated components of the one or more first images and create demodulated one or more first images;
identifying a depth map of the scene based on phase distortions identified in the demodulated one or more first images;
illuminating the scene with a second set of spatially periodic patterns using the illumination system, wherein the second pattern is based on the depth map determined using the first spatial patterns;
identifying one or more second images of the scene, the one or more second images having a plurality of second modulated components based on modulating the scene with the second set of spatially periodic patterns;
identifying at least one second modulation frequency for the one or more second images;
using the identified second modulation frequency to demodulate the modulated components of the one or more second images and create demodulated one or more second images;
combining the demodulated one or more second images with at least one un-modulated image of the scene to obtain a super-resolution image; and
obtain lateral resolution and scene geometry of the scene based on combining the depth map with the combined super-resolution image.

11. The computer readable medium of claim 10, wherein identifying the at least one un-modulated image of the scene comprises capturing at least one un-modulated image of the scene under unstructured illumination with an imaging system.

12. The computer readable medium of claim 10, wherein identifying the at least one un-modulated image of the scene comprises generating an un-modulated image of the scene.

13. The computer readable medium of claim 10, wherein identifying the one or more first images of the scene comprises capturing the one or more first images of the scene with an imaging system under structured illumination, the one or more first images including a plurality of modulated components scene.

14. The computer readable medium of claim 10, wherein identifying the one or more first images of the scene comprises generating the one or more first images of the scene under structured illumination.

15. The computer readable medium of claim 10, the instructions further comprising performing aliasing management on the one or more first images or the one or more second images.

16. The computer readable medium of claim 10, wherein identifying the modulation frequency comprises:
   calculating a Fourier transform of the one or more first images or the one or more second images; and
   determining one or more modulation frequencies from the Fourier transform of the one or more first images or the one or more second images.

17. The computer readable medium of claim 10, wherein illuminating the scene with the second set of spatially periodic patterns using the illumination system occurs prior to illuminating the scene with the first set of spatially periodic patterns using the illumination system; and the operations further comprises using the depth map to identify a spatial orientation for the first set of spatially periodic patterns.

18. The computer readable medium of claim 10, wherein identifying the one or more second images of the scene comprises capturing the one or more second images of the scene with an imaging system under structured illumination, the one or more second images including a plurality of modulated components scene.

19. The computer readable medium of claim 10, wherein identifying the one or more second images of the scene comprises generating the one or more second images of the scene under structured illumination.

20. The method of claim 1, wherein identifying the one or more second images of the scene comprises one of generating the one or more second images of the scene under structured illumination or capturing the one or more second images of the scene with an imaging system under structured illumination, the one or more second images including a plurality of modulated components scene.

* * * * *

UNITED STATES PATENT AND TRADEMARK OFFICE
CERTIFICATE OF CORRECTION

| | |
|---|---|
| PATENT NO. | : 10,516,874 B2 |
| APPLICATION NO. | : 14/846533 |
| DATED | : December 24, 2019 |
| INVENTOR(S) | : Prasanna Rangarajan et al. |

It is certified that error appears in the above-identified patent and that said Letters Patent is hereby corrected as shown below:

In the Specification

In Column 1, Line 9, after "is" and before "continuation" Insert -- a --, therefor.

In Column 1, Line 9, delete "U.S" and Insert -- U.S. --, therefor.

In Column 1, Line 11, delete "contacts" and Insert -- contents --, therefor.

Signed and Sealed this
Sixth Day of July, 2021

Drew Hirshfeld
*Performing the Functions and Duties of the
Under Secretary of Commerce for Intellectual Property and
Director of the United States Patent and Trademark Office*